(12) United States Patent
Barrall et al.

(10) Patent No.: US 9,542,310 B2
(45) Date of Patent: *Jan. 10, 2017

(54) FILE SERVER NODE WITH NON-VOLATILE MEMORY PROCESSING MODULE COUPLED TO CLUSTER FILE SERVER NODE

(71) Applicant: Hitachi Data Systems Engineering UK Limited, Berkshire (GB)

(72) Inventors: Geoffrey S. Barrall, San Jose, CA (US); Simon L. Benham, Berkshire (GB); Trevor E. Willis, Buckinghamshire (GB); Christopher J. Aston, Bucks (GB)

(73) Assignee: HITACHI DATA SYSTEMS ENGINEERING UK LIMITED, Berkshire (GB)

( * ) Notice: Subject to any disclaimer, the term of this patent is extended or adjusted under 35 U.S.C. 154(b) by 195 days.

This patent is subject to a terminal disclaimer.

(21) Appl. No.: 14/078,831

(22) Filed: Nov. 13, 2013

(65) Prior Publication Data

US 2014/0108709 A1 Apr. 17, 2014

Related U.S. Application Data

(60) Continuation of application No. 13/533,357, filed on Jun. 26, 2012, now Pat. No. 8,639,731, which is a
(Continued)

(51) Int. Cl.
*G06F 17/30* (2006.01)
*G06F 17/00* (2006.01)
*G06F 12/02* (2006.01)

(52) U.S. Cl.
CPC ....... *G06F 12/0246* (2013.01); *G06F 17/3023* (2013.01); *G06F 17/30088* (2013.01);
(Continued)

(58) Field of Classification Search
CPC ...... H04L 67/10; H04L 67/1097; H04L 43/08; H04L 63/08; H04L 67/141; H04L 41/0816; H04L 47/70; H04L 63/02; H04L 63/0823; H04L 63/10; H04L 63/1425; H04L 63/145; H04L 65/403; H04L 67/025; H04L 67/1095; H04L 12/4683; H04L 1/16; H04L 1/1607
See application file for complete search history.

(56) References Cited

U.S. PATENT DOCUMENTS 3,588,831 A 6/1971 Figueroa et al. .......... 340/172.5
3,699,532 A 10/1972 Schaffer et al. ................ 710/48
(Continued)

FOREIGN PATENT DOCUMENTS

EP 0321723 6/1989 ............. G06F 15/16
EP 0367182 5/1990 ............. G06F 15/16
(Continued)

OTHER PUBLICATIONS

Advanced Peer-to-Peer Networking (APPN) and High Performance Routing (HPR), the Internet; International Business Machines Website, www-3.ibm.com/software/network/technology/appnhpr; accessed Aug. 8, 2003.
(Continued)

*Primary Examiner* — Yicun Wu
(74) *Attorney, Agent, or Firm* — Mattingly & Malur, PC

(57) ABSTRACT

Apparatus includes a file server node having (i) a first interface operable to communicate with a network and receiving a network request via network, (ii) a non-volatile memory operable to temporarily store a request related to the network request received by the first interface, (iii) a second interface operable to be coupled to the storage device for storing the request, and (iv) a non-volatile memory processing module, coupled to the first interface, the non-
(Continued)

volatile memory and the second interface, and operable to be coupled to another file server node, so that the request can be sent to the non-volatile memory, the second interface and the another file server node after the non-volatile memory processing module receives the file system request.

22 Claims, 31 Drawing Sheets

Related U.S. Application Data continuation of application No. 11/841,353, filed on Aug. 20, 2007, now Pat. No. 8,224,877, which is a division of application No. 10/286,015, filed on Nov. 1, 2002, now Pat. No. 7,457,822.

(52) U.S. Cl.
CPC . *G06F 17/30203* (2013.01); *Y10S 707/99945* (2013.01); *Y10S 707/99948* (2013.01)

(56) References Cited

U.S. PATENT DOCUMENTS

| | | | | |
|---|---|---|---|---|
| 3,702,462 | A | 11/1972 | England | 340/172.5 |
| 4,074,072 | A | 2/1978 | Christensen et al. | 179/15 AQ |
| 4,075,691 | A | 2/1978 | Davis et al. | 364/200 |
| 4,079,452 | A | 3/1978 | Larson et al. | 364/200 |
| 4,080,649 | A | 3/1978 | Calle et al. | 364/200 |
| 4,096,567 | A | 6/1978 | Millard et al. | 364/200 |
| 4,101,960 | A | 7/1978 | Stokes et al. | 364/200 |
| 4,123,795 | A | 10/1978 | Dean, Jr. et al. | 364/200 |
| 4,130,866 | A | 12/1978 | Ono | 364/200 |
| 4,156,906 | A | 5/1979 | Ryan | 364/200 |
| 4,156,907 | A | 5/1979 | Rawlings et al. | 364/200 |
| 4,228,496 | A | 10/1980 | Katzman | 364/200 |
| 4,240,143 | A | 12/1980 | Besemer et al. | 710/104 |
| 4,253,144 | A | 2/1981 | Bellamy et al. | 364/200 |
| 4,323,967 | A | 4/1982 | Peters et al. | 710/107 |
| 4,326,248 | A | 4/1982 | Hinai et al. | 364/200 |
| 4,333,144 | A | 6/1982 | Whiteside et al. | 364/200 |
| 4,377,843 | A | 3/1983 | Garringer et al. | 364/200 |
| 4,385,206 | A | 5/1983 | Bradshaw et al. | 179/18 ES |
| 4,394,727 | A | 7/1983 | Hoffman et al. | 364/200 |
| 4,396,983 | A | 8/1983 | Segarra et al. | 364/200 |
| 4,399,503 | A | 8/1983 | Hawley | 364/200 |
| 4,412,285 | A | 10/1983 | Neches et al. | 364/200 |
| 4,414,624 | A | 11/1983 | Summer et al. | 364/200 |
| 4,442,487 | A | 4/1984 | Fletcher et al. | 364/200 |
| 4,445,174 | A | 4/1984 | Fletcher | 364/200 |
| 4,448,419 | A | 5/1984 | Telnaes | 273/143 R |
| 4,456,957 | A | 6/1984 | Schieltz et al. | 364/200 |
| 4,459,664 | A | 7/1984 | Pottier et al. | 364/200 |
| 4,488,231 | A | 12/1984 | Yu et al. | 364/200 |
| 4,494,188 | A | 1/1985 | Nakane et al. | 364/200 |
| 4,500,960 | A | 2/1985 | Babecki et al. | 364/200 |
| 4,507,728 | A | 3/1985 | Sakamoto | 364/200 |
| 4,527,232 | A | 7/1985 | Bechtolsheim | 364/200 |
| 4,536,874 | A | 8/1985 | Stoffel et al. | 370/85 |
| 4,550,368 | A | 10/1985 | Bechtolsheim | 364/200 |
| 4,558,413 | A | 12/1985 | Schmidt et al. | 364/300 |
| 4,590,556 | A | 5/1986 | Berger et al. | 364/200 |
| 4,608,631 | A | 8/1986 | Stiffler et al. | 364/200 |
| 4,614,841 | A | 9/1986 | Babecki et al. | 179/18 ES |
| 4,626,634 | A | 12/1986 | Brahm et al. | 379/28 |
| 4,628,508 | A | 12/1986 | Sager et al. | 371/9 |
| 4,633,245 | A | 12/1986 | Blount et al. | 340/825.03 |
| 4,638,427 | A | 1/1987 | Martin | 364/200 |
| 4,649,473 | A | 3/1987 | Hammer et al. | 364/200 |
| 4,654,654 | A | 3/1987 | Butler et al. | 340/825.2 |
| 4,685,125 | A | 8/1987 | Zave | 379/96 |
| 4,694,396 | A | 9/1987 | Weisshaar et al. | 719/313 |
| 4,709,325 | A | 11/1987 | Yajima | 364/200 |
| 4,710,868 | A | 12/1987 | Cocke et al. | 364/200 |
| 4,714,995 | A | 12/1987 | Materna et al. | 364/200 |
| 4,719,569 | A | 1/1988 | Ludemann et al. | 364/200 |
| 4,727,538 | A | 2/1988 | Furchtgott et al. | 370/85 |
| 4,754,395 | A | 6/1988 | Weisshaar et al. | 364/200 |
| 4,766,534 | A | 8/1988 | DeBenedictis | 364/200 |
| 4,769,772 | A | 9/1988 | Dwyer | 364/300 |
| 4,780,821 | A | 10/1988 | Crossley | 364/200 |
| 4,783,705 | A | 11/1988 | Moon et al. | 360/77 |
| 4,783,730 | A | 11/1988 | Fischer | 364/200 |
| 4,797,854 | A | 1/1989 | Nakazaki et al. | 364/900 |
| 4,803,621 | A | 2/1989 | Kelly | 364/200 |
| 4,809,169 | A | 2/1989 | Sfarti et al. | 364/200 |
| 4,816,989 | A | 3/1989 | Finn et al. | 364/200 |
| 4,819,159 | A | 4/1989 | Shipley et al. | 364/200 |
| 4,825,354 | A | 4/1989 | Agrawal et al. | 364/200 |
| 4,845,609 | A | 7/1989 | Lighthart et al. | 364/200 |
| 4,872,157 | A | 10/1989 | Hemmady et al. | 370/60 |
| 4,872,159 | A | 10/1989 | Hemmady et al. | 370/60 |
| 4,875,206 | A | 10/1989 | Nichols et al. | 370/85.15 |
| 4,887,204 | A | 12/1989 | Johnson et al. | 364/200 |
| 4,894,825 | A | 1/1990 | Kobayashi et al. | 370/124 |
| 4,897,781 | A | 1/1990 | Chang et al. | 364/200 |
| 4,899,333 | A | 2/1990 | Roediger | 370/60 |
| 4,903,258 | A | 2/1990 | Kuhlmann et al. | 370/58.2 |
| 4,914,583 | A | 4/1990 | Weisshaar et al. | 364/200 |
| 4,922,486 | A | 5/1990 | Lidinsky et al. | 370/60 |
| 4,945,470 | A | 7/1990 | Takahashi | 364/200 |
| 4,991,133 | A | 2/1991 | Davis et al. | 364/900 |
| 4,993,017 | A | 2/1991 | Bachinger et al. | 370/58.2 |
| 5,001,628 | A | 3/1991 | Johnson et al. | 364/200 |
| 5,008,814 | A | 4/1991 | Mathur | 709/221 |
| 5,012,405 | A | 4/1991 | Nishikado et al. | 707/8 |
| 5,036,459 | A | 7/1991 | Den Haan et al. | 364/200 |
| 5,050,070 | A | 9/1991 | Chastain et al. | 364/200 |
| 5,058,110 | A | 10/1991 | Beach et al. | 370/464 |
| 5,067,071 | A | 11/1991 | Schanin et al. | 395/275 |
| 5,073,852 | A | 12/1991 | Siegel et al. | 395/700 |
| 5,109,487 | A | 4/1992 | Ohgomori et al. | 395/200 |
| 5,109,515 | A | 4/1992 | Laggis et al. | 395/725 |
| 5,113,496 | A | 5/1992 | McCalley et al. | 710/305 |
| 5,113,500 | A | 5/1992 | Talbott et al. | 710/305 |
| 5,113,522 | A | 5/1992 | Dinwiddie, Jr. et al. | 713/375 |
| 5,113,523 | A | 5/1992 | Colley et al. | 712/12 |
| 5,118,975 | A | 6/1992 | Hillis et al. | 307/602 |
| 5,129,093 | A | 7/1992 | Muramatsu et al. | 395/800 |
| 5,133,053 | A | 7/1992 | Johnson et al. | 395/200 |
| 5,155,809 | A | 10/1992 | Baker et al. | 395/200 |
| 5,163,131 | A | 11/1992 | Row et al. | 395/200 |
| 5,175,825 | A | 12/1992 | Starr | 395/325 |
| 5,179,702 | A | 1/1993 | Spix et al. | 395/650 |
| 5,185,857 | A | 2/1993 | Rozmanith et al. | 395/148 |
| 5,201,040 | A | 4/1993 | Wada et al. | 395/400 |
| 5,210,824 | A | 5/1993 | Putz et al. | 395/145 |
| 5,214,776 | A | 5/1993 | Bagnoli et al. | 395/425 |
| 5,218,697 | A | 6/1993 | Chung | 395/650 |
| 5,230,065 | A | 7/1993 | Curley et al. | 395/200 |
| 5,243,699 | A | 9/1993 | Nickolls et al. | 395/275 |
| 5,255,369 | A | 10/1993 | Dann | 395/200 |
| 5,262,965 | A | 11/1993 | Putnam et al. | 395/101 |
| 5,276,860 | A | 1/1994 | Fortier et al. | 395/575 |
| 5,283,868 | A | 2/1994 | Baker et al. | 395/200 |
| 5,355,453 | A | 10/1994 | Row et al. | 395/200 |
| 5,359,713 | A | 10/1994 | Moran et al. | 395/200 |
| 5,367,698 | A | 11/1994 | Webber et al. | 395/800 |
| 5,371,885 | A | 12/1994 | Letwin | 395/600 |
| 5,388,231 | A | 2/1995 | Starr | 395/325 |
| 5,452,448 | A | 9/1995 | Sakuraba et al. | 395/600 |
| 5,457,796 | A | 10/1995 | Thompson | 395/600 |
| 5,485,579 | A | 1/1996 | Hitz et al. | 395/200.12 |
| 5,506,988 | A | 4/1996 | Weber et al. | 395/650 |
| 5,513,314 | A | 4/1996 | Kandasamy et al. | 395/182.04 |
| 5,519,853 | A | 5/1996 | Moran et al. | 395/550 |
| 5,548,724 | A | 8/1996 | Akizawa et al. | 395/200.03 |
| 5,557,798 | A | 9/1996 | Skeen et al. | 395/650 |
| 5,561,807 | A | 10/1996 | Verplanken et al. | 395/800 |
| 5,613,058 | A | 3/1997 | Koppolu et al. | 395/376 |
| 5,613,105 | A | 3/1997 | Zbikowski et al. | 395/611 |
| 5,613,124 | A | 3/1997 | Atkinson et al. | 395/133 |
| 5,625,815 | A | 4/1997 | Maier et al. | 395/608 |

(56) References Cited

U.S. PATENT DOCUMENTS

| | | | | |
|---|---|---|---|---|
| 5,628,005 A | 5/1997 | Hurvig | | 395/608 |
| 5,634,050 A | 5/1997 | Krueger et al. | | 395/616 |
| 5,673,394 A | 9/1997 | Fenwick et al. | | 395/200.08 |
| 5,675,782 A | 10/1997 | Montague et al. | | 395/609 |
| 5,699,518 A | 12/1997 | Held et al. | | 395/200.11 |
| 5,701,462 A | 12/1997 | Whitney et al. | | 395/610 |
| 5,701,491 A | 12/1997 | Dunn et al. | | 395/712 |
| 5,701,516 A | 12/1997 | Cheng et al. | | 395/842 |
| 5,742,818 A | 4/1998 | Shoroff et al. | | 395/616 |
| 5,745,752 A | 4/1998 | Hurvig et al. | | 395/616 |
| 5,754,771 A | 5/1998 | Epperson et al. | | 395/200.33 |
| 5,761,669 A | 6/1998 | Montague et al. | | 707/103 |
| 5,764,922 A | 6/1998 | Peacock et al. | | 710/6 |
| 5,794,230 A | 8/1998 | Horadan et al. | | 707/2 |
| 5,802,288 A | 9/1998 | Ekanadham et al. | | 395/200.8 |
| 5,802,366 A | 9/1998 | Row et al. | | 395/683 |
| 5,819,292 A | 10/1998 | Hitz et al. | | 707/203 |
| 5,819,306 A | 10/1998 | Goldman et al. | | 711/100 |
| 5,832,205 A | 11/1998 | Kelly et al. | | 395/185.06 |
| 5,835,953 A | 11/1998 | Ohran | | 711/162 |
| 5,845,280 A | 12/1998 | Treadwell, III et al. | | 707/8 |
| 5,867,657 A | 2/1999 | Bolosky et al. | | 395/200.49 |
| 5,875,297 A | 2/1999 | Yugawa et al. | | 395/200.32 |
| 5,889,952 A | 3/1999 | Hunnicutt et al. | | 395/200.49 |
| 5,892,917 A | 4/1999 | Myerson | | 395/200.54 |
| 5,898,868 A | 4/1999 | Krueger et al. | | 395/621 |
| 5,905,855 A | 5/1999 | Klaiber et al. | | 395/183.07 |
| 5,907,703 A | 5/1999 | Kronenberg et al. | | 395/681 |
| 5,923,846 A | 7/1999 | Gage et al. | | 395/200.43 |
| 5,926,832 A | 7/1999 | Wing et al. | | 711/141 |
| 5,929,655 A | 7/1999 | Roe et al. | | 326/82 |
| 5,930,831 A | 7/1999 | Marsh et al. | | 711/173 |
| 5,931,918 A | 8/1999 | Row et al. | | 709/300 |
| 5,931,920 A | 8/1999 | Ghaffari et al. | | 710/5 |
| 5,941,969 A | 8/1999 | Ram et al. | | 710/128 |
| 5,948,110 A | 9/1999 | Hitz et al. | | 714/6 |
| 5,950,225 A | 9/1999 | Kleiman | | 711/111 |
| 5,958,061 A | 9/1999 | Kelly et al. | | 714/1 |
| 5,960,180 A | 9/1999 | Gates | | 395/309 |
| 5,963,962 A | 10/1999 | Hitz et al. | | 707/202 |
| 5,978,863 A | 11/1999 | Gates et al. | | 710/18 |
| 6,006,228 A | 12/1999 | McCollum et al. | | 707/9 |
| 6,012,107 A | 1/2000 | Young | | 710/39 |
| 6,018,744 A | 1/2000 | Mamiya et al. | | 707/104 |
| 6,034,963 A | 3/2000 | Minami et al. | | 370/401 |
| 6,038,570 A | 3/2000 | Hitz et al. | | 707/204 |
| 6,065,037 A | 5/2000 | Hitz et al. | | 709/200 |
| 6,070,200 A | 5/2000 | Gates et al. | | 710/20 |
| 6,081,883 A | 6/2000 | Popelka et al. | | 712/28 |
| 6,085,278 A | 7/2000 | Gates et al. | | 710/263 |
| 6,088,740 A | 7/2000 | Ghaffari et al. | | 710/5 |
| 6,105,075 A | 8/2000 | Ghaffari | | 710/5 |
| 6,119,244 A | 9/2000 | Schoenthal et al. | | 714/4 |
| 6,122,674 A | 9/2000 | Olnowich | | 709/250 |
| 6,192,375 B1 | 2/2001 | Gross | | 707/200 |
| 6,192,408 B1 | 2/2001 | Vahalia et al. | | 709/229 |
| 6,226,680 B1 | 5/2001 | Boucher et al. | | 709/230 |
| 6,230,200 B1 | 5/2001 | Forecast | | 709/226 |
| 6,247,060 B1 | 6/2001 | Boucher et al. | | 709/238 |
| 6,256,642 B1 | 7/2001 | Krueger et al. | | 707/205 |
| 6,263,445 B1 | 7/2001 | Blumenau | | 713/201 |
| 6,269,252 B1 | 7/2001 | Hutchings et al. | | 455/552 |
| 6,275,867 B1 | 8/2001 | Bendert et al. | | 709/316 |
| 6,317,844 B1 | 11/2001 | Kleiman | | 714/6 |
| 6,334,153 B2 | 12/2001 | Boucher et al. | | 709/230 |
| 6,351,725 B1 | 2/2002 | Willis et al. | | 703/25 |
| 6,389,479 B1 | 5/2002 | Boucher et al. | | 709/243 |
| 6,393,487 B2 | 5/2002 | Boucher et al. | | 709/230 |
| 6,425,034 B1 | 7/2002 | Steinmetz et al. | | 710/129 |
| 6,427,171 B1 | 7/2002 | Craft et al. | | 709/230 |
| 6,427,173 B1 | 7/2002 | Boucher et al. | | 709/238 |
| 6,434,620 B1 | 8/2002 | Boucher et al. | | 709/230 |
| 6,442,617 B1 | 8/2002 | Lowe et al. | | 709/250 |
| 6,446,141 B1 | 9/2002 | Nolan et al. | | 710/8 |
| 6,457,130 B2 | 9/2002 | Hitz et al. | | 713/201 |
| 6,470,415 B1 | 10/2002 | Starr et al. | | 711/104 |
| 6,484,177 B1 | 11/2002 | Van Huben et al. | | 707/10 |
| 6,487,644 B1 | 11/2002 | Huebsch et al. | | 711/162 |
| 6,564,252 B1 | 5/2003 | Hickman et al. | | 709/214 |
| 6,591,302 B2 | 7/2003 | Boucher et al. | | 709/230 |
| 6,604,118 B2 | 8/2003 | Kleiman et al. | | 707/203 |
| 6,618,794 B1 | 9/2003 | Sicola et al. | | 711/154 |
| 6,640,233 B1 | 10/2003 | Lewis et al. | | 707/205 |
| 6,665,689 B2 | 12/2003 | Muhlestein | | 707/204 |
| 6,668,264 B1 | 12/2003 | Patterson et al. | | 707/205 |
| 6,721,764 B2 | 4/2004 | Hitz et al. | | 707/202 |
| 6,728,735 B1 | 4/2004 | Fong | | 707/204 |
| 6,745,286 B2 | 6/2004 | Staub et al. | | 711/114 |
| 6,748,380 B2 | 6/2004 | Poole et al. | | 707/9 |
| 6,748,510 B1 | 6/2004 | Coatney | | 711/170 |
| 6,751,635 B1 | 6/2004 | Chen et al. | | 707/200 |
| 6,754,773 B2 | 6/2004 | Ulrich et al. | | 711/118 |
| 6,766,430 B2 | 7/2004 | Arakawa et al. | | 711/165 |
| 6,775,792 B2 | 8/2004 | Ulrich et al. | | 714/6 |
| 6,785,822 B1 | 8/2004 | Sadhwani-Tully | | 713/201 |
| 6,799,284 B1 | 9/2004 | Patel et al. | | 714/6 |
| 6,826,615 B2 | 11/2004 | Barrall et al. | | 709/227 |
| 6,829,720 B2 | 12/2004 | Schoenthal et al. | | 714/4 |
| 6,871,224 B1 | 3/2005 | Chu et al. | | 709/224 |
| 6,894,976 B1 | 5/2005 | Banga et al. | | 370/235 |
| 6,895,429 B2 | 5/2005 | Banga et al. | | 709/215 |
| 6,901,509 B1 | 5/2005 | Kocher | | 713/158 |
| 6,907,457 B2 * | 6/2005 | Merrell | | G06F 3/0623 |
| | | | | 707/999.2 |
| 6,910,154 B1 | 6/2005 | Schoenthal | | 714/18 |
| 6,920,579 B1 | 7/2005 | Cramer et al. | | 714/4 |
| 6,920,580 B1 | 7/2005 | Cramer et al. | | 714/4 |
| 6,928,478 B1 | 8/2005 | Gangadharan | | 709/226 |
| 6,934,822 B2 | 8/2005 | Armangau et al. | | 711/162 |
| 6,944,785 B2 * | 9/2005 | Gadir | | G06F 11/2005 |
| | | | | 714/4.11 |
| 6,961,749 B1 | 11/2005 | Kleiman | | 709/203 |
| 6,981,104 B2 | 12/2005 | Prabhu | | 711/144 |
| 6,983,296 B1 | 1/2006 | Muhlestein et al. | | 707/206 |
| 7,003,780 B2 | 2/2006 | Peloquin et al. | | 719/321 |
| 7,007,046 B2 | 2/2006 | Manley et al. | | 707/204 |
| 7,010,553 B2 | 3/2006 | Chen et al. | | 707/203 |
| 7,017,084 B2 | 3/2006 | Ng et al. | | 714/45 |
| 7,039,663 B1 | 5/2006 | Federwisch et al. | | 707/205 |
| 7,039,827 B2 | 5/2006 | Meyer et al. | | 714/4 |
| 7,039,828 B1 | 5/2006 | Scott | | 714/4 |
| 7,076,509 B1 | 7/2006 | Chen et al. | | 707/202 |
| 7,080,223 B2 | 7/2006 | Dewey | | 711/162 |
| 7,120,767 B2 | 10/2006 | Hara et al. | | 711/161 |
| 7,225,204 B2 | 5/2007 | Manley et al. | | 707/200 |
| 7,373,366 B1 | 5/2008 | Chatterjee et al. | | 707/204 |
| 2002/0049718 A1 | 4/2002 | Kleiman et al. | | 707/1 |
| 2002/0062387 A1 | 5/2002 | Yetziv | | 709/236 |
| 2002/0120763 A1 | 8/2002 | Miloushev et al. | | 709/230 |
| 2003/0182313 A1 | 9/2003 | Federwisch et al. | | 707/200 |
| 2014/0074808 A1 | 3/2014 | Barrall et al. | | 707/695 |

FOREIGN PATENT DOCUMENTS

| | | | |
|---|---|---|---|
| EP | 0482851 | 4/1992 | G06F 3/06 |
| EP | 0367183 | 3/1996 | G06T 1/20 |
| EP | 0725351 | 8/1996 | G06F 13/36 |
| EP | 0774723 | 5/1997 | G06F 17/30 |
| EP | 0388050 | 6/1997 | G06F 17/30 |
| EP | 0490973 | 2/1998 | G06F 17/30 |
| EP | 0837402 | 4/1998 | G06F 17/30 |
| EP | 0853413 | 7/1998 | H04L 29/06 |
| EP | 0278315 | 8/1998 | G06F 9/46 |
| EP | 0490980 | 5/1999 | G06F 15/16 |
| EP | 0994425 | 4/2000 | G06F 17/30 |
| IL | 88165 | 10/1988 | G06F 15/76 |
| JP | 62-192850 | 8/1987 | G06F 15/16 |
| JP | 63-200244 | 8/1988 | G06F 12/00 |
| JP | 05-108443 | 4/1993 | G06F 12/00 |
| JP | 08-227371 | 9/1996 | G06F 12/00 |
| JP | 10-124400 | 5/1998 | G06F 12/16 |
| JP | 2945757 | 6/1999 | G06F 15/177 |
| JP | 2002-132455 | 10/2002 | G06F 3/06 |
| WO | WO 84/03376 | 8/1984 | G06F 3/04 |

(56) References Cited

FOREIGN PATENT DOCUMENTS

| WO | WO 86/03607 | 6/1986 | G06F 13/12 |
|---|---|---|---|
| WO | WO 89/03086 | 4/1989 | G06F 9/46 |
| WO | WO 91/03788 | 3/1991 | G06F 15/16 |
| WO | WO 91/04540 | 4/1991 | G06E 15/16 |
| WO | WO 91/11768 | 8/1991 | G06F 13/38 |
| WO | WO 92/01990 | 2/1992 | G06F 15/16 |
| WO | WO 98/19412 | 5/1998 | H04J 3/16 |
| WO | WO 98/38576 | 9/1998 | G06F 11/10 |
| WO | WO 98/50852 | 11/1998 | G06F 9/38 |
| WO | WO 99/30254 | 6/1999 | G06F 17/30 |
| WO | WO 99/42934 | 8/1999 | G06F 17/30 |
| WO | WO 99/45456 | 9/1999 | G06F 1/00 |
| WO | WO 99/46680 | 9/1999 | G06F 11/14 |
| WO | WO 99/65219 | 12/1999 | H04M 11/06 |
| WO | WO 99/66401 | 12/1999 | G06F 11/14 |
| WO | WO 00/07104 | 2/2000 | G06F 11/14 |
| WO | WO 00/11553 | 3/2000 | G06F 11/14 |
| WO | WO 01/28179 | 4/2001 | H04L 29/00 |
| WO | WO 02/27462 | 4/2002 | G06F 3/06 |
| WO | WO 02/069159 | 9/2002 | G06F 13/00 |
| WO | WO 2004/042583 | 5/2004 | G06F 12/00 |
| WO | WO 2004/042618 | 5/2004 | G06F 17/30 |

OTHER PUBLICATIONS

Advanced Program-to-Program Communication (APPC), the Internet, International Business Machines website, www-3.ibm.com/software/network/technology/appnhpr/appc.html.; accessed Aug. 8, 2003.

ARPENET Information Brochure, the Internet, www.undergroundnews.com/files/texts/under-ground/hacking/arpa.htm, Dec. 1985.

Auslander et al., "The Evolution of the MVS Operating System," IBM J. Res. Develop.; vol. 25, No. 5, pp. 471-482; Sep. 1981.

Bashe et al., "The Architecture of IBM's Early Computers," IBM J. Res. Develop., vol. 25, No. 5, pp. 363-375; Sep. 1981.

Chambers et al., "Distributed Computing," Chapter 9, Sections 9.4.2-9.5.1, p. 144; Chapter 10, Sections 10.3.2-10.3.4, pp. 153-154; Chapter 11, p. 172 and 176-177; Chapter 13, Sections 13.1-13.4, pp. 193-199; Chapter 17, Section 17.1-17.4, pp. 239-250; Chapter 20, Sections 20.1-20.5, pp. 277-288; Academic Press, 1984.

Chesson, G., "Protocol Engine Design," Proc. $10^{th}$ Summer 1987 USENIX Conference, pp. 209-215, Phoenix, AZ, Jun. 1987.

Chow et al., "Distributed Control of Computer Systems," IEEE Transactions on Computers, Vo. C-35, No. 6, pp. 564-567, Jun. 1986.

"Common Program Interface for Communications" (CPI-C), the Internet; International Business Machines Website, www-3.ibm.com/software/network/technology/appnhpr/cpic.html; accessed Aug. 8, 2003.

Cooper et al., "Protocol Implementation on the Nectar Communication Processor," {SIGCOMM} Symposium on Communications Architectures and Protocols, Philadelphia, PA, pp. 135-144, 1990.

Crocker, S. "Initiating the ARPANET," Matrix News, 10(3), Mar. 2000.

Dittia et al., "The APIC Approach to High Performance Network Interface Design: Protected DMA and Other Techniques," Washington University Technical Report WUCS-96-12, 1996.

Drapeau et al., Raid-II: A High-Bandwidth Network File Server, "Proceedings of the 21st Annual International Symposium on Computer Architecture", pp. 234-244, 1994.

Druschel et al., Experiences with a High-Speed Network Adaptor: A Software Perspective, SIGCOMM, pp. 2-13, 1994.

Druschel et al., "Network Subsystem Design: A Case for an Integrated Path," IEEE *Network*, vol. 7, No. 4, IEEE, pp. 8-17, 1993.

Farley, Marc, "Building Storage Networks," Chapter 14 Accessing Data on S/390 MVS Mainframes from a SAN, Osborne/McGraw-Hill, 2000.

Hall et al., A Comparative Study of High Speed Networks, www.ieee-infocom.org/1998/papers/06c_3.pdf, 1998.

Hariri, S., ECE 677X: High Performance Distributed Computing Systems, University of Arizona, www.ece.arizona.edu/~hpdc,1999.

"HDLC LAPB & NRM Level 2 Protocols," IBM HDLC Protocol Tutorial, the Internet, www.jbmelectronics.com/product/hdlc.htm, accessed Aug. 7, 2003.

"Introduction to APPC," Yale University, the Internet, www.yale.edu/pclt/COMM/APPC.HTM, Feb. 8, 1995.

"Introduction to SNA," Yale University, the Internet, www.yale.edu/pclt/COMM/SNA.HTM, Feb. 2, 1995.

Jarema et al., "IBM Data Communications: A Quarter Century of Evolution and Progress," IBM J. Res. Develop., vol. 25, No. 5, Sep. 1981.

Kanakia et al., "The VMP Network Adapter Board (NAB): High-Performance Network Communication for Multiprocessors," Proc. ACM SIGCOMM 88, Aug. 1988.

Kshemkalyani et al., "Scalability of Advanced Peer-to-Peer Networking (APPN) Networks," the Internet, International Business Machines website, www-3.ibm.com/soft-ware/network/technology/appnhpr/appn_acalability.html, Mar. 21, 1997.

"MicroMAP 1-7," MicroMAP Manufacturing Automation Protocol Software, Motorola Microsystems Products Technical Data, Motorola, Inc. 1986.

Mukherjee et al., "Making Network Interfaces Less Peripheral," IEEE Computer, vol. 31, No. 10, pp. 70-76, 1998.

Mullender et al., "Amoeba A Distributed Operating System for the 1990s," Computer, IEEE, pp. 44-51, Jan. 1990.

Mullender et al., "The Design of a Capability-Based Distributed Operating System," The Computer Journal, vol. 29, No. 4, 1986.

Mullender et al., "A Distributed File Service Based on Optimistic Concurrency Control," Proceedings of the $10^{th}$ ACM SIGOPS Conference, pp. 51-62, Association for Computing Machinery, Inc.,1985.

Mullender et al., "Protection and Resource Control in Distributed Operating Systems," Computer Networks, vol. 8, pp. 421-432, Oct. 1984.

O'Connell et al., "JFS: A Secure Distributed File System for Network Computers," the Internet, citeseer.nj.nec.com/392625.html, 1999 and Trinity College Dublin Technical Reports, www.cs.tcd.ie/publications/tech-reports/.

Osadzinski, A., "The Network File System, Computer Standards & Interfaces," 8, No. 1, pp. 45-48, 1988/1989.

Padegs, A., "System/360 and Beyond," IBM J. Res. Develop., vol. 25, No. 5, Sep. 1981.

Perkins, A., "Larry Boucher Hangs Ten," Red Herring, the Internet, www.redherring.com/mag/issue03/ ten.html, Aug. 1993.

Peters, M., What is High Performance Routing?(HPR), the Internet, International Business Machines website, www.3.ibm.com/soft-ware/network/tech-nology/appnhpr/hpr_wp.html, accessed Aug. 8, 2003.

Poor, V., "The Concept of Attached Processing and Attached Resource Computer Systems", Symposium on Small Systems, Proceedings of the First Sigmini Symposium on Small Systems, Chairman Paul A.V. Thomas, pp. 109-116, 1978.

Psounis, K., "Active Networks: Applications, Security, Safety, and Architectures," IEEE Communications Surveys, First Quarter 1999, pp. 1-6, 1999.

Satyanarayanan, M., A Survey of Distributed File Systems, Dept. of Computer Science, Carnegie Mellon University, the Internet, citeseer.ist.psu.edu/satyanarayanan89survey.html 1989.

"SDLC (HDLC Normal Response Mode)," JBM SDLC Protocol Tutorial, the Internet, www.jbmelectronics.com/product/sdls.htm, accessed Aug. 7, 2003.

Stankovic, J., "A Perspective on Distributed Computer Systems," IEEE Transactions on Computers, vol. c-33, No. 12, Dec. 1984.

Sullivan, T., "Communications Network Management Enhancements for SNA Networks: An Overview," IBM Systems Journal, vol. 22, Nos. 1 2, 1983.

Svobodava, L., "File Servers for Network-Based Distributed Systems," Computing Surveys, vol. 16, No. 4, pp. 353-398, Dec. 1984.

Tanenbaum, A., "Computer Networks," Chapter 1, Section 1.7.2 pp. 35-36, Chapter 9, pp. 528-607, Second Edition, Prentice Hall, 1988.

Traw et al., "Hardware/Software Organization of a High Performance ATM Host Interface," IEEE Journal on Selected Areas in

(56) References Cited

OTHER PUBLICATIONS

Communications (Special Issue on High Speed Computer/Network Interfaces), vol. 11, No. 2, pp. 240-253, 1993.
Van Renesse et al., "The Design of a High-Performance File Server," IEEE Transactions on Knowledge and Data Engineering, vol. 1, No. 2, pp. 22-27, Jun. 1989.
Cheriton, An Experiment using Registers for Fast Message-Based Interprocessor Communication, p. 12-20.
Gage, "Real World Implementation of Upper Level Protocols," Mini/Micro West, Session 3/1, p. 1-5, Nov. 8-11, 1983.
Lien, "Experience in Implementing XNS Protocols," Mini/Micro West, Session 3/2, p. 1-7, Nov. 8-11, 1983.
Ennis, "Upper Level Protocols for Broadband Local Networks," Mini/Micro West, Session 3/3, p. 1-5, Nov. 8-11, 1983.
Ennis, "Netbios: IBM's PC interface for distributed applications," Systems & Software, Dec. 1984.
Cheriton, "Local Networking and Internetworking in the V-System," ACM, 1983.
Cheriton, "The V Distributed System," Communications of the ACM, vol. 31, No. 3, Mar. 1988, pp. 314-333.
Hitz et al., "Using Unix as One Component of a Lightweight Distributed Kernel for Multiprocessor File Servers," USENIX, Jan. 22-26, 1990.
Pawlowski et al., "Network Computing in the UNIX and IBM Mainframe Environment," UniForum 1989, p. 287-302.
Powers, "A Front-End TELNET/Rlogin Server Implementation," UniForum 1986 Conference Proceedings, p. 27-40.
Thacker et al., "Firefly: A Multiprocessor Workstation," Digital Systems Research Center, Dec. 30, 1987.
Van de Goor et al., "UNIX I/O in a Multiprocessor System," USENIX Winter Conference Feb. 9-12, 1988, 17 pages.
Solomon et al., *Hardware Support for Interprocess Communication*, Association for Computing Machinery, Doc. No. ACM 0084-7495/87/0600-0178$00.75, 1987, 11 pages.
Ramakrishnan et al., *A Model of File Server Performance for a Heterogeneous Distributed System*, Association for Computing Machinery, Doc. No. ACM 0-89791-201-2/86/0800-0338, 1986, 10 pages.
Swinehart et al., *WFS: A Simple Shared File System for a Distributed Environment*, Association for Computing Machinery, Doc. No. ACM 0-89791-009-5/79/1200/0009, 1979, 9 pages.
Tanenbaum et al., *AMOEBA System*, Communications of the ACM, vol. 33, No. 12, Dec. 1990, 46-63, 18 pages.
Schwartz et al., *LFS—A Local File System for Multiprocessor NFS Network Servers*, Auspex Systems Inc., Technical Report 4, Dec. 1989, Internet http://www.concentric.net/~Ams/auspex/Tech4/Tech4.toc.html, Accessed Aug. 11, 2003, 16 pages.
Sunshine et al., *Broad-Band Personal Computer LAN's*, IEEE Journal on Selected Areas in Communications, vol. SAC-3, No. 3, May 1985, Doc. No. 0733-8716/85/0500-0408, 8 pages.
Barrera, *A Fast Mach Network IPC Implementation*, USENIX Association Mach Symposium, 11 pages.
Dally et al., *Architecture of a Message-Driven Processor*, Association for Computing Machinery, Doc. No. ACM 0084-7495/87/0600-0189, 1987, 8 pages.
Giloi, *SUPRENUM: A trendsetter in modern supercomputer development*, Parallel Computing, Elsevier Science Publishers B.V. (North-Holland), 1987, 40 pages.
Spector, *Multiprocessing Architectures for Local Computer Networks*, A Dissertation Submitted to the Dept. of Computer Science and the Com. on Graduate Studies of Stanford University in Partial Fulfillment of the Requirements for the Degree of Doctor of Philosophy, Aug. 1981, 65 pages.
Owicki, *Experience with the Firefly Multiprocessor Workstation*, Digital Equipment Corp., Sep. 15, 1989.
Tanenbaum et al., *Distributed Operating Systems*, Computing Surveys, vol. 17, No. 4, Dec. 1985.
Nelson et al., *The Unix environment merges with a network-distributed system*, Electronics, Feb. 9, 1984, pp. 131-134.

Way, *Front-end processors smooth local network-computer integration*, Electronics, Feb. 9, 1984, pp. 135-139.
Berglund, *An Introduction to the V-System*, IEEE Micro, Aug. 1986, pp. 35-52.
Cheriton, *The V Kernel: A Software Base for Distributed Systems*, IEEE Software, Apr. 1984, pp. 19-40.
Cheriton, *The Design of a Distributed Kernel*, ACM '81, Nov. 9-11, 1981, pp. 46-52.
Dibble et al., *Bridge: A High-Performance File System for Parallel Processors*.
Douglis et al., *A Comparison of Two Distributed Systems: Amoeba and Sprite*.
Sandberg et al., *Design and Implementation of the Sun Network Filesystem*, Summer '85 Usenix.
Tanenbaum et al., *The Amoeba Distributed Operating System*.
Thekkath et al., *Frangipani: A Scalable Distributed File System*, In Proceedings of the 16$^{th}$ ACM Symposium on Operating Systems Principles, Oct. 1997, 14 pages.
Preslan et al., *A 64-bit, Shared Disk File System for Linux*, 16$^{th}$ IEEE Symposium on Mass Storage Systems, Mar. 15-18, 1999, pp. 22-41.
Kim et al., *Volume Management in SAN Environment*, Electronics and Telecommunications Research Institute, IEEE, Doc. No. XP010551728, Jun. 26, 2001, pp. 500-505.
Cardoza et al., *Overview of Digital UNIX Cluster System Architecture*, Digest of Papers of Compcon (Computer Society Conference) 1996 Technologies for the Information Superhighway, Feb. 25-28, 1996, Doc. No. XP010160905, pp. 254-259.
Ousterhout et al., *The Sprite Network Operating System*, University of California Berkeley, IEEE, Feb. 1988, pp. 23-36.
Ennis, *PC Network Services for Distributed System Design*, IEEE Compcon Spring 1986, Mar. 1986, pp. 1-10.
Solomon et al., *The Roscoe Distributed Operating System*, University of Wisconsin, ACM, May 1979, pp. 108-114.
Sandberg, Russel, *The Sun Network Filesystem: Design, Implementation and Experience*, Sun Microsystems, Inc., pp. 1-16.
Kelly, P., *Functional Programming for Loosely-coupled Multiprocessors*, The MIT Press, ISBN 0-273-08804-1,1989, pp. 1-4.
Panjwani, Mahmood, *NFS on ISDN*, UniForum 1988 Conference Proceedings, Dallas, TX, pp. 171-181.
Roy, Paul, *Unix File Access and Caching in a Multicomputer Environment*, OSF Research Institute, Usenix Association, Mach III Symposium, pp. 21-37.
Kupfer, Michael, *Sprite on Mach*, University of California, Berkeley, Usenix Association, Mach III Symposium, pp. 307-322.
Schroder, W., *PEACE: The distributed SUPRENUM operating system*, Parallel Computing 7 (1988) North-Holland, pp. 325-333.
Bechtolsheim et al., *The SUN Workstation Architecture*, Computer Systems Laboratory, Departments of Electrical Engineering and Computer Science, Stanford University, Technical Report No. 229, Mar. 1982, pp. 1-15.
Welch, B., *The File System Belongs in the Kernel*, Xerox PARC, Usenix Association, Mach Symposium, pp. 233-247.
Bechtolsheim et al., *The SUN Workstation Architecture*, Computer Systems Laboratory, Departments of Electrical Engineering and Computer Science, Stanford University, Technical Report No. 229, Jan. 15, 1982, 55 pages.
Kleiman, *Vnodes: An Architecture for Multiple File System types in Sun Unix*, Sun Microsystems, Usenix 1986 Summer Technical Conference & Exhibition, Georgia, Jun. 9-13, 1986, pp. 238-394.
Spanier, S., *Comparing distributed file systems, Excelan Inc.*, Data Communications, Dec. 1987, pp. 173-186.
Lupper, A., *Distributed File Systems*, Department of Computer Science, University of Ulm, 1995, 25 pages.
Howard et al., *Scale and Performance in a Distributed File System*, Carnegie Mellon University, ACM Transactions on Computer Systems, vol. 6, No. 1, Feb. 1988, pp. 51-81.
Rieken et al., *Adventures in . . . UNIX Kernel Structure and Flow*, .sh consulting inc., California, Jun. 1990, 253 pages.
Tannenbaum et al., *Research Issues in Distributed Operating Systems*, Department of Mathematics and Computer Science, Vrije Universiteit, The Netherlands, 10 pages.

(56) References Cited

OTHER PUBLICATIONS

Mahalingam, et al., *Data Migration in a Distributed File Service*, Hewlett-Packard Company, HPL-2001-128, May 23, 2001, 12 pages.
Zhang et al., *Cross-Partition Protocols in a Distributed File Service*, Hewlett-Packard Company, HPL-2001-129, May 23, 2001, pp. 1-21.
Karamanolis et al., *An Architecture for Scalable and Manageable File Services*, Hewlett-Packard Company, HPL-2001-173, Jul. 12, 2001, pp. 1-14.
Muntz, D., *Building a Single Distributed File System from Many NFS Servers*, Hewlett-Packard Company, HPL-2001-176, Jul. 12, 2001, 5 pages.
Karamanolis, et al., *DiFFS: a Scalable Distributed File System*, Hewlett-Packard Company, HPL-2001019, Jan. 24, 2001, 7 pages.
Carson, K, *Storage in the WAN*, Ciprico Inc., Jul. 2001, pp. 1-4.
Levy et al., *Distributed File Systems: Concepts and Examples*, ACM Computing Surveys, vol. 22, No. 4, Dec. 1990 54 pages.
*The Cisco Dynamic Feedback Protocol—White Paper*, Cisco Systems, Inc., 1999, 3 pages.
Pai et al., *Locality-Aware Request Distribution in Cluster-based Network Servers*, ASPLOS VIII Oct. 1998, pp. 205-216.
Cherkasova, L., *FLEX: Load Balancing and Management Strategy for Scalable Web Hosting Service*, Hewlett-Packard Labs, 6 pages.
*Microsoft Windows NT Load Balancing Service—White Paper*, 1999.
Cheriton, D., *Distributed Systems—CS244B Course Notes*, vol. 1, Stanford University, Mar. 25, 1999.
Garcia-Molina, H., *Elections in a Distributed Computing System*, IEEE Transactions on Computers, C-31(1): Jan. 1982, pp. 48-59.
Halpern et al., *Knowledge and Common Knowledge in a Distributed Environment*, IBM Research Journal 4421, 1986, pp. 1-46.
Microsoft Corp., *Microsoft Windows NT clusters*, White Paper, Nov. 1997.
Siemens Inc., *Primecluster—Concepts Guide*, Oct. 2001, pp. 1-80.
Sistine Inc., *GFS Howto/Red Hat Global File System*, 2001, 4 pages.
Stoller, S., *Leader Election in Distributed Systems with Crash Failures*, Indiana University CS Dept., 1997, pp. 1-15.
Nelson et al., *An Overview of Functional Multiprocessing for NFS Network Servers*, Auspex, Technical Report 1, Sixth Edition, Second Printing, Aug. 1992, pp. 1-27.
Berglund et al., *Amaze: A Distributed Multi-Player Game Program using the Distributed V Kernel*, The 4th International Conference on Distributed Computing Systems, May 14-18, 1984, San Francisco, IEEE Computer Society, pp. 248-297.
Theimer et al., *Preemptable Remote Execution Facilities for the V-System*, Computer Science Department, Stanford University, ACM, 1985, pp. 2-12.
Tan et al., *SOS—Stan's Own Server a NFS file server for the IBM PC*, Computer Science Research Department, Information & Computing Sciences Division, Lawrence Berkeley Laboratory, Aug. 1988, pp. 1-4.
*DOD Standard Transmission Control Protocol*, Information Sciences Institute, University of Southern California, Jan. 1980, pp. 1-87.
*Transmission Control Protocol DARPA Internet Program Protocol Specification*, Internet Engineering Task Force RFC 793, Sep. 1981, pp. 1-88.
Postel, J., *User Datagram Protocol*, Internet Engineering Task Force RFC 768, Aug. 28, 1980, pp. 1-3.
*An American National Standard IEEE Standard for a Versatile Backplane Bus: VMEbus*, The Institute of Electrical and Electronics Engineers, Inc., Mar. 28, 1988, pp. 1-320.
Hornig, C., *A Standard for the Transmission of IP Datagrams over Ethernet Networks*, Internet Engineering Task Force RFC 894, Apr. 1984, 3 pages.
Patterson et al., *A Case for Redundant Arrays of Inexpensive Disks (RAID)*, Computer Science Division, Department of Electrical Engineering and Computer Science, University of California Berkeley, ACM, 1988, pp. 109-116.
Barkley, John, *NISTIR 5277 Comparing Remote Procedure Calls*, online <http://hissa.nist.gov/rbac/5277/titlerpc.html>, Oct. 1993, 2 pages.
Peterson et al., *VMEbus Frequently Asked Questions (FAQ)*, online <http://www.vita.com/vmefaq/>, Dec. 5, 2000, printed Jul. 22, 2003, 17 pages.
*Remote Procedure Call*, WebServices definition, online <http://searchwebservices.techtarget.com/sDefinition/0,,sid26-gci214272,00.html>, printed Jul. 22, 2003, 3 pages.
*NDMP*, searchNetworking definition, online <http://searchnetworking.techtarget.com/sDefinition/0,,sid7_gci837192,00.html>, printed Aug. 2, 2003, 2 pages.
*Remote Procedure Call*, Software Technology Review, online <http://www.sei.cmu.edu/str/descriptions/rpc_body.html>, printed Jul. 22, 2003, 4 pages.
Carriero et al., *The S/Net's Linda Kernel*, ACM Transactions on Computer Systems, vol. 4, No. 2, May 1986, pp. 110-129.
Birrell et al., *A Universal File Server*, IEEE Transactions on Software Engineering, vol. SE-6, No. 5, Sep. 1980, pp. 450-454.
McKusick et al., *Design of a General Purpose Memory Allocator for the 4.3BSD UNIX Kernel*, Summer USENIX '88, San Francisco, Jun. 20-24, 1988, pp. 295-303.
Birrell et al., *Implementing Remote Procedure Calls*, ACM Transactions on Computer Systems, vol. 2, No. 1, Feb. 1984, pp. 39-59.
*NFS: Network File System Protocol Specification*, Internet Engineering Task Force RFC 1094, Mar. 1989, pp. 1-26.
Cheriton et al., *Thoth, a Portable Real-Time Operating System*, Communications of the ACM, vol. 22, No. 2, Feb. 1979 pp. 105-115.
Marzullo et al., *Supplying High Availability with a Standard Network File System*, Department of Computer Science, Cornell University, IEEE, 1988, pp. 447-453.
*The period 1986-1990 Datacommunication and the PC local area network*, online http://www.tno.nl.instit/fel/museum/computer/en/comp863E.html, printed Aug. 11, 2003, 3 pages.
McLeod, B. *Sacrifices to Ra or Learning to Administer a Sun Network*, EUUG Autumn '88—Cascais, Oct. 3-7, 1988, pp. 249-252.
Cheriton et al., *V-System 6.0 Reference Manual* including Part II: V Programming and Part III: V Servers, Jun. 20, 1986, pp. 1-1 to 46-1.
Tanenbaum, et al., *Research Issues in Distributed Operating Systems*, Dept. of Mathematics and Computer Science, Vrije Universiteit, Amsterdam, The Netherlands, 10 pages.
*Computers & peripherals—Small unit has multiprocessor architecture*, Electronics, Feb. 9, 1984, p. 161.
van Renesse et al., *Wide-Area communication under Amoeba*, Vrije Universiteit, Amsterdam, pp. 1-12.
van Renesse et al, *Connecting RPC-Based Distributed Systems Using Wide-Area Networks*, Dept. of Mathematics and Computer Science, Vrije Universiteit, Amsterdam, The Netherlands, pp. 108-119.
Draves, R., *A Revised IPC Interface*, USENIX Association, Mach Workshop, pp. 101-121.
Cheriton, D., *VMTP: Versatile Message Transaction Protocol—Protocol Specification*, Internet Engineering Task Force RFC 1045, Feb. 1988, 128 pages.
*Internet Protocol DARPA Internet Program Protocol Specification*, Internet Engineering Task Force RFC 791, Sep. 1981, pp. 1-49.
*XDR: External Data Representation Standard*, Internet Engineering Task Force RFC 1014, Jun. 1987, 19 pages.
*RPC: Remote Procedure Call Protocol Specification Version 2*, Internet Engineering Task Force RFC 1057, Jun. 1988, 24 pages.
Zwaenepoel, W., *Message Passing on a Local Network*, Department of Computer Science, Stanford University, Report No. STAN-CS-85/1083, Oct. 1985, pp. 1-101.
*Abstract—Communications Controller for bidirectional data transfer includes separate bus segments operating to interconnect microprocessor with communication network and arbitration logic*, Derwent Publications Ltd, London, England, 1986, 1 page.

(56) References Cited

OTHER PUBLICATIONS

Ennis, G., *The LocalNet/PC Protocols: An Overview*, Sytek, Incorporated, Aug. 3, 1984, 22 pages.
Cardinal, D., *File Server Offers Transparent Access to Design Tools*, Computer Design, Jun. 1985, 5 pages.
Coronminas et al., *A VLSI Implementation of a SMDS Attachment Unit over an ICI interface*, Melecon '96, XP-001001248, May 13, 1996, pp. 373-376.
Jovanov et al., *Hardware Implementation of Some DBMS Functions using SPR*, System Sciences, 1992, Jan. 7, 1992, pp. 328-337.
Bowman, R., *Multitasking keys SCSI control of large SMD-compatible disks*, Electronic Design, Jun. 25, 1987, pp. 89-94.
Strang, C., *A New Family of SCSI Protocol Controller Chips, Designed with Modular Standard Cell Approach*, Texas Instrument, Inc., pp. 119-124.
Taylor et al., *VLSI Node Processor Architecture for Ethernet*, IEEE Journal on Selected Areas in Communications, vol. SAC-1, No. 5, Nov. 1983, pp. 733-739.
Hennessy et al., *Computer Organization and Design the Hardware/Software Interface*, Morgan Kaufmann Publishers, Inc., Chapters 8 and 9, 1998, pp. 655-740, plus Glossary.
Culler et al., *Parallel Computer Architecture, a Hardware/Software Approach*, Morgan Kaufmann Publishers, Inc., Chapter 1, 1999, pp. 25-42.
Nowicki, B., *Transport Issues in the Network File System*, Sun Microsystems, Mar. 8, 1989, 5 pages.
*Computer Design Special Report: Advanced Digital ICs*, A PennWell Publication, Feb. 1983, 7 pages.
*Ethernet compatible frontend processor*, Computer Design, PennWell, Apr. 5, 1983, 7 pages.
Wright, M., *Intelligent Ethernet Boards*, EDN, vol. 33 No. 13, 5 pages.
McGraw, T., *New hardware cuts price of graphics power*, Government Computer News, vol. 7, No. 8, Apr. 15, 1998, 2 pages.
Martin, S., *Peripheral controller ICs gain speed and flexibility*, Computer Design, Jun. 15, 1988, pp. 41-45.
Martin, S., *IC vendors keep pace with peripheral control requirements*, Computer Design, Jun. 15, 1987, 9 pages.
Fong et al., *Build a high-performance SCSI bridge controller*, Electronic Design, Jul. 9, 1987, pp. 107-111.
Israel et al., *Eliminating Data Copies in UNIX-based NFS Servers*, UniForum 1989 Conference Proceedings, San Francisco, pp. 261-272.
Poor, V., *The Concept of Attached Processing and Attached Resource Computer Systems*, Datapoint Corporation, pp. 110-116.
Row, J., *LAN Software Links Diverse Machines, OS's*, Mini-Micro Systems, Sep. 1985, 4 pages.
West et al., *Local networks for computer communications*, IFIP Working Group 6.4, International Workshop on Local Networks, Aug. 27-29, 1980, North-Holland Publishing Company, 1980, 20 pages.
*Network controllers grow smarter/smaller*, Computer Design, Dec. 1983, 4 pages.
Vizard, M., *1988 Sees DEC Take a New Tack: Won't Go It Alone*, Digital Review, Dec. 19, 1998, 4 pages.
*Le reseau local d'ordinateurs personnels*, IBM, Oct. 26, 1985, 8 pages (French).
Stein, M., *The Sun Network File System*, Sun Microsystems, Inc., Jan. 1987, 1 page.
Didio, L., *Sun eases networking of diskless workstations*, Network World, vol. 5, No. 15, Apr. 11, 1999, 2 pages.
Reid et al., *TCP/IP PrintServer: Print Server Protocol*, WRL Technical Note TN-4, Sep. 1988, 16 pages.
Kent. C., *TCP/IP PrintServer: Server Architecture and Implementation*, WRL Technical Note TN-7, Nov. 1988, 22 pages.
*NX 200 Network Executive Reference Manual*, Excelan Inc., Publication No. 4200036-00, May 28, 1986, 234 pages.
Scott, K., *IBM Software Lets Host Act as NFS File Server*, Connectivity, Aug. 29, 1988, 1 page.
Coulouris et al., *Distributed Systems, Concepts and Design*, International Computer Science Series, 1988, pp. 1-366.
Williams, T., *Serial buses provide small area networks between system ICs, and modules*, Computer Design, Jan. 1983, p. 40.
Associated Computer Consultants, *Protocol package accesses transparently*, Computer Design, May 1983, pp. 30, 32 and 34.
Taylor et al., *Secure Networking in the Sun Environment*, Sun Microsystems, Inc., USENIX Association Conference Proceedings, 1986 Summer, pp. 28-37.
Rifkin et al., *RFS Architectural Overview*, AT&T, USENIX Association Conference Proceedings, 1986 Summer, pp. 248-259.
Rodriguez et al., *The Generic File System*, ULTRIX Engineering and Advanced Development Group, Digital Equipment Corporation, USENIX Association Conference Proceedings, 1986 Summer, pp. 260-269.
Gould, E., *The Network File System Implemented on 4.3BSD*, MT XINU, USENIX Association Conference Proceedings, 1986 Summer, pp. 294-298.
Rosen et al., *NFS Portability*, The Instruction Set Ltd., USENIX Association Conference Proceedings, 1986 Summer, pp. 299-305.
Hughes, R., *The Transparent Remote File System*, Integrated Solutions, Inc., USENIX Association Conference Proceedings, 1986 Summer, pp. 306-317.
Ghodssi et al., *A Global Optimizer for Sun FORTRAN, C & Pascal*, Sun Microsystems, Inc., USENIX Association Conference Proceedings, 1986 Summer, pp. 318-334.
Hitz et al., *A Mail File System for Eighth Edition UNIX*, Computer Science Department, Princeton University, USENIX Association Conference Proceedings, 1986 Summer, pp. 28-37.
Chang, J., *SunNet*, Sun Microsystems, Inc., USENIX Association Conference Summer 1985, pp. 71-78.
Ferrin, T., *A Recipe for Establishing Point-to-Point TCP/IP Network Links with 4.2 BSD UNIX*, Computer Graphics Laboratory School of Pharmacy, University of California, USENIX Association Conference Summer 1985, pp. 113-118.
Cole, et al., *An Implementation of an Extended File System for UNIX*, MASSCOMP, USENIX Association Conference Summer 1985, pp. 131-149.
Lyon et al., *All the Chips that Fit*, Sun Microsystems, Inc. USENIX Association Conference Summer 1985, pp. 557-561.
Finger, et al., *A Multi-CPU Version of the Unix Kernel of Technical Aspects and Market Need*, MASSCOMP Engineering, USENIX Association Conference Winter 1985, pp. 11-21.
Requa, J., *UNIX Kernel Networking Support and the Lincs Communications Architecture*, Lawrence Livermore National Laboratory, USENIX Association Conference Winter 1985, pp. 98-103.
Uttal, et al., *Transparent Integration of UNIX and MS-DOS*, Locus Computing Corporation, USENIX Association Conference Winter 1985, pp. 104-116.
Walsh, et al., *Overview of the Sun Network File System*, Sun Microsystems, Inc., USENIX Association Conference Winter 1985, pp. 117-124.
Lichtenstein, W., *The Architecture of the Culler 7*, Culler Scientific Systems Corporation, IEEE computer Society Compcon Spring '86, Mar. 3-6, 1986, pp. 467-470.
*Culler Announces First Personal Supercomputer*, The Journal Record, May 7, 1986, 1 page.
*Sun Microsystems Inc. and Culler Scientific Systems Announce Joint Sales and Marketing Venture*, PR Newswire, Oct. 25, 1985, 1 page.
Gosling, J., *SunDew: A Distributed and Extensible Window System*, Sun Microsystems, USENIX Technical Conference, Winter 1986, pp. 98-103.
Straathof et al., *UNIX Scheduling for Large Systems*, Department of Computer Science University of Maryland, USENIX Technical Conference, Winter 1986, pp. 111-139.
Probert et al., *A Straightforward Implementation of 4.2BDS on a High-performance Multiprocessor*, Culler Scientific Systems Corporation, USENIX Technical Conference, Winter 1986, pp. 140-156.
Test et al., *Multi-Processor Management in the Concentrix Operating System*, Alliant Computer Systems Corporation, USENIX Technical Conference, Winter 1986, pp. 172-182.

(56) References Cited

OTHER PUBLICATIONS

Jacobs, H., *A User-tunable Multiple Processor Scheduler*, Alliant Computer Systems, USENIX Technical Conference, Winter 1986, pp. 183-191.
Edler et al., *Considerations for Massively Parallel UNIX Systems on the NYU Ultracomputer and IBM RP3*, Ultracomputer Research Laboratory Courant Institute of Mathematical Sciences, USENIX Technical Conference, Winter 1986, pp. 193-210.
Welch et al., *Pseudo-File-Systems*, Computer Science Division, Electrical Engineering and Computer Sciences, University of California, Report No. UCB/CSD 89/499, Apr. 1989, pp. 1-12.
*Kinetics FastPath™ 4 Gateway Installation Guide*, Kinetics, Inc., Publication No. 4200094-00 Revision A, 1988, 146 pages.
*PrestoServe™ Network File System Server Accelerator*, Legato Systems, Inc., 4 pages.
*Presto Disk™ Network File System Server Accelerator*, Legato Systems, Inc., 2 pages.
*Prestoserve Beta Test Customer Report*, 1 page.
Kabashima et al., *Implementing the Protocol Validation System on Sun Workstations*, Kokusai Denshin Denwa Co., Ltd., UniForum 1988 Conference Proceedings—Dallas, Texas, Feb. 8-11, 1988, pp. 81-93.
Shipley, M., *The Virtual Home Environment*, Hewlett-Packard Company, UniForum 1988 Conference Proceedings—Dallas, Texas, Feb. 8-11, 1988, pp. 117-181.
Wang, S., *Discless HP-US Workstations*, Hewlett-Packard Journal, Oct. 1988, vol. 39, No. 5, pp. 6-9.
Bartlett et al., *A Discless HP-UX System*, Hewlett-Packard Journal, Oct. 1988, vol. 39, No. 5, pp. 10-14.
Hwang et al., *Discless Program Execution and Virtual Memory Management*, Hewlett-Packard Journal, Oct. 1988, vol. 39, No. 5, pp. 15-20.
Gutierrez et al., *The Design of Network Functions for Discless Clusters*, Hewlett-Packard Journal, Oct. 1988, vol. 39, No. 5, pp. 20-26.
Randel, A., *Crash Detection and Recovery in a Discless HP-UX System*, Hewlett-Packard Journal, Oct. 1988, vol. 39, No. 5, pp. 27-32.
Scott, et al., *Boot Mechanism for Discless HP-UX*, Hewlett-Packard Journal, Oct. 1988, vol. 39, No. 5, pp. 33-36.
Wagner, K., *Discless System Configuration Tasks*, Hewlett-Packard Journal, Oct. 1988, vol. 39, No. 5, pp. 37-39.
Perlmutter, P., *Small Computer System Interface*, Hewlett-Packard Journal, Oct. 1988, vol. 39, No. 5, pp. 39-45.
Hall et al., *X: A Window System Standard for Distributed Computing Environments*, Hewlett-Packard Journal, Oct. 1988, vol. 39, No. 5, pp. 46-50.
Hall et al., *The Sun Technology Papers*, Sun Microsystems, Inc., Sun Technical Reference Library, 1990, pp. 1-239.
Nowicki, W., *Partitioning of Function in a Distributed Graphics System*, Department of Computer Science, Stanford University, Mar. 1985, pp. 1-136.
Malcolm et al., *Coping with Network Partitions an Processor Failures in a Distributed System*, Software Portability Laboratory, University of Waterloo, IEEE 1984 Fourth Symposium on Reliability in Distributed Software and Database Systems, Oct. 15-17, 1984, pp. 36-44.
Spector et al., *Support for Distributed Transactions in the TABS Prototype*, Department of Computer Science, Carnegie-Mellon University, IEEE 1984 Fourth Symposium on Reliability in Distributed Software and Database Systems, Oct. 15-17, 1984, pp. 186-206.
Cheriton, D., *Problem-oriented Shared Memory: A Decentralized Approach to Distributed System Design*, Computer Science Department, Stanford University, IEEE Computer Society, The 6th International Conference on Distributed Computing Systems, May 19-23, 1986, pp. 190-197.
Cheriton, D., *VMTP: A Transport Protocol for the Next Generation of Communication Systems*, Computer Science Department, Stanford University, ACM, 1986, pp. 406-415.
Cheriton, et al., *VMTP as the Transport Layer for High-Performance Distributed Systems*, IEEE Communications Magazine, Jun. 1989, pp. 37-44.
Williamson, et al., *An Overview of the VMTP Transport Protocol*, Computer Science Department, Stanford University, IEEE, Jun. 1989, pp. 415-420.
*Prestoserve™ User's Guide*, Legato Systems, Inc., Feb.-May 1989, Chapters 0-5, 30 pages.
*SLIC Technology Overview*, Alacritech, online <http://alacritech.com/html/tech_review.shtml>, Printed Jul. 11, 2005, 3 pages.
*SiliconServer White Paper*, BlueArc Corporation, 2002, pp. 1-18.
Chau, V., *Technical Brief: Titan & Alacritech iSCSI Accelerator on Microsoft Windows®*, BlueArc Corporation, 2005, pp. 1-21.
*Memorandum & Order Re: Plaintiff's Motions for Summary Judgment of Infringement; Defendant's Motions for Summary Judgment of Noninfringement, Network Appliance, Inc. v. BlueArc Corp.*, Case No. C 03-5665 MHP, May 16, 2005, 27 pages.
*Memorandum & Order Re: Cross-Motions for Summary Judgment of Infringement and Noninfringement; Defendant's Motion for Summary Judgment on Damages, Network Appliance, Inc. v. BlueArc Corp.*, Case No. C 03-5665 MHP, Jun. 27, 2005, 25 pages.
*Sun™ Cluster 3.0 Concepts*, Sun Microsystems, Inc., Part No. 806-1424-10, Nov. 2000.
Pfister, G., *In Search of Clusters*, Prentice Hall PTR, ISBN 0-13899709-8, Second Edition, 1998.
Mullender, S., *Distributed Systems*, ACM Press New York, ISBN 0-201-62427-3, Second Edition, 1993.
Davis, R., *VAXCluster Principles*, Digital Press, ISBN 1-55558-112-9, 1993.
*The Next Step in Server Load Balancing*, White Paper, Alteon WebSystems, Inc., Nov. 1999.
*Solstice HA 1.2 Software Administration Guide*, Sun Microsystems, Inc., Appendix C, 1996.
*Sun Cluster System Administration Guide for Solaris OS*, Sun Microsystems, Inc., Part No. 819-0580-10, printed online <http://docs.sun.com> on Aug. 26, 2005, 2005.
*The Case for Storage Virtualization Using Intelligent Routers*, White Paper, Crossroads Systems, Inc, Doc. No. XP-002200766, 2001, pp. 1-10.
*Boosting Network Server Adapter Performance by 800%*, Technology White Paper, Alacritech, Inc., http://www.alacritech.com/html/pci_traffic.html, printed Aug. 8, 2000, 2 pages.
*Alacritech 100x4 Quad-Port Server Adapter*, Alacritech, Data Sheet, 1 page.
*Alacritech 100x4 Quad-Port Server Adapter*, Alacritech, http://www.alacritech.com/html/4port.html, printed Aug. 28, 2000, 2 pages.
*Boosting Network Server Adapter Performance by 800%*, Technology White Paper, Alacritech, Inc., 2000, 14 pages.
Ponomarev et al., *A Comparative Study of Some Network Subsystem Organizations*, Department of Computer Science, State University of New York, IEEE, Doc. No. 0-8186-9194-8/98, 1998, 8 pages.
Vuillemin et al., *Programmable Active Memories: Reconfigurable Systems Come of Age*, IEEE Transactions on Very Large Scale Integration (VLSI) Systems, vol. 4, No. 1, Doc. No. 1063-8210/96, Mar. 1996, 14 pages.
Cheriton et al., *Uniform Access to Distributed Name Interpretation in the V-System*, Computer Science Dept., Stanford Univ., The 4th International Conference on Distributed Computing Systems, May 14-18, 1984, San Francisco, IEEE Computer Society, pp. 290-297.
Cheriton et al., *A Decentralized Naming Facility*, Dept. of Computer Science, Stanford Univ., Feb. 1986, pp. 1-28.
Cheriton, *Dissemination-Oriented Communication Systems*, Computer Science Dept., Stanford Univ., 1992, pp. 1-8.
Cheriton, *Distributed I/O using an Object based Protocol*, Dept. of Computer Science, Univ. of British Columbia, Technical Report 81-1, Jan. 1981.
Cheriton et al., *Distributed Process Groups in the V Kernel*, ACM Transactions on Computer Systems, vol. 3, No. 2, May 1985, pp. 77-107.
Cheriton et al., *The Distributed V Kernel and its Performance for Diskless Workstations*, Association for Computing Machinery, Jul. 1983, pp. 129-140.

(56) References Cited

OTHER PUBLICATIONS

Cheriton, *Exploiting Recursion to Simplify RPC Communication Architectures*, Dept. of Computer Science, Stanford Univ., Report No. STAN-CS-88-1213, Jun. 1988.
Cheriton et al., *Host Groups: A Multicast Extension for Datagram Internetworks*, Dept. of Computer Science, Stanford Univ., Report No. STAN-CS-85-1058, Jul. 1985.
Cheriton et al., *Multi-Level Shared Caching Techniques for Scalability in VMP-MC*, Dept. of Computer Science, Stanford Univ., Report No. STAN-CS-89-1266, May 1989.
Cheriton, *Multi-Process Structuring and the Thoth Operating System*, Dept. of Computer Science, Univ. of British Columbia, Mar. 1979.
Cheriton et al., *Network Measurement of the VMTP Request-Response Protocol in the V Distributed System*, Dept. of Computer Science, Stanford Univ., Report No. STAN-CS-87-1145, Feb. 1987.
Row, *LAN Software Links Diverse Machines, OS's*, Mini-Micro Systems, Sep. 1985, 4 pages.
Hindin, *Micro Operating Systems Yield Mixed Blessings*, Computer Design, Jul. 1984, pp. 155-170.
Row et al., *Operating System Extensions Link Disparate Systems*, Computer Design, Jul. 1984, pp. 171-183.
Shoens et al., *Research Report Amoeba Project*, IBM Research Laboratory, San Jose, CA, RJ 4465 (48253), Oct. 12, 1984.
Weinberger, *Distributed File Access*, ACM Thirteenth Annual Computer Science Conference, New Orleans, LA, Mar. 1985, pp. 299-301.
Zwaenepoel, *Implementation and Performance of Pipes in the V-System*, Dept. of Computer Science, Rice Univ., COMP TR85-14, Mar. 1985.
Finlayson et al., *Log Files: An Extended File Service Exploiting Write-Once Storage*, Dept. of Computer Science, Stanford University, Report No. STAN-CS-87-1177, Sep. 1987, pp. 1-12.
Greenstein, *A dedicated server may help cure your network performance headaches*, Networking Management, Apr. 1991, pp. 75-79.
Haas et al., *Blazenet: A Phototonic Implementable Wide-Area Network*, Dept. of computer Science, Stanford University, Report No. STAN-CS-87-1185, Oct. 1987, pp. 1-21.
Hurwicz, *Superservice with a smile*, Network World, Feb. 12, 1990, pp. 43-46.
Hurwicz, *Souped-up servers*, Network World, Oct. 21, 1991, 5 pages.
Lazowska et al., *File Access Performance of Diskless Workstations*, Dept. of Computer Science, Stanford University, Report No. STAN-CS-84-1010, Jun. 1984, 1-26.
Lobelle, *Integration of Diskless Workstations in UNIX* United, Software—Practice & Experience, vol. 15(10), Oct. 1985, pp. 997-1010.
Mason, *Distributed Processing: The State of the Art*, Byte, Nov. 1987, pp. 291-297.
Marshall, *Auspex NFS Server Separates NFS From Unix Kernel to Increase I/O*, Infoworld, Oct. 16, 1989, pp. 40 and 42.
Almes, *The Impact of Language and System on Remote Procedure Call Design*, Dept. of Computer Science, Rice Univ., Technical Report 85-26, Oct. 23, 1985.
Almes, *Understanding and Exploiting Distribution*, Dept. of Computer Science, Rice Univ., Technical Report 85-12, Feb. 1985.
Breidenbach, *Auspex superserver ups I/O processing*, Network World, Oct. 2, 1989, pp. 21, 25.
Chorafas, *Designing and Implementing Local Area Networks*, McGraw-Hill Book Company, New York, pp. 214-229.
Cheriton et al., *One-to-Many Interprocess Communication in the V-System*, Dept. of Computer Science, Stanford University, Report No. STAN-CS-84-1011, Aug. 1984.
Cheriton et al., *Performance of the V Storage Server: A Preliminary Report*, Proceedings of the 1985 ACM Computer Science Conference—Agenda for Computing Research: The Challenge for Creativity, Mar. 12-14, 1985, pp. 302-308.
Cheriton et al., *Process Identification in Thoth*, Dept. of Computer Science, The University of British Columbia, Technical Report 79-10, Oct. 1979.
Cheriton, *Sirpent™: A High-Performance Internetworking Approach*, Dept. of Computer Science, Stanford University, Report No. STAN-CS-89-1273, Jul. 1989, 17 pages.
Cheriton et al., *Software-Controlled Caches in the VMP Multiprocessor*, Dept. of Computer Science, Stanford University, Report No. STAN-CS-86-1105, Mar. 1986, pp. 1-12.
Cheriton, *UIO: A Uniform I/O system Interface for Distributed Systems*, Dept. of Computer Science, Stanford University, Report No. STAN-CS-86-1134, Nov. 1986, pp. 1-30.
Cheriton, *The Unified Management of Memory in the V Distributed System*, Dept. of Computer Science, Stanford University, Report No. STAN-CS-88-1192, Aug. 1988, pp. 1-24.
Cheriton, *The V Distributed Operating System: Principles and Principal Experiences*, Dept. of Computer Science, Stanford University, Apr. 1986, pp. 1-3.
Cheriton et al., *The VMP Multiprocessor: Initial Experience, Refinements and Performance Evaluation*, IEEE, Feb. 1988, 36 pages.
Leach et al., *The File System of an Integrated Local Network*, Proceedings of the 1985 ACM Computer Science Conference—Agenda for Computing Research, The Challenge for Creativity, Mar. 12-14, 1985, pp. 309-324.
The Examining Division, *Communication Pursuant to Article 96(2) EPC*, EPO Application No. 03 781 504.0-2201, Nov. 17, 2006, 5 pages.
The Examining Division, et al., *Summons to attend oral proceedings pursuant to Rule 71(1) EPC*, EPO Application No. 03 781 504.0-2201, Oct. 29, 2007, 8 pages.
The Examining Division, *Communication Pursuant to Article 96(2) EPC*, EPO Application No. 03 781 504.0-2201, Aug. 11, 2005, 4 pages.
Clive Froud, European Patent Attorney, Applicant's reply to *Communication Pursuant to Article 96(2) EPC* dated Aug. 11, 2005, EPO Application No. 03 781 504.0-2201, Jan. 24, 2006, 13 pages.
Clive Froud, European Patent Attorney, Applicant's reply to *Communication Pursuant to Article 96(2) EPC* dated Nov. 17, 2006, EPO Application No. 03 781 504.0-2201, May 15, 2007, 2 pages.
Clive Froud, European Patent Attorney, Applicant's pre-hearing submission, EPO Application No. 03 781 504.0-2201, Dec. 13, 2007, 8 pages.
The Examining Division, *Result of Consultation*, EPO Application No. 03 781 504.0-2201, Jan. 21, 2008, 2 pages.
Clive Froud, European Patent Attorney, Applicant's letter to EPO regarding divisional application, EPO Application No. 03 781 504.0-2201, Jan. 25, 2008, 1 page.
The Examining Division, et al., *Decision to Refuse European Patent Application*, EPO Application No. 03 781 504.0-2201, Feb. 18, 2008, 22 pages.
Yamamoto, Translation of Japanese Office Action dated Jul. 24, 2009, pertaining to Japanese Application No. 2004-550242, 5 pages.
Klayman, Instructions dated Jan. 19, 2010 for response filed Jan. 27, 2010 in Japanese Application No. 2004-550242, 3 pages.
Yamamoto, English translation of amended claims as filed with the Japanese Patent Office on Jan. 27, 2010 in Japanese Application No. 2004-550242, 12 pages.
Yamamoto, Translation of Japanese Office Action dated Apr. 1, 2010, pertaining to Japanese Application No. 2004-550242, 3 pages.
Klayman, Instructions dated Jun. 24, 2010 for response filed Jul. 6, 2010 in Japanese Application No. 2004-550242, 1 page.
Japanese Patent Office, Notice of Allowance issued Jul. 30, 2010 for Japanese Application No. 2004-550242, 3 pages.
European Patent Office, Extended European Search Report dated Feb. 4, 2008, pertaining to European Application No. 08075058.1, 6 pages.
Froud, Response filed Apr. 29, 2008 to Extended European Search Report dated Feb. 4, 2008 pertaining to European Application No. 08075058.1, 15 pages.
Yamamoto, English translation of pending claims for Japanese divisional application No. 2010-15860 filed Jan. 27, 2010, 3 pages.

(56) References Cited

OTHER PUBLICATIONS

Yamamoto, Translation of Japanese Office Action, dated Jul. 8, 2011, Application No. 2010-015860, 4 pages.
Wong, Andy, Canadian Office Action, dated Dec. 12, 2011, Application No. 2,504,322, 5 pages.
European Patent Office, Communication pursuant to Article 94(3) EPC dated Dec. 12, 2012, pertaining to European Application No. 08075058.1, 6 pages.
U.S. Appl. No. 14/079,162, filed Nov. 13, 2013, Apparatus for Managing a Plurality of Root Nodes for File Systems, Barrall et al.

* cited by examiner

| Checkpoint A | Valid on disk | Being written to disk | Checkpoint B |
|---|---|---|---|
| Checkpoint C | Valid in SIM | | |
| | LHS | RHS | |

Root Onode

Fig. 15

FILE SERVER NODE WITH NON-VOLATILE MEMORY PROCESSING MODULE COUPLED TO CLUSTER FILE SERVER NODE

CROSS-REFERENCE TO RELATED APPLICATIONS

This application is a continuation of, and therefore claims priority from, U.S. patent application Ser. No. 13/533,357 entitled Apparatus and Method for Hardware-Based File System filed on Jun. 26, 2012 in the names of Geoffrey S. Barrall et al. (Now U.S. Pat. No. 8,639,731), which is a continuation of, and therefore claims priority from, U.S. patent application Ser. No. 11/841,353 entitled Apparatus and Method for Hardware-Based File System filed on Aug. 20, 2007 in the names of Geoffrey S. Barrall et al. (now U.S. Pat. No. 8,224,877), which is divisional of, and therefore claims priority from, U.S. patent application Ser. No. 10/286,015 entitled Apparatus and Method for Hardware-Based File System filed on Nov. 1, 2002 in the names of Geoffrey S. Barrall et al. (now U.S. Pat. No. 7,457,822). Each of the above-referenced patent applications is hereby incorporated herein by reference in its entirety.

This application is related to U.S. patent application Ser. No. 14/079,162 entitled APPARATUS FOR MANAGING A PLURALITY OF ROOT NODES FOR FILE SYSTEMS filed on even date herewith.

TECHNICAL FIELD AND BACKGROUND ART

The present invention relates to computer file systems, and in particular to file systems that are accessed using computer hardware distinct from that associated with processors used for running computer application programs.

SUMMARY OF THE INVENTION

In a first embodiment of the invention there is provided apparatus including a storage device and a file server node having (i) a first interface operable to communicate with a network and receiving a network request via the network, (ii) a non-volatile memory operable to temporarily store a request related to the network request received by the first interface, (iii) a second interface operable to be coupled to the storage device for storing the request, and (iv) a non-volatile memory processing module, coupled to the first interface, the non-volatile memory and the second interface, and operable to be coupled to another file server node, so that the request can be sent to the non-volatile memory, the second interface and the another file server node after the non-volatile memory processing module receives the file system request.

In a second embodiment of the invention there is provided a file server node having (i) a first interface operable to communicate with a network and receiving a network request via the network, (ii) a non-volatile memory operable to temporarily store a request related to the network request received by the first interface, (iii) a second interface operable to be coupled to a storage device for storing the request, and (iv) a non-volatile memory processing module, coupled to the first interface, the non-volatile memory and the second interface, and operable to be coupled to another file server node, so that the request can be sent to the non-volatile memory, the second interface and the another file server node after the non-volatile memory processing module receives the file system request.

In various alternative embodiments, the non-volatile memory processing module may be operable to send the request to the non-volatile memory, the second interface and the another file server node, e.g., after receiving the request from a processor managing at least the non-volatile memory processing module, so that the request can be stored in the non-volatile memory, the storage device via the second interface, and another non-volatile memory in another file server node. The non-volatile memory processing module may be a programmable logic device. The non-volatile memory processing module may be a field programmable gate array. An acknowledgement of the file system request may be send back via the network after the non-volatile memory processing module sends the request to the non-volatile memory, the second interface, and the another file server node.

Further alternative embodiments may include a file system module, in the file server node, and comprising the non-volatile memory and the non-volatile memory processing module.

Further alternative embodiments may include a file system module, in the file server node, and coupling the first interface and the second interface, and being operable to comprise the non-volatile memory and the non-volatile memory processing module.

Further alternative embodiments may include a metadata cache, coupling the non-volatile memory processing module, and being operable to store management information of an object of a file system managed by the file server node.

Further alternative embodiments may include an object store module, in the file server node, and coupling the non-volatile memory processing module, and being operable to manage management information of an object of a file system, managed by the file server node.

Further alternative embodiments may include a data store module, in the file server node, and coupling the non-volatile memory processing module, and being operable to manage management information of a file system managed by the file server node.

Further alternative embodiments may include a plurality of data paths, in the file server node, and coupling between a file system module and the second interface, the file system module comprising the non-volatile memory and the non-volatile memory processing module, and the second interface, a first data path of the plurality of data paths being operable to be used for transferring data from the file system module to the second interface, and a second data path of the plurality of data paths being operable to be used for transferring data from the second interface to the file system module.

The patent application discloses various additional and/or alternative embodiments.

In one additional and/or alternative embodiment there is provided a file server system for accessing and utilizing a data storage system that may include magnetic storage, magneto-optical storage, or optical storage, to name but a few. The system includes a data bus arrangement, in communication with the data storage system, for providing data to be stored in the data storage system and for retrieving data from the data storage system. The system also includes a plurality of linked sub-modules, wherein the linked sub-modules as a group are in communication with a control input for receiving file service requests and a control output for responding to file service requests and process such service requests and generate responses thereto over the control output. The control input and the control output are typically distinct from the data bus arrangement. Each sub-module is configured to perform a distinct set of operations pertinent to processing of such file service requests. The system also includes a plurality of metadata memory caches. Each metadata memory cache is associated with a corresponding sub-module for storing metadata pertinent to operations of such sub-module, typically without storage of file content data.

An exemplary embodiment has the plurality of linked sub-modules arranged hierarchically.

An exemplary embodiment includes the following sub-modules: an object store sub-module for causing storage and retrieval of file system objects in the storage system, a file sub-module for managing data structure associated with file attributes, a directory sub-module for handling directory management for the file sub-module, a tree sub-module for handling directory lookups for the directory sub-module, a non-volatile storage processing sub-module with associated non-volatile storage for storing file system request data for subsequent storage in the storage system, and a free space allocation sub-module for retrieving and updating data pertinent to allocation of space in the data storage system.

Among other things, the tree sub-module manages a logical tree structure for the directory sub-module. In order to keep the tree structure substantially balanced, the directory sub-module associates each file with a randomized (or, perhaps more accurately, pseudo-randomized) value, and the tree sub-module manages a logical tree structure based upon the randomized values from the directory sub-module. Each randomized value is generated from a file name, for example, using a cyclic redundancy checksum (CRC) or other randomizing technique. The tree sub-module associates each randomized value with an index into the logical tree structure and uses the randomized values to access the logical tree structure. The tree sub-module associates each randomized value with an index into the directory table.

The non-volatile storage processing sub-module stores file system request data in the non-volatile storage at the request of a processor for recovery from a failure. The non-volatile storage processing sub-module sends an acknowledgment to the processor confirming storage of the file system request data in the non-volatile storage. The non-volatile storage processing sub-module may receive file system request data from another file server via an interface, which it stores in the non-volatile storage. The non-volatile storage processing sub-module may also send file system request data to another file server via an interface for non-volatile storage of the file system request data by the other file server.

The object store sub-module maintains a file structure for each file system object to be stored in the storage system. The file structures are typically stored in a dedicated metadata cache. File system objects typically include such things as files, directories, and file attributes. The object store sub-module effectuates storage of the file structures into the storage system at various checkpoints. Checkpoints can be initiated by an external processor or when certain events occur, for example, when a predetermined amount of time has elapsed since a last storage of the file structures into the storage system, when a portion of the non-volatile storage used for storage of the file system request data is becoming full, or when a sector cache associated with the storage system is becoming full.

In order to take a checkpoint, a checkpoint inquiry command is sent to the non-volatile storage processing sub-module to initiate storage of file structures into the storage system for a checkpoint. The checkpoint inquiry command typically includes a checkpoint number for the checkpoint. The non-volatile storage processing sub-module stores any outstanding file system requests in the non-volatile storage, optionally sends the number of file system requests to another file server via an interface for non-volatile storage of the number of file system requests by the other file server, sends the number of file system requests to the file sub-module, and subsequently sends a checkpoint command to the file sub-module (it should be noted that the storing and "mirroring" of file system requests, and the passing of file system requests to the file sub-module, occurs continuously as needed as well as during the taking of a checkpoint). The file sub-module processes any file system requests, and, upon receiving the checkpoint command from the non-volatile storage processing sub-module, waits for certain operations to complete through the remaining sub-modules and then sends a checkpoint command to the directory sub-module. The directory sub-module receives the checkpoint command from the file-sub-module and sends a checkpoint command to the tree sub-module. The tree sub-module receives the checkpoint command from the directory sub-module and sends a checkpoint command to the object store sub-module. The object store sub-module receives the checkpoint command from the tree sub-module and sends a checkpoint inquiry to the free space allocation sub-module. The free space allocation sub-module receives the checkpoint inquiry from the object store sub-module, completes any operations necessary for the checkpoint including operations initiated subsequent to receiving the checkpoint inquiry, and then sends a response to the object store sub-module. The object store sub-module then causes the file system objects to be written to the storage system, including an updated objects list indicating any and all objects that have been modified since a last checkpoint.

In a typical embodiment of the invention, each file structure includes a plurality of nodes and at least one data block. Each node typically includes such things as pointers to other nodes, pointers to data block descriptors, and a checkpoint number indicating a checkpoint during which the node was created.

In a particular embodiment of the invention, the file structure includes at least two root nodes for storing information for a first and a second checkpoint. The storage system is logically divided into sectors, and the two root nodes are preferably stored in adjacent sectors in the storage system. Each root node typically includes such things as an object type for indicating the type of file system object (e.g., file, directory, free space object, volume descriptor object, etc.), an object length for indicating the number of data blocks associated with the file system object, a reuse count indicating the number of time the root node has been used, a pointer to a previous instantiation of the root node, a pointer to a subsequent instantiation of the root node, at least one a data block descriptor including a pointer to a data block, a checkpoint number indicating a relative time the data block was created, and an indicator to indicate whether the data block is zero or non-zero, and file attributes (enode). It should be noted that the actual object length may not be an integral number of data blocks, in which case the object length is typically rounded up to the next higher block multiple to give a count of the number of blocks used.

In addition to root nodes, the file structure may include a number of direct nodes that contain data block descriptors. A root node may include a pointer to a direct node. The file structure may also include a number of indirect nodes. Indirect nodes point to other indirect nodes or to direct nodes. A root node may include a pointer to an indirect node.

It is possible for an object to have no data associated with it, in which case the object will not have any block descriptors.

In order to facilitate the creation of large empty (i.e., zero filled) files, the file structure typically includes an indicator for each data block associated with the file system object to indicate whether the data block is zero or non-zero. The file structure typically also includes an indicator for each node and data block to indicate whether each node and data block has been created. The object store sub-module creates nodes and data blocks as necessary to accommodate file system write requests and sets the indicator for each node and data block to indicate that the node or data block has been created. The object store sub-module typically creates a data block by allocating space for the data block from the free space allocation sub-module.

In order to facilitate recovery from failures, the object store sub-module typically maintains a transaction log, which it stores along with the file structure in the storage system from time to time.

Each sub-module may be implemented using dedicated hardware or a dedicated processor.

In another additional and/or alternative embodiment there is provided a clustered file server system having two or more interconnected file servers. Two file servers may be connected back-to-back, although more than two file servers are preferably interconnected through a switch. The switch provides the ability for any server to communicate with any other server. The servers then make use of this functionality to exchange file system request data amongst themselves for non-volatile storage of the file system request data, for example, in a virtual loop configuration. Typically, no modification of the switch configuration is required if one of the servers becomes unavailable, but rather, the servers realize the situation and modify the virtual loop accordingly.

In another additional and/or alternative embodiment there is provided a clustered file server system having at least three file servers and a switch. Each file server generates file system request data and includes a non-volatile storage area. The switch interconnects the file servers so that any given file server's non-volatile storage stores file system request data from a selected one of the other file servers. The switch may be configured such that the file system request data from each file server is stored in at least one other file server, for example in a virtual loop configuration. The switch is typically capable of modifying the configuration in order to bypass a file server that becomes unavailable for storing file system request data.

In another additional and/or alternative embodiment there is provided a file server having a service module for receiving and responding to file service requests over a network, a file module for servicing file service requests, and a processor in communication with the service module and the file module. The service module passes a file service request to the processor. The processor processes the file service request and passes the file service request to the file module for servicing. The file module sends a response for the file service request directly to the service module, bypassing the processor.

In another additional and/or alternative embodiment there is provided a method for managing a reusable data structure in a file system. The method involves maintaining a reuse value for the reusable data structure and changing the reuse value each time the data structure is reused. The reusable data structure is typically a root node of an object structure associated with a file system object. The reuse value is typically provided to a client for referencing the file system object. The client typically includes the reuse value when requesting access to the file system object, in which case the reuse value in the request is compared to the reuse value in the root node to determine whether the root node was reused subsequent to providing the reuse value to the client, and the request is serviced if and only if the reuse value in the request matches the reuse value in the root node.

In another additional and/or alternative embodiment there is provided a method for maintaining a file system object in a non-volatile storage at successive checkpoints. The method involves maintaining an object structure for the file system object, the object structure comprising a first tree structure rooted by a first root node and a second tree structure rooted by a second root node, each tree structure optionally including a number of intermediate nodes and a number of data blocks, each tree structure representing a version of the file system object. The method also involves alternately managing the object structure using the first tree structure rooted by the first root node while storing the second tree structure rooted by the second root node in the non-volatile storage and managing the object structure using the second tree structure rooted by the second root node while storing the first tree structure rooted by the first root node in the non-volatile storage. The method typically also involves maintaining a version number for each root node, the version number indicating the checkpoint associated with the corresponding tree structure. The non-volatile storage typically includes a plurality of sectors, and the first and second root nodes are typically stored in adjacent sectors in the non-volatile storage. The method typically also involves determining a latest valid version of the file system object based upon the version numbers of the root nodes. The method typically also involves maintaining a list of free space areas of the non-volatile storage, maintaining a list of free root nodes, allocating the root nodes for the object structure from one of the list of free space areas and the list of free root nodes, and allocating intermediate nodes and data blocks for the object structure only from the list of free space areas. The method may also involve deleting the file system object from the non-volatile storage. Deleting the file system object from the non-volatile storage typically involves adding the root nodes to the list of free root nodes and adding the intermediate nodes and data blocks to the list of free space areas.

In another additional and/or alternative embodiment there is provided a method for retaining a read-only version of an object in a file system. The method involves maintaining an object structure for the object, the object structure including at least a root node associated with a current version of the object, a number of intermediate nodes, and a number of data blocks for storing object data, wherein each node includes at least one reference to a data block or to another node in order to form a path from the root node to each data block. The method also involves storing the object structure in a non-volatile storage and making a copy of the root node for the retained version of the object. The method may also involve storing a reference to the copy of the root node in the object structure for the object. The method may also involve storing a reference to the root node in the copy of the root node. The method may also involve obtaining a reference to an earlier version of the root node from the root node and storing the reference to the earlier version of the root node in the copy of the root node and also storing a reference to the copy of the root node in the earlier version of the root node. The method may also involve storing the copy of the root node in the non-volatile storage.

The method may also involve modifying object data without modifying any intermediate nodes or data blocks associated with the retained version of the object. Modifying object data without modifying any intermediate nodes or data blocks associated with the retained version of the object typically involves making a copy of a data block, modifying the copy of the data block to form a modified copy of the data block, and forming a path from the root node to the modified copy of the data block without modifying any intermediate nodes along the path to the data block that are associated with the retained version of the object. The root node may have a reference to the data block, which is modified to refer to the modified copy of the data block rather than to the data block. Alternatively, path from the root node to the modified copy of the data block may include an intermediate node referenced by the root node that in turn has a reference to the data block, in which case a copy of the intermediate node is made, the copy of the intermediate node is modified to refer to the modified copy of the data block rather than to the data block, and the root node is modified to reference the copy of the intermediate node. Alternatively, the path from the root node to the data block may include a plurality of intermediate nodes including at least a first intermediate node referenced by the root node and a last intermediate node having a reference to the data block, in which case a copy of each intermediate node is made, the root node is modified to reference the copy of the first intermediate node, the copy of the last intermediate node is modified to reference the modified copy of the data block, and the copy of each other intermediate node is modified to reference a copy of another intermediate node in order to form a path from the root node to the modified copy of the data block.

The method may also involve deleting a data block from the object without modifying any intermediate nodes or data blocks associated with the retained version of the object. The root node may have a reference to the data block, in which case deleting the data block from the object involves removing the reference to the data block from the root node. Alternatively, the path from the root node to the data block may include an intermediate node referenced by the root node and having a reference to the data block, in which case deleting the data block from the object involves making a copy of the intermediate node, removing the reference to the data block from the copy of the intermediate node, and modifying the root node to reference the copy of the intermediate node. Alternatively, the path from the root node to the data block may include a plurality of intermediate nodes including at least a first intermediate node referenced by the root node and a last intermediate node having a reference to the data block, in which case deleting the data block from the object involves making a copy of each intermediate node, modifying the root node to reference the copy of the first intermediate node, removing the reference to the data block from the copy of the last intermediate node, and modifying the copy of each other intermediate node to reference a copy of another intermediate node in order to form a path from the root node to the copy of the last intermediate node.

The method may involve adding a new data block to the object without modifying any intermediate nodes or data blocks associated with the retained version of the object. Adding the new data block to the object may involve allocating the new data block and adding a reference to the new data block to the root node. Adding the new data block to the object may involve allocating the new data block, making a copy of an intermediate node, storing a reference to the new data block in the copy of the intermediate node, and storing a reference to the copy of the intermediate node in the root node. Adding the new data block to the object may involve allocating the new data block, allocating a new intermediate node, storing a reference to the new data block in the new intermediate node, and storing a reference to the new intermediate node in the root node. Adding the new data block may involve allocating the new data block, allocating a new intermediate node, storing a reference to the new data block in the new intermediate node, and forming a path to the new intermediate node without modifying any intermediate nodes or data blocks associated with the retained version of the object.

The method may involve maintaining a modified objects list for the retained version of the object. The modified objects lists indicates any and all intermediate nodes and data blocks added, modified, or deleted after making a copy of the root node for the retained version of the object.

The method may involve deleting the retained read-only version of the object from the file system. Deleting the retained read-only version of the object from the file system involves identifying any and all intermediate nodes and data blocks modified since retaining the read-only version of the object, identifying the copy of the root node for the retained version of the object being deleted, identifying a root node associated with an earlier retained version of the object if one exists, identifying a root node associated with a later version of the object, said later version being one of a later retained version of the object and a current version of the object, identifying any and all intermediate nodes and data blocks associated with the retained version of the object being deleted, identifying any and all intermediate nodes and data blocks that are used only by the retained version of the object being deleted, deleting from the object structure each intermediate node and data block that is used only by the retained version of the object being deleted, identifying any and all intermediate nodes and data blocks that are used by the later version of the object, adding any and all intermediate nodes and data blocks that are used by the later version of the object to a modified objects list associated with the later version of the object, determining whether the copy of the root node for the retained version of the object being deleted is only used in the retained version of the object being deleted, and deleting from the object structure the copy of the root node for the retained version being deleted if and only if the copy of the root node for the retained version of the object being deleted is only used in the retained version of the object being deleted. Identifying all intermediate nodes and data blocks that were modified in the retained read-only version of the object typically involves maintaining a list of intermediate nodes and data blocks modified since retaining the read-only version of the object. The root node for the retained read-only version of the object typically includes a reference to the root node of the earlier retained version of the object if one exists, and identifying the root node associated with the earlier retained version of the object typically involves accessing the reference to the root node of the earlier retained version of the object in the root node for the retained read-only version of the object. The root node for the retained read-only version of the object typically includes a reference to the root node of the later version of the object, and identifying the root node associated with the later version of the object typically involves accessing the reference to the root node of the later version of the object in the root node for the retained read-only version of the object. Identifying any and all intermediate nodes and data blocks that are used only by the retained version of the object being deleted typically involves, for each intermediate node and data block in the retained version of the object being deleted, identifying an equivalent intermediate node or data block in the earlier version of the object, if one exists, and in the later version of the object, if one exists; comparing the intermediate node or data block in the retained version of the object being deleted to the equivalent intermediate node or data block in both the earlier version of the object and the later version of the object; and determining that the intermediate node or data block is used only by the retained version of the object being deleted if and only if the equivalent intermediate node or data block is different in the earlier version of the object, if one exists, and in the later version of the object, if one exists. Each deleted intermediate node and data block is typically added to a list of free space areas. The root node associated with the earlier retained version of the object typically includes a reference to the copy of the root node for the retained version of the object being deleted, and deleting from the object structure the copy of the root node for the retained version being deleted typically involves replacing the reference to the copy of the root node for the retained version of the object being deleted with a reference to the root node associated with the later version of the object, if one exists, or with a null value, if one does not exist. The root node associated with the later version of the object typically includes a reference to the copy of the root node for the retained version of the object being deleted, and deleting from the object structure the copy of the root node for the retained version being deleted typically involves replacing the reference to the copy of the root node for the retained version of the object being deleted with a reference to the root node associated with the earlier version of the object, if one exists, or with a null value, if one does not exist. The deleted copy of the root node is typically added to a list of free root nodes.

In another additional and/or alternative embodiment there is provided a method for indicating the contents of a portion of an object in a file system. The method involves maintaining an object structure including a number of data blocks for the object and maintaining an indicator for each data block, each indicator having a first state for indicating that the corresponding data block is logically filled with a predetermined value and a second state for indicating that the corresponding data block contains object data. Each indicator is typically maintained in a node referencing the corresponding data block. The predetermined value is typically a zero value. The method may also involve setting an indicator to the first state to indicate that the corresponding data block is logically filled with a predetermined value without writing the predetermined value to the corresponding data block. The method may also involve writing object data into a data block and setting the indicator corresponding to the data block to the second state to indicate that the corresponding data block contains object data.

In another additional and/or alternative embodiment there is provided a method for allocating sparse objects in a file system. The method involves allocating a root node for the object and allocating additional nodes and data blocks as needed only for portions of the object that are not to be zero-filled. Each node typically includes a number of references to data blocks and/or other nodes. Each node typically includes an indicator for each reference to another node. Each indicator has a first state for indicating that the other node has been allocated and a second state for indicating that the other node has not been allocated. The indicator for each reference associated with an unallocated node is initially set to the second state. In order to write object data to a zero-filled portion of the object, additional nodes and data blocks are allocated, and, in each node having a reference to an allocated node, a reference to the allocated node is stored and the indicator for the reference to the allocated node is set to the first state.

In another additional and/or alternative embodiment there is provided a method for storing metadata associated with an object in a file system. The method involves maintaining a first object structure for the object, the object structure including at least a root node and optionally including intermediate nodes and data blocks, and storing a first portion of metadata in the root node. The method may also involve allocating a number of data blocks for storing a second portion of metadata. The method may also involve allocating a second object structure for storing a third portion of metadata, in which case a reference to the second object structure is typically stored within the first object structure, for example, within the root node of the first object structure or within the second portion of metadata.

In another additional and/or alternative embodiment there is provided an apparatus including a non-volatile storage and means for maintaining a file system object in the non-volatile storage at successive checkpoints using an object structure having two and only two root nodes for managing a current version of the object, where the means alternates between the two root nodes for managing the object at the successive checkpoints. The apparatus typically also includes means for retaining read-only versions of the object through the object structure. The apparatus typically also includes means for deleting a retained read-only version of the object from the object structure. The apparatus typically also includes means for deleting the current version of the object while at least one retained read-only version of the object exists in the object structure. The apparatus typically also includes means for reverting the current version of the object to a retained read-only version of the object.

In another additional and/or alternative embodiment there is provided a method for maintaining file system objects in a file system having a non-volatile storage. The method involves maintaining an object structure for each of a plurality of file system objects, each object structure including at least one root node and optionally including a number of intermediate nodes and a number of data blocks; maintaining a transaction log identifying any and all modified nodes; storing any and all modified intermediate nodes identified by the transaction log in the non-volatile storage; storing the transaction log in the non-volatile storage; and storing any and all modified root nodes identified by the transaction log in the non-volatile storage only after storing the transaction log in the non-volatile storage. The method may also involve determining that a failure occurred between storing the transaction log in the non-volatile storage and storing any and all modified root nodes identified by the transaction log in the non-volatile storage and, for each node identified by the transaction log, reverting to a previous version of the node stored in the non-volatile storage.

In another additional and/or alternative embodiment there is provided a method for accessing a shared resource in a distributed file system having at least a first file server that manages the shared resource and a second file server that accesses the shared resource. The method involves maintaining a cache for the shared resource by the second file server, requesting read access to the shared resource by the second file server from the first file server, providing read access to the shared resource by the first file server for the second file server, obtaining shared resource data by the second file server from the first file server, and storing the shared resource data by the second file server in the cache.

In another additional and/or alternative embodiment there is provided a method for accessing a shared resource in a distributed file system having at least a first file server that manages the shared resource and a second file server that accesses the shared resource. The method involves maintaining a cache for the shared resource by the second file server, requesting read access to the shared resource by the second file server from the first file server, denying read access to the shared resource by the first file server for the second file server, providing shared resource data to the second file server by the first file server, and omitting the shared resource data from the cache by the second file server.

In another additional and/or alternative embodiment there is provided a file server for operation in a distributed file system having a resource shared among a plurality of file servers. The file server includes a cache for storing data associated with the shared resource and distributed lock means for controlling access to the shared resource, the distributed lock means operably coupled to selectively store shared resource data in the cache.

BRIEF DESCRIPTION OF THE DRAWINGS

The foregoing features of the invention will be more readily understood by reference to the following detailed description, taken with reference to the accompanying drawings, in which:

FIG. 15 is a diagram illustrating the effect of modifying the same root onode as part of checkpoint C while checkpoint B is being created;

DETAILED DESCRIPTION OF SPECIFIC EMBODIMENTS

Definitions. As used in this description and the accompanying claims, the following terms shall have the meanings indicated, unless the context otherwise requires:

"Data storage system" may be any suitable large data storage arrangement, including but not limited to an array of one or more magnetic or magneto-optical or optical disk drives, solid state storage devices, and magnetic tapes. For convenience, a data storage system is sometimes referred to as a "disk" or a "hard disk".

A "hardware-implemented subsystem" means a subsystem wherein major subsystem functions are performed in dedicated hardware that operates outside the immediate control of a software program. Note that such a subsystem may interact with a processor that is under software control, but the subsystem itself is not immediately controlled by software. "Major" functions are the ones most frequently used.

A "hardware-accelerated subsystem" means one wherein major subsystem functions are carried out using a dedicated processor and dedicated memory, and, additionally (or alternatively), special purpose hardware; that is, the dedicated processor and memory are distinct from any central processor unit (CPU) and memory associated with the CPU.

A "file" is a logical association of data.

"Metadata" refers to file overhead information as opposed to actual file content data.

"File content data" refers to file data devoid of file overhead information.

Pertinent to subject matter described herein is commonly-owned U.S. patent application Ser. No. 10/286,153 entitled Distributed File System and Method, which was filed on even date herewith in the names of Francesco Lacapra, Fiorenzo Cattaneo, Simon L. Benham, Trevor E. Willis, and Christopher J. Aston, and is hereby incorporated herein by reference in its entirety.

Figure 1:
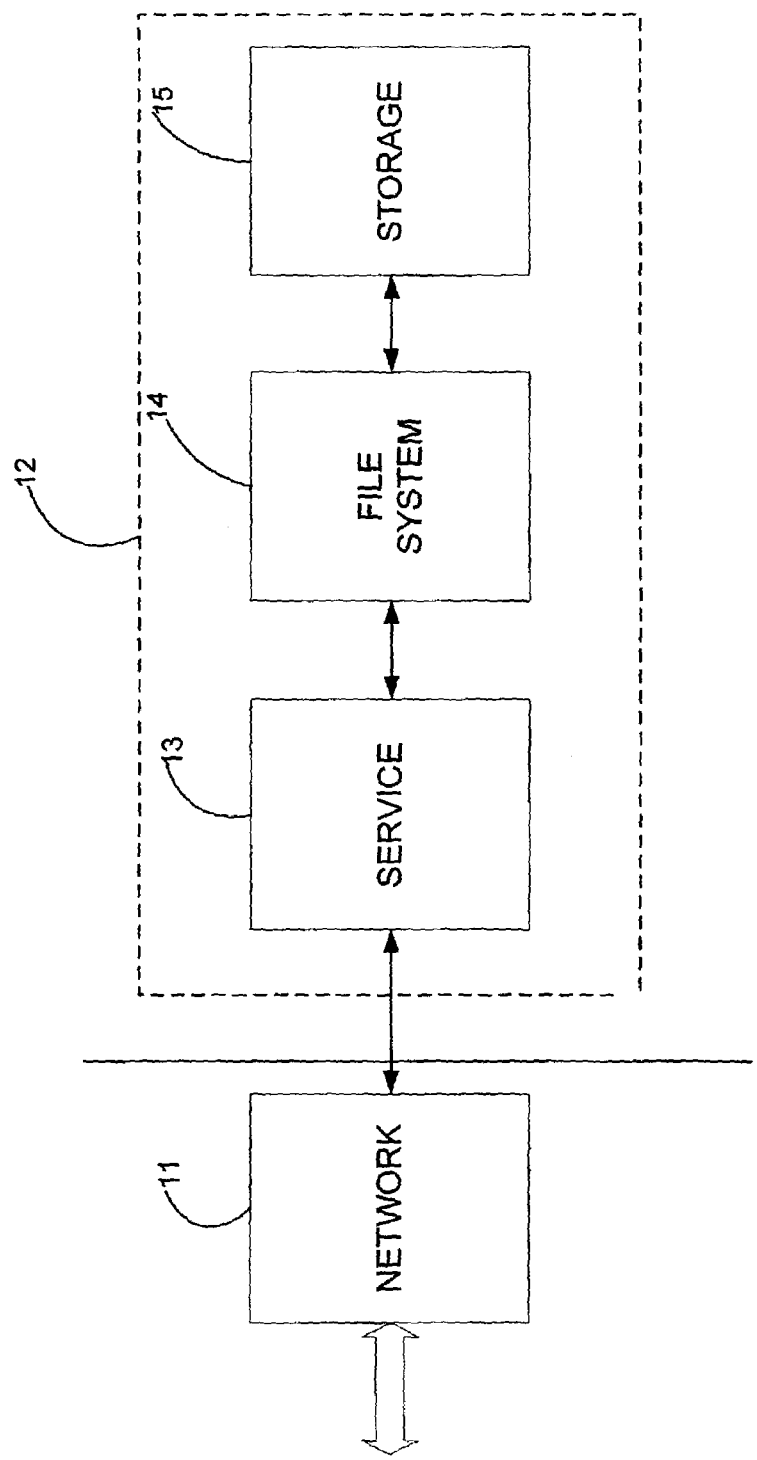
FIG. 1 is a block diagram of an embodiment of a file server to which various aspects of the present invention are applicable.

FIG. 1 is a block diagram of an embodiment of a file server to which various aspects of the present invention are applicable. A file server of this type is described in PCT application publication number WO 01/28179 A2, published Apr. 19, 2001, entitled "Apparatus and Method for Hardware Implementation or Acceleration of Operating System Functions"—such document, describing an invention of which co-inventors herein are also co-inventors, is hereby incorporated herein by reference. The present FIG. 1 corresponds generally to FIG. 3 of the foregoing PCT application. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. As described in the foregoing PCT application, each of the various modules may be hardware implemented or hardware accelerated.

Figure 2:
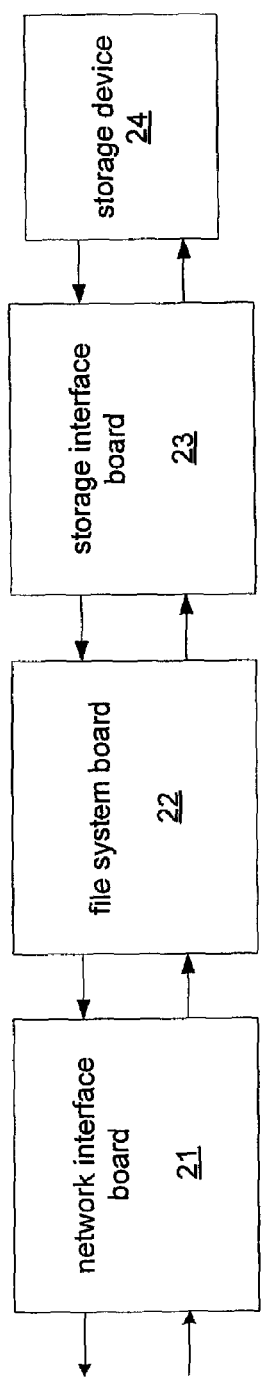
FIG. 2 is a block diagram of an implementation of the embodiment of FIG. 1.

FIG. 2 is a block diagram of an implementation of the embodiment of FIG. 1. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is hereby incorporated herein by reference.

Figure 3:
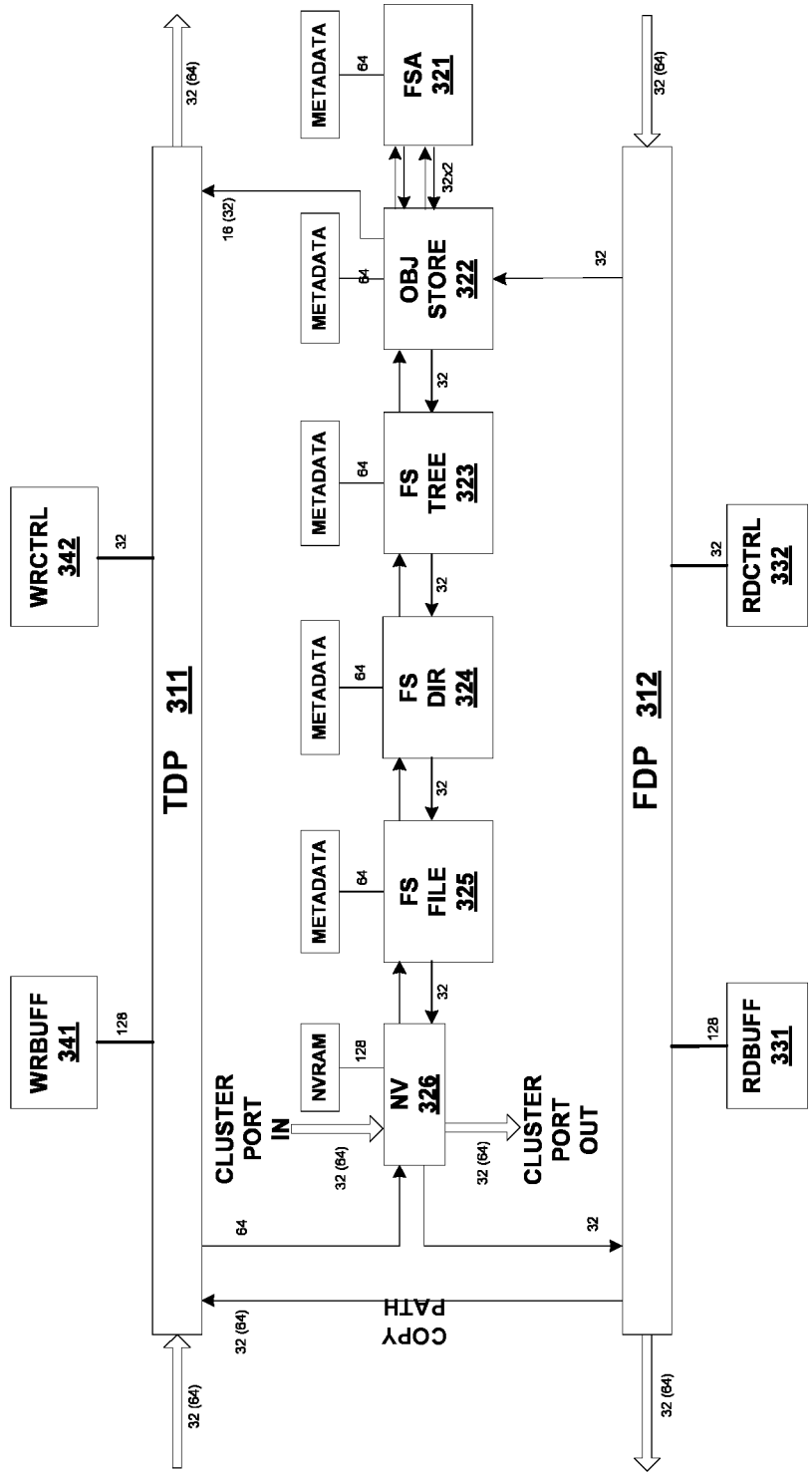
FIG. 3 is a block diagram of a file system module in accordance with an embodiment of the present invention.

FIG. 3 is a block diagram of an embodiment of a file system module in accordance with the present invention. The file system module embodiment may be used in systems of the type described in FIGS. 1 and 2. Exemplary bus widths for various interfaces are shown, although it should be noted that the present invention is in no way limited to these bus widths or to any particular bus widths.

The data flow in this embodiment is shown by upper bus 311, which is labeled TDP, for To Disk Protocol, and by lower bus 312, which is labeled FDP, for From Disk Protocol, such Protocols referring generally to communication with the storage module 15 of FIG. 1 as may be implemented, for example, by storage interface board 23 of FIG. 2. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

A series of separate sub-modules of the file system module handle the tasks associated with file system management. Each of these sub-modules typically has its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

It can be seen that the file system embodiment provided herein is distributed in nature. This distributed nature permits keeping all of the metadata associated with the file system in cache memory that is distinct from file content cache. There are numerous benefits to this arrangement, including the ability to cache large amounts of metadata regardless of the size of the files to which they relate, increased throughput in handling file operations, and reduced processor overhead.

The processing of file system requests is delineated by a series of checkpoints that are scheduled to occur no less frequently than some user-specified interval, such as every 10 seconds. With respect to each successive checkpoint, there is stored, on disk, current file structure information that supersedes previously stored file structure information from the immediately preceding checkpoint. Checkpoints are numbered sequentially and are used to temporally group processing of file requests.

For a variety of purposes it may be useful to have knowledge of the file system structure at a selected point in time. This capability is provided by permitting user-triggered storage of file system structure data associated with the currently saved checkpoint, which is referred to hereinafter for convenience as a retained checkpoint, and is described in detail below. The retained checkpoint is essentially a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a catastrophe).

At the heart of the file system module is the Object Store sub-module 322. In this implementation all items that are subject to storage on the hard disk, regardless of form (including, for example, files, directories, free-space allocation information, a list of objects created or modified since a last checkpoint was taken, a list of objects created or modified since a last retained checkpoint was taken, and certain file attribute information), are regarded as objects, and storage for such items is handled by the Object Store sub-module 322. The Object Store sub-module can perform the following operations with respect to an object: create, delete, write, and read. In addition, under instruction from processor, the Object Store sub-module can create a checkpoint, and can also create a retained checkpoint, delete a retained checkpoint, or revert the file system to a retained checkpoint. The Object Store sub-module tracks the physical location of data, stored on the disk, which is associated with each object, using various data structures described below. The Object Store sub-module causes disk storage requests to be sent by a communication link over the bus 311 and obtains disk storage response data by a communication link over the bus 312. If the Object Store sub-module receives a request for a read operation, the Object Store sub-module can satisfy the request directly by acting over the bus 311.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit map.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files. File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name, this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

In rare cases the CRC for two different files may be the same, and the file system module must handle such a case. To accommodate this situation, the File System Tree sub-module 324 maintains a list of all files with same CRC, and does so by having a pointer from any given file with a CRC to another file with the same CRC. (Owing to the relative uniqueness of the CRC, this is likely a short list.) The File System Tree sub-module 324 maintains the starting point of the list for any given CRC.

The Non-Volatile Storage Processing sub-module 326 interfaces with associated non-volatile storage (called NVRAM in FIG. 3) to provide a method for recovery in the event of power interruption or other event that prevents cached data—which is slated for being saved to disk—from actually being saved to disk. In particular, since, at the last checkpoint (checkpoints are discussed above near the beginning of discussion of FIG. 3), a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

Figure 6:
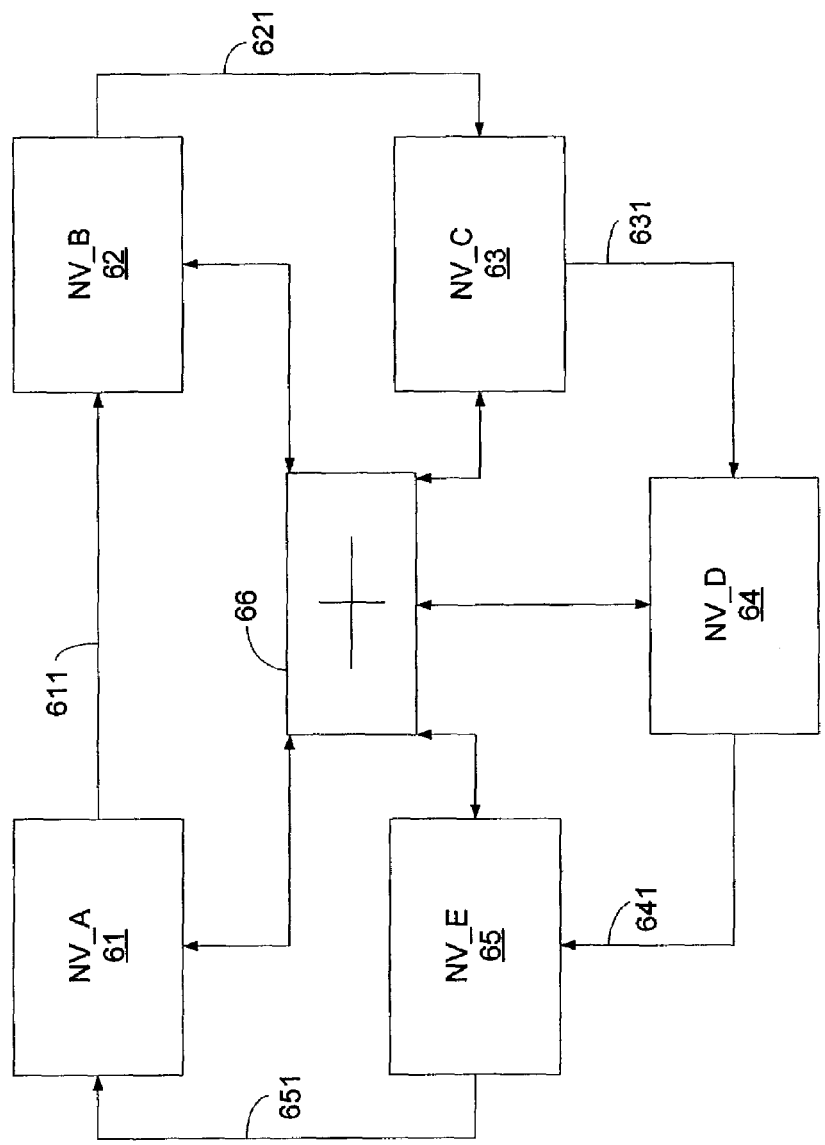
FIG. 6 is a block diagram of a clustered file server arrangement in accordance with an embodiment of the present invention wherein non-volatile memory is mirrored in a virtual loop configuration.

When file server systems are clustered, non-volatile storage may be mirrored using a switch to achieve a virtual loop. FIG. 6 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

In order to achieve this, the processor examines the contents of the NVRAM and extracts all the operations that were requested by the processor from the time of the last checkpoint until the system failure. It then resubmits these requests to the File System File sub-module, which satisfies the requests by making the necessary on disk changes. The File System File sub-module does not distinguish between "live" file system requests and resubmitted requests that are being issued during the recovery procedure—both are handled in an identical fashion (with the exception that resubmitted requests are not logged in NVRAM since they already exist there).

One complication in this procedure relates to the file handles by which a file (or directory) is referenced. In normal operation, when a file is created, it is assigned a file handle. Any operations that subsequently need to refer to that file do so by means of this file handle. So, for example, the following sequence of operations might take place:

(1) Processor requests that a file be created.
(2) File System File sub-module creates file and returns handle A.
(3) Processor requests write of data to file A.
(4) File System File sub-module performs the write.

In this example, the two requests at steps (1) and (3) would be stored in NVRAM.

The complication arises because the file handle assigned by the File System File sub-module during the recovery procedure described above may differ from the file handle that was originally assigned. So, for example, the operations stored in the NVRAM might be as in the example above. However, during recovery, the file handle returned by the File System File sub-module at step (2) might be B. In this case, the write of data at step (3) using file handle A fails, since file handle A is not recognized by the File System File sub-module.

In order to overcome this problem, whenever a file is created, the processor explicitly logs the assigned handle in NVRAM (this is performed via a special request to the Non-Volatile Storage Processing sub-module). The contents of the NVRAM at recovery time therefore look like this:

(1) Processor requests that a file be created.
. . . there may be more entries for other unrelated requests here . . . .
(2) Created file was assigned handle A.
. . . there may be more entries for other unrelated requests here . . . .
(3) Processor requests write of data to file A.

Therefore, when a create operation is encountered during the recovery procedure, the processor searches the NVRAM to find the assigned handle. It then issues the create request and obtains a (potentially different) handle. From this point on, any references in the replayed operations to the old handle for the created file are replaced by the new handle for the created file.

For example, the recovery procedure for the example above might proceed as follows:
(1) Processor resubmits file create request.
(2) File System File sub-module creates file and returns handle B.
(3) Processor searches NVRAM for previously assigned handle and determines the previously assigned handle is handle A.
(4) Processor notes that any subsequent references in NVRAM to handle A should be replaced by handle B.
(5) Processor substitutes handle B for handle A and requests write of data to file B.
(6) File System File sub-module performs the write.

Figure 4:
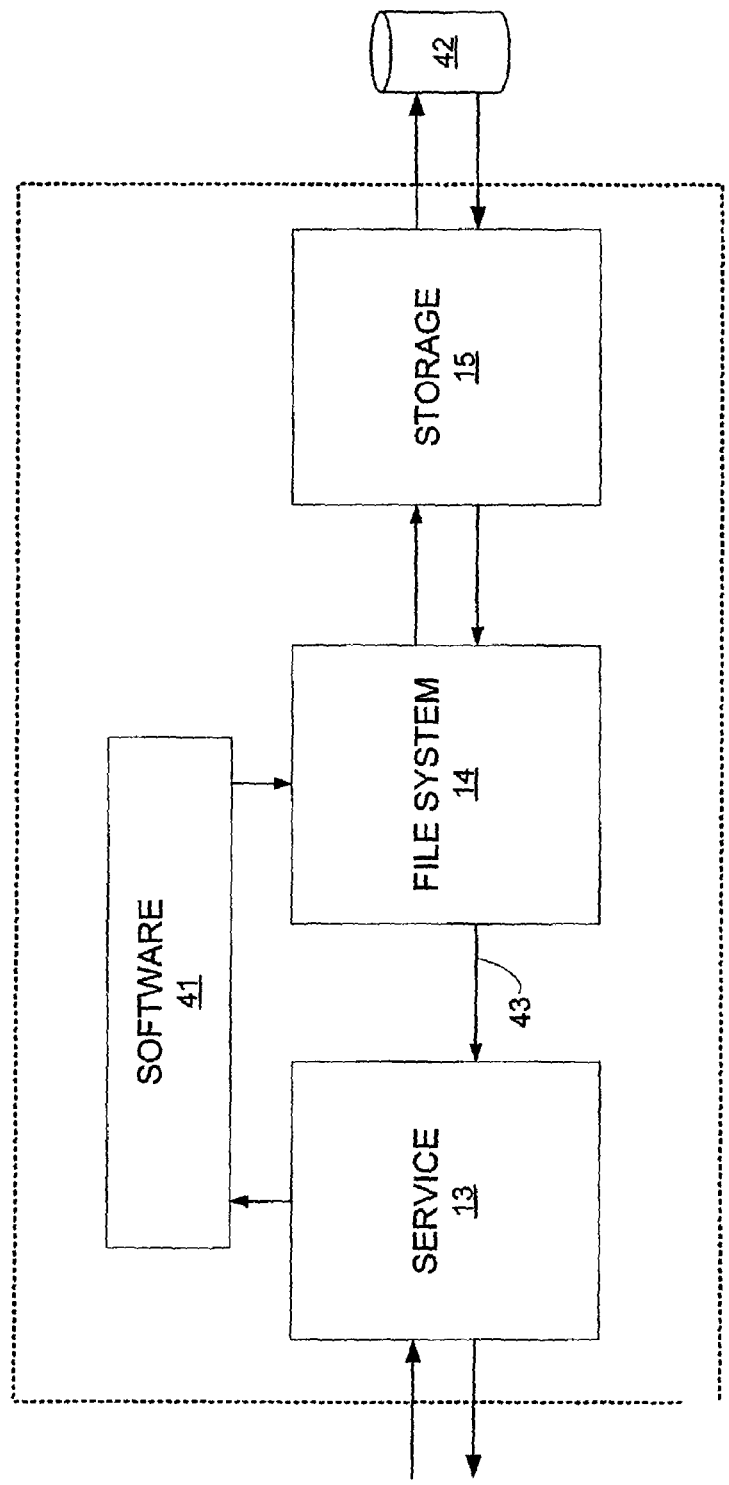
FIG. 4 is a block diagram showing how control flow may be used in embodiments of the present invention to permit automatic response by the file service module to a network request without intervention of software control.

A typical embodiment utilizes an automatic response mechanism for servicing certain file system requests. FIG. 4 is a block diagram showing how control flow may be used in embodiments of the present invention to permit automatic response by the file service module to a network request without prior intervention of software control. In FIG. 4, there is shown service module 13, file system module 14, and storage module 15, as in FIG. 1, with service module 13 and file system module 14 under the control of software 41 and with storage module 15 in communication with storage arrangement 42. The connections between blocks represent control flows rather than data flows. On identification of a file service request by service module 13, the request is typically passed from the service module 13 to software control 41, for example, to handle security and other complex tasks. Then under software control 41, the request is processed by the file system module 14. On the other hand, the response to a file system request, which is not necessarily as complex, is routed from the file system module 14 directly back to the service module 13 over control flow 43 rather than being routed back through software control 41. The software control 41 is eventually informed that the request has been satisfied.

Figure 5:
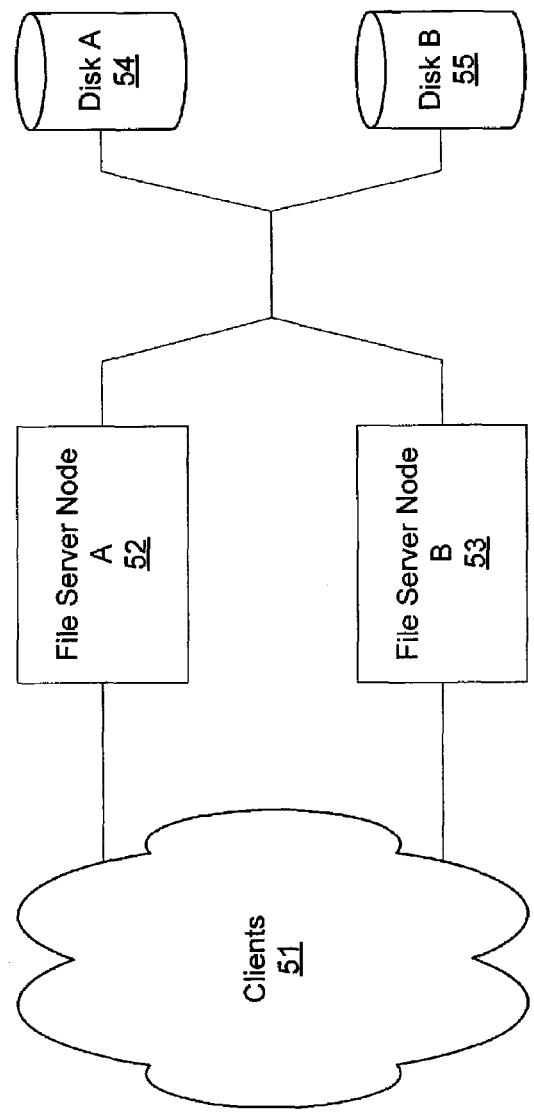
FIG. 5 is a block diagram of a clustered file server arrangement embodying sector cache locking in accordance with an embodiment of the present invention.

In an arrangement employing a cluster of file server nodes accessing common storage, it is necessary to deal with instances wherein multiple nodes may seek to perform conflicting tasks with respect to a common storage location. FIG. 5 is a block diagram of a clustered file server arrangement embodying sector cache locking in accordance with an embodiment of the present invention to deal with this problem. In this embodiment, file server node A (item 52) and file server node B (item 53), are both in communication with clients 51 and are configured so that each server node may access (that is, read from and write to) both disk A (item 54) and disk B (item 55). (Here, in a manner analogous to that previously discussed, the term "disk" is an arbitrary storage designator, and includes the use of several disks, e.g., or a particular region on a single disk drive, and the mode of storage is any suitable for, including but not limited to magnetic and magneto-optical.)

In this embodiment, each server node maintains a sector cache, at a sector level, of each of disk A and disk B. Under these circumstances, it is necessary to solve the problem of how to achieve cache coherency where each server node might process disk writes. This problem is addressed as follows. For a given disk, only one server node can write to the disk (although a client can write to either disk via either server node). For example, in FIG. 5, only server node A can write to disk A, and only server node B can write to disk B. Each server node runs a lock manager for the disk it writes to. The disks are split up into 32 Kbyte pages. Each page can be in one of three states: uncached, read-locked, or write-locked.

As an example, it is assumed that server node A wants to cache a disk B read. Server node A thus must first communicate with server node B, requesting a read lock for the page it wants to read. It gets the read lock, reads the data, and puts it in its sector cache. Now assume that server node B wants to write to the same page. Server node B has been informed that server node A has a read lock on this page. Server node B therefore communicates with server node A, and instructs server node A to break its read lock. Server node B then waits for a communication from server node A that the read lock has been released (whereupon server node A flushes the page from its cache). Then server node B has the write lock, and can write to the page. If server node A wants to read the page again, it requests a read lock. Server node B responds by denying the read lock but updating server node B's cache and forwarding the cached data to server node A. Server node A cannot cache this data, and will therefore be denied a read lock. A read lock can next be granted to server node A when disk B is updated from B's cache—namely at the next checkpoint. This implementation thus provides a distributed lock manager and does so in hardware.

1. OBJECT STORE STRUCTURES

1.1 Summary of Object Store Data Structures

The Object Store sub-module is used to maintain and store various types of file system objects. File system objects include file objects, directory objects, free-space allocation objects, modified checkpoint objects list objects, modified retained objects list objects, and mnode objects. File objects are created by the File System File sub-module for storage of user data and associated attributes, such as a word processor or spreadsheet files. Directory objects are created by the File System Directory sub-module for storage of directory information. Free-space allocation objects are created by the Free Space Allocation sub-module for storage of free-space allocation information. Modified checkpoint objects list objects and modified retained objects list objects (both of which are described in more detail below) are created by the Object Store sub-module for storage of information relating to checkpoints and retained checkpoints, respectively. An mnode object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the mnode object within the file or directory object.

The following is a summary of the data structures, which have been termed "onodes," employed by the Object Store sub-module to track locations of data stored on the disk. Additional details of the data structures are described later.

(It should be noted that these data structures are exemplary of only one embodiment of the present invention.)

An object is made of a root onode and optionally a number of indirect and direct onodes. There are also a number of other on disk objects and structures that are used to control checkpoints and retained checkpoints. These are all described below.

There are three kinds of onodes—root, direct, and indirect. When an object (such as a file or directory, for example) is created, there is created a corresponding root onode (actually a pair of root onodes, as described below). Each root onode is stored on the disk in a given sector number of the disk and the sector number uniquely identifies the root onode and therefore also the root onode's corresponding object. In a typical embodiment, each sector is 512 bytes, so the size of a root onode is similarly limited to 512 bytes. As will become apparent, aspects of the present file structure implementation are similar to a basic Unix file structure, but traditional Unix systems have only a fixed number of indirect pointers, and when the fixed number of pointers is used, then a file size limit is reached. Additionally (among other things), traditional Unix systems use such storage techniques only for files and do not employ an object storage model in the manner of various embodiments of the present invention.

Root onodes are actually created in pairs. Since a root onode is identified by a sector number, the other member of its pair is the next higher sector number. The pair structure is employed so that one root onode of the pair is valid and complete with respect to a checkpoint. The other member of the pair is then updated, when its corresponding object is modified, to reflect the new state of the object. In normal processing, both members of the pair are read, and the one with the higher checkpoint number is the one that is current.

Many file system requests involve disk usage, and such usage is conveniently described with respect to blocks; a block is a specified data storage unit, and in common embodiments may range in size from 2 Kbytes to 64 Kbytes.

The root onode data structure includes a checkpoint number to identify under which checkpoint this version of the object has been created. Also in the root onode data structure is a parameter to identify the type of object for which the root onode is providing metadata. The object type may, for example, be any of freespace, file, or directory. In addition to object type, the root onode also has a parameter for the length of the object in blocks.

Another root onode parameter is the reuse count. A reuse count parameter is employed because if an object is deleted, it goes onto a queue of free root onodes rather than back into free space. When a given root onode is assigned to a new object, the associated root onode reuse count is incremented. The reuse count is part of the file handle associated with the object. By incrementing the reuse count each time the root onode is reused, file requests using a file handle created from an older version of the root onode can be identified and rejected.

As suggested above, the root onode also carries a series of pointers. One of these is a pointer to any immediately preceding version of the root onode. If it turns out that a retained checkpoint has been taken for the pertinent checkpoint, then there may have been stored an immediately preceding version of the root onode in question, and the pointer identifies the sector number of such an immediately preceding version of the root onode.

For the actual data to which the root onode corresponds, there is a separate pointer to each block of data associated with the root onodes's object. The location of up to 18 data blocks is stored in the root onode. For data going beyond 18 blocks, a direct onode is additionally required, in which case the root onode also has a pointer to the direct onode, which is identified in the root onode by sector number on the disk.

Like the root onode, the direct onode includes a parameter identifying the checkpoint number with respect to which the direct onode has been created. The direct onode is arranged to store the locations of up to about 60 or 61 blocks data pertinent to the object corresponding to the direct onode's root onode.

When a first direct onode is fully utilized to identify data blocks, then one or more indirect onodes are used to identify the first direct onode as well as additional direct onodes that have blocks of data corresponding to the object. In such a case the root onode has a pointer to the indirect onode, and the indirect onode has pointers to corresponding direct onodes. When an indirect onode is fully utilized, then additional intervening indirect onodes are employed as necessary. This structure permits fast identification of a part of a file, irrespective of the file's fragmentation.

The structure of direct and root onodes has another feature that, among other things, permits fast creation of large files, which typically are set to a 0 value when first created. This feature is a flag for each block pointer, in each root and direct onode, to identify whether the corresponding block has a 0 value.

There is a related feature that also facilitates the fast creation of large files. In any onode, every pointer to a block or to another onode has a bit to identify whether or not the block or onode has been actually created. In a case where the relevant blocks and onodes have not yet been created, then blocks and onodes are created as necessary to accommodate write requests, and the allocation bit is toggled accordingly. Note that creating a block requires allocation of space from the Free Space Allocation sub-module, writing the data to the block, and setting the bit flags for the pertinent onodes.

For recovery purposes, there is also stored a transaction log of all onodes that have been modified in a current checkpoint. Moreover, the root onodes are not written to disk, until there is established a complete transaction log on disk of all modified root onodes. (Root onodes have this delayed write feature. Other onodes do not, and do not need to, since they are accessed only through root onodes.) In recovery mode with respect to a current invalid checkpoint, if the onode was modified in the current checkpoint, then the previous checkpoint value is used. (Note that onode contents are stored on disk along with the transaction log, as well has being maintained on the fly in metadata cache.)

Onode structure is also established, in this embodiment, in a manner to further reduce disk writes in connection with onode structure. In the end the onode structure must accommodate the storage not only of file contents but also of file attributes. File attributes include a variety of parameters, including file size, file creation time and date, file modification time and date, read-only status, and access permissions, among others. This connection takes advantage of the fact that changing the contents of a root onode can be performed frequently during a given checkpoint, since the root onode is not yet written to disk. (It will be recalled that disk writes of root onodes are delayed.) So a portion of the root onode is reserved for storage of file attributes.

More generally, the following structures for storage of file attributes are defined:

enode (little overhead to update, limited capacity). This structure is defined in the root onode and is 128 bytes.

lnode (intermediate overhead to update, and with greater capacity than the enode. The lnode is the first n bytes (typically 0-64K) of an object representing a file or directory (and which is therefore stored on disk in places pointed to by the root onode for the object). The lnode is used for such attribute information as, for CIFS purposes, a security descriptor.

mnode (expensive in overhead to update, near infinite capacity). This is a dedicated object for storage of data and therefore has its own storage locations on disk; the object is identified in the enode (or alternatively in the lnode).

The following provides a more detailed discussion of object storage in connection with the embodiment of FIG. 3.

1.2 Root Onode

Each root onode is 512 bytes in length. The following information is stored in the root onode:
- The checkpoint number with which this version of the object was created.
- The data length for this version of the object.
- The number of levels of indirection used in the runlist for this object.
- The type of the object. This is primarily used as a sanity check when a request comes in to access the object.
- A reuse count to say how many times this root onode has been used.
- A pointer to an older root onode version made for a retained checkpoint (if there is one).
- A pointer to a newer root onode version (will only be valid if this is a copy of a root onode made for a retained checkpoint).
- Up to 19 data block descriptors. Each data block descriptor includes a pointer to a data block, the checkpoint number with which the data was created, and a bit to say whether the block is zero filled.
- A single pointer to either a direct onode or an indirect onode.
- The 128 bytes of enode data for this object.
- A CRC and various sanity dwords to allow the root onode to be checked for validity.

For a given object, there are two places where the current valid version of the root onode could be stored. These are at a byte offset into the volume of either (obj_num*512) or ((obj_num*512)+512). To find which one is the most up to date, they must both be read in, and the one which both passes all the validation checks and has the later creation checkpoint number is the latest valid version.

As discussed in Section 4 below, an object may include copies of root onodes that are created each time a retained checkpoint is taken. The pointer to the older root onode version and the pointer to the newer root onode version allow a doubly-linked list of root onodes to be created including the current root onode and any copies of root onodes that are created for retained checkpoints. The doubly-linked list facilitates creation and deletion of retained checkpoints.

1.3 Indirect Onode

The indirect onode provides a level of indirection between the root onode and the direct onode. Each indirect onode is 1 Kbyte in length. Although it is possible to pack a pair of indirect onodes into a disk block having a minimum disk block size of 2 Kbytes, each indirect onode is typically stored in a separate disk block for the sake of simplicity.

The following information is stored in the indirect onode:
- The checkpoint number with which the indirect onode was created.
- Up to 122 pointers to either indirect or direct onodes.
- A CRC and various sanity dwords to allow the indirect onode to be checked for validity.

As with the root onode currently valid indirect onodes are kept in pairs with one of the indirect onodes in the pair containing the most up to date version of the indirect onode. However, unlike the root onode there is no need to read in both of the indirect onodes to work out which one is the most up to date, as the currently valid indirect onode will be pointed to directly from the current root onode.

1.4 Direct Onode

The direct onode provides direct pointers to data blocks on the disk. Each direct onode is 1 Kbyte in length which means that a direct onode pair can fit into a current minimum disk block size of 2 Kbytes.

The following information is stored in the direct onode:
- The checkpoint number with which the direct onode was created.
- Up to 62 data block descriptors. Each data block descriptor includes a pointer to a data block, the checkpoint number with which the data was created, and a bit to say whether the block is zero filled.
- A CRC and various sanity dwords to allow the indirect onode to be checked for validity.

1.5 Dynamic Superblock

On the disk there are two dynamic superblocks—only one of which is considered to be the most up to date at any given point in time. These are used to record the state of the checkpoints on the disk.

The following information is stored in each dynamic superblock:
- The checkpoint number associated with this dynamic superblock.
- The handle of the modified checkpoint objects list object for this checkpoint.
- The object number of the modified retained objects list object from the last retained checkpoint.
- The state of this checkpoint. Possible states are WRITTEN_OBJ_LIST and CHECKPOINT_CREATED.
- A CRC and various sanity dwords to allow the indirect onode to be checked for validity.

Successive checkpoints alternate between which of the dynamic superblocks to use. When the software opens the volume it must read in both dynamic superblocks—the one with the later checkpoint number which has the volume state marked as CHECKPOINT_CREATED and passes all the sanity checks identifies the latest valid checkpoint on this volume. The OBJ_STORE_OPEN_VOLUME call specifies which dynamic superblock the Object Store sub-module should use first—this will be the one which didn't specify the most up to date checkpoint.

1.6 Modified Checkpoint Objects List Object

At the start of each checkpoint, a modified checkpoint objects list object is created. Each time a different object is created or modified as part of this checkpoint, its object number is written to the modified checkpoint objects list object so that, when the checkpoint is created, there is an object that lists all the objects created or modified in that checkpoint.

1.7 Modified Retained Objects List Object

At the start of each retained checkpoint, a modified retained objects list object is created. Each time a different object is created or modified following creation of the retained checkpoint, and until the next retained checkpoint is taken, its object number is written to the modified retained objects list object.

2. BASIC OBJECT OPERATIONS

2.1 Object Creation and Deletion

When an object is first created (using a WFS API OBJ_CREATE call) it just has a root onode (actually a pair of root onodes) with no pointers to any indirect onodes, direct onodes, or data blocks.

One thing to note is that, once a disk block has been allocated as a root onode, it must never be used for anything else. This is because the handle returned for the root onode contains an object number which is the sector offset on the disk of the root onode. If the object were deleted and a client which had the handle cached then came in with another request for the file, the object store would go and read the data on the disk at the location specified by the object number. If this disk block had been reused, there is a possibility that it would look like a root onode (or actually be a new root onode) which could cause all sorts of problems.

To get around this problem, the following three things are done:

1. When a root onode is deleted its object type is set on the disk to be OBJ_TYPE_DELETED so that if a client tries to read the object in again the object store will know that the object has been deleted.
2. When objects are deleted the disk space used by their root onode is not returned to the free space allocation controller. Instead deleted root onodes are kept in a linked list of free root onodes (note that unlike data blocks it is safe to reuse these freed data blocks before a checkpoint is taken, due to the paired arrangement of the root onode). When an object is created, a free root onode is used if one is available. New disk space for the root onode is allocated only if no free root onodes are available.
3. When a root onode is first created using newly allocated free space it is given a reuse count of zero. Each time the root onode is reused for a new object the reuse count is incremented. Because the reuse count forms part of the handle returned to the client, this means that old handles referencing root onodes which have been reused will be detected as being invalid, because the reuse count will be wrong.

2.2 Object Data Creation

Figure 7:
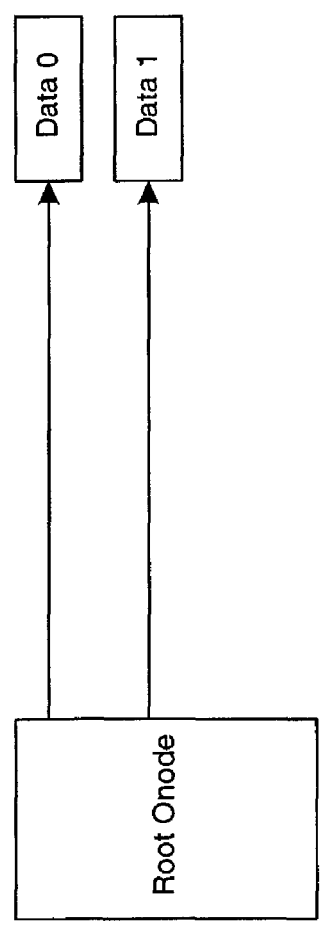
FIG. 7 is a block diagram showing use of a root onode with no other onodes in accordance with the embodiment of FIG. 3.

As data is created, it is first of all put into data blocks pointed to directly from the root onode. This is illustrated in the diagram of FIG. 7, showing use of a root onode with no other onodes. Note that, for the sake of simplicity in this and all the following diagrams, the root onode and direct onode are shown as having only two data pointers, and the indirect onode is shown as only having two indirect or direct onode pointers.

Figure 8:
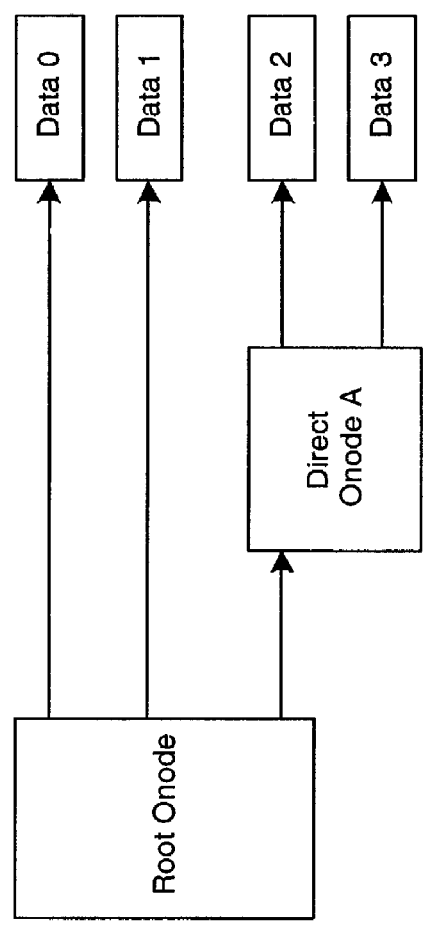
FIG. 8 is a block diagram showing employment of a root onode with a direct onode.

Once all the direct block pointers in the root onode are filled, then a direct onode A is created with a pointer from the root onode to the direct onode. FIG. 8 shows employment of a root onode with this direct onode A. Note that the root onode has multiple data block pointers but only a single pointer to either a direct or an indirect onode.

Figure 9:
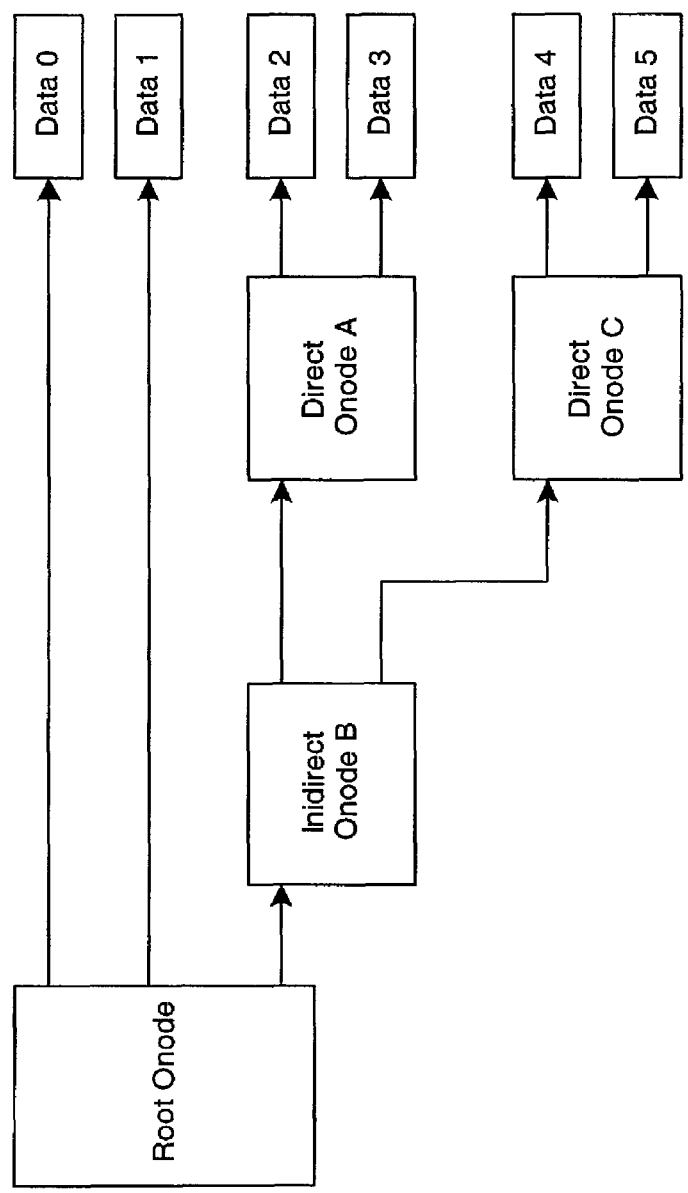
FIG. 9 is a block diagram showing employment of a root onode with an indirect onode as well as direct onodes.

If the data in the object grows to fill all the data pointers in the direct onode, then an indirect onode B is created, as illustrated in FIG. 9. FIG. 9 shows employment of a root onode with an indirect onode as well as direct onodes. The pointer in the root onode which was pointing to the direct onode A, is changed to point at the indirect onode B, and the first pointer in the indirect onode B is set to point at the direct onode A. At the same time a new direct onode C is created, which is also pointed to from the indirect onode B. As more data is created more direct onodes are created, all of which are pointed to from the indirect onode.

Figure 10:
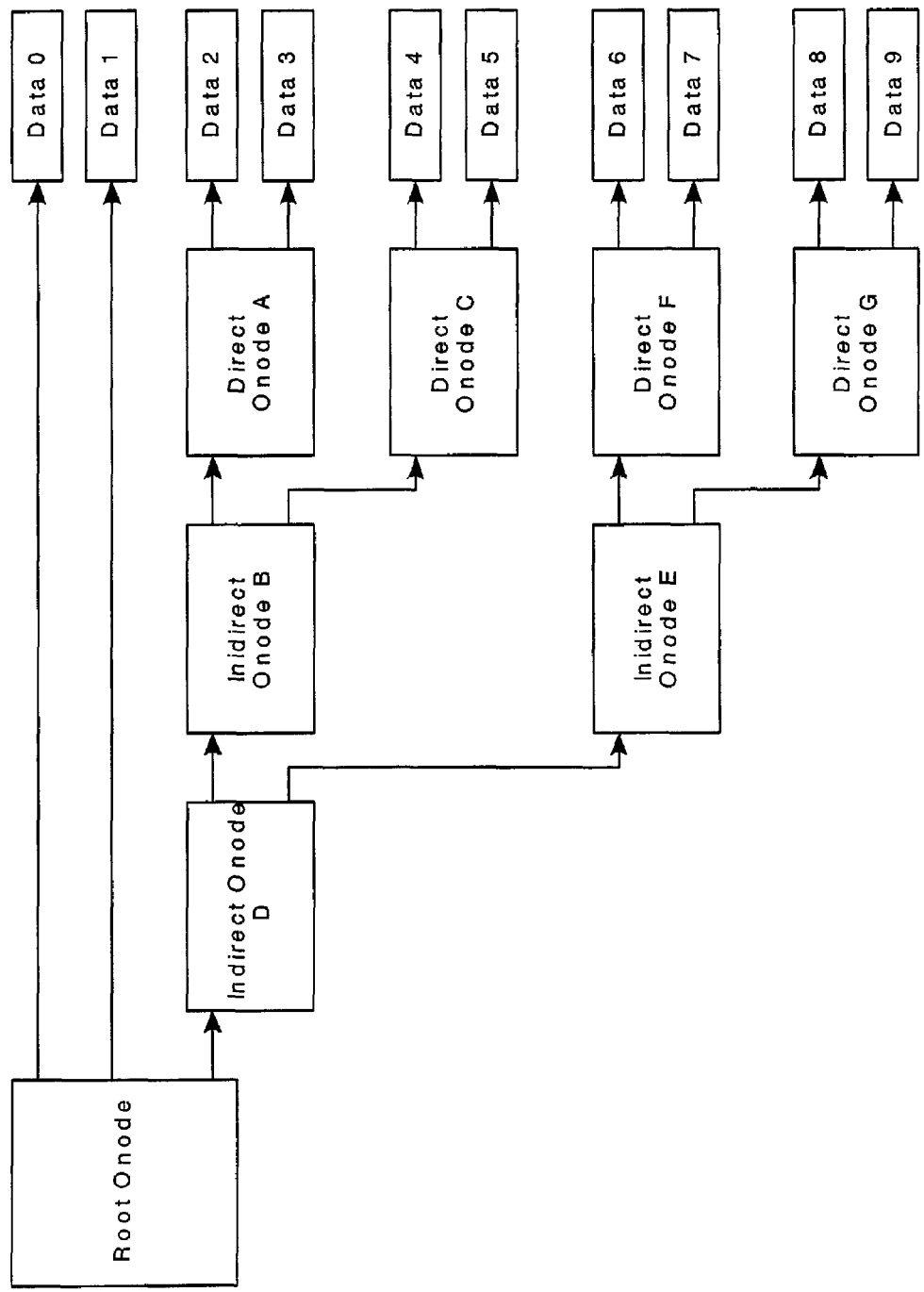
FIG. 10 is a block diagram illustrating use of multiple layers of indirect onodes placed between the root onode and the direct onodes.

Once all the direct onode pointers in the indirect onode B have been used another indirect onode D is created which is inserted between the root onode and the first indirect onode B. Another indirect onode E and direct onode F are also created to allow more data blocks to be referenced. These circumstances are shown in FIG. 10, which illustrates use of multiple layers of indirect onodes placed between the root onode and the direct onodes.

This process of adding indirect onodes to create more levels of indirection is repeated to accommodate however much data the object contains.

It should be noted that the lnode portion of an object is handled by the Object Store sub-module as any other data portion of the object. The Object Store sub-module does not distinguish the lnode portion from the data portion, and does not automatically allocate the lnode portion. Rather, the entity that creates or modifies the object (typically sub-modules upstream from the Object Store sub-module, such as the File System File sub-module or the File System Directory sub-module) must determine how much space to leave for the lnode as data is added to the object.

2.3 Object Data Deletion

As data is deleted from the object and data blocks and direct and indirect onodes are no longer required they are returned to the free space allocation controller.

In accordance with one embodiment, the number of levels of indirection as the object gets smaller, until all the data in the object can be referenced via the direct block pointers in the root onode, at which point all the remaining direct and indirect onodes are freed and the indirection level will be set to zero.

2.4 Zero Filling

If a write to a file is done which has a start offset beyond the current end of the file, then the undefined portion of the file between the current end and the start of the new write data must be filled with zeroes. The same thing occurs if the length of the object is set to be greater than the current length.

This is particularly problematic if a file is created and then the length is set to be, say, 1 GB. In a straightforward implementation this would require that the disk blocks allocated to the file actually be written to with zeroes. For a 1 GB file, this would take of the order of 10 seconds. For a 1 TB file, it will take on the order of 3 hours.

In embodiments of the present invention, this problem is avoided by having a bit with each data block pointer to say whether that block is zero filled. If the Object Store sub-module sees this bit set, then it knows that this block should be filled with zeroes, even though on disk it may contain something completely different. If the block is read, then Object Store sub-module will return zeroes for this block rather than its on-disk contents. If the block is written to with a write which doesn't fill the entire block, then the Object Store sub-module will first write zeroes to all of the block which isn't being written to and will reset the zero filled bit for this block.

Note that, in this case, disk blocks will be allocated for all zero filled portions of the file, although the disk blocks will not be filled with zeros.

2.5 Sparse Onode Structures

Once the zero filling problem has been solved, the next order problem with setting the length of an object to some very large value is the time it takes to allocate the data blocks and create the required direct and indirect onode structure. With a disk block size of 4K, a 1 TB object requires approximately 4 million direct onodes as well as a lesser number of indirect onodes. This would take in the order of 40 seconds to write to disk. Also the free space allocation of all the data blocks required, and the subsequent updates to the free space bitmap, would significantly add to this time. If a checkpoint were to be taken immediately after the file creation begins, the entire system would stop servicing requests (to any volumes) for the whole of this time.

In an embodiment of the invention, this problem is solved by a twofold approach. The first aspect of the solution is not to actually allocate disk blocks for the zero filled portions of the file. This means that when the object store sees a write to a zero filled block it would first have to allocate disk space for that block and put a pointer to it in the relevant onode structure.

The second aspect builds on the first and says, in addition to not allocating the data blocks, don't create the onode structure either. To implement this aspect, each onode pointer has a bit to say whether the onode it points to is allocated or not. If not, when an operation comes along which requires that onode to be valid, only then is disk space allocated for it and the correct pointer inserted. In this way a huge zero filled object will have only a root onode, which can obviously be created very quickly.

3. CHECKPOINTS 3.1 Introduction to File System Consistency

One of the essential features of a file system is the ability to maintain file system consistency in the event of a system crash.

For embodiments of the file system herein, a checkpoint mechanism is used to maintain file system consistency, with, however, implementations differing from those of the prior art. Instead of always writing metadata to new areas of disk, as in typical prior art systems, two copies of any given piece of onode metadata are maintained, one of which is valid and the other of which may be in the process of being updated. If the system crashes while one copy is being updated, the system can revert to the other copy, which is guaranteed to be valid. For user data, the system can, on a per object basis, have the option of either always writing it to new areas on disk or overwriting the existing data to give either consistency in user-triggered file system data structure saves or higher performance and no file fragmentation. All of this is described in more detail in the following sections.

3.2 User Data Handling

User-data handling is considered first, as what is done with the user data affects how the metadata is handled.

It is important first to define that by "user data" it is meant anything not contained in an object's root onode, indirect onodes or direct onodes. What is user data to the object store may be metadata (such as a directory listing or a free space bitmap) to another part of the file system embodiment herein. For data such as this, it is important to make sure that the data on disk in the checkpoint is consistent in order to ensure that the on-disk file system is always consistent—even if the contents of the NVRAM are lost.

Root onodes are always written to the storage module using delayed write commands. Delayed writes are marked with a tag number, and the data associated with them is not written to disk until a tag flush is done with the correct tag number—see the section on onode handling for a description of why this is done. One problem with this is that there must be an assurance that the sector cache on the storage module never fills up with dirty root onodes as this would lock the entire system up. For the other onode structures and onode data, normal tagged writes can be used, with a different tag number to that used for root onodes. This gives the storage module the option of not having to wait for the tag flush before writing them to disk and reduces the danger of the sector cache filling up.

The onode user data can be handled in a number of different ways. Two data handling modes, namely data copy mode and data overwrite mode, and an optional third data handling mode, namely data pair mode, are discussed below. The data handling modes are selectable on a per object basis.

Data Copy Mode

Objects using this mode guarantee that both the checkpointed metadata and user data for the object will be consistent. This mode should be used for user data which to other blocks in the system is actually metadata.

In data copy mode, when it is time to write to a data block that was previously written with an earlier checkpoint number, the following is done:

Allocate a new data block.

Copy the contents of the old block to the new block (not required if the new data fills the entire block).

Write the new data to the new block.

Update the onode data pointers to point at the new block.

Return the old block to the free space allocation controller.

The last step may seem somewhat unusual as, at this point, the old block is still part of the previous checkpoint, and there would be trouble if the Free Space Allocation sub-module then gave the block out again in response to a free space request, as the checkpointed data would then be overwritten. However, one of the requirements for the Free Space Allocation sub-module is that blocks returned to it as free space are never given out again until after a checkpoint has been taken. This makes the last step safe.

Data Overwrite Mode

Objects using this mode guarantee that checkpointed metadata will be consistent but not necessarily checkpointed user data. This mode could be used for all data which is true user data (i.e. file contents).

In data overwrite mode, when it is time to write to a data block that was previously written with an earlier checkpoint number, the following is done:

Write the new data to the old data block.

Note that in overwrite mode, there is only a problem with data consistency if the system crashes and the contents of the NVRAM are lost. As long as the NVRAM is functioning, the user data can be placed into a consistent state by replaying the contents of the NVRAM. This is summarized in the table below.

| Mode | NVRAM enabled | On disc file system after crash | Data written since last checkpoint after crash |
| --- | --- | --- | --- |
| Data Copy | Yes | Metadata and user data completely consistent | Completely recoverable from NVRAM |
| Data Copy | No | Metadata and user data completely consistent | Lost |
| Data Overwrite | Yes | Metadata internally completely consistent, but inconsistent with respect to the user data | Completely recoverable from NVRAM. When recovered the on disc user data and metadata are then consistent. |
| Data Overwrite | No | Metadata internally completely consistent, but inconsistent with respect to the user data | Lost |

Data Pair Mode

Considering an object such as the free space object, it will need to use data copy mode as it contains file system metadata. However, in this mode it is likely to become highly fragmented as it is constantly being updated.

For objects of this type, a mode is included whereby every data block has a pair in the same way as with the onode structures. This would allow swapping between the blocks in the pair as the data is checkpointed. Doing this would help to alleviate the problem of file fragmentation as well as eliminate the need for the Free Space Allocation sub-module to handle all the allocation and freeing of blocks as the object is modified.

Note that the free space object is particularly conducive to this sort of treatment as in normal operation it never changes size.

3.3 Onode Handling

As has already been explained every onode structure (root, indirect or direct onode) is actually made up of a pair of the structures. For want of better names, the individual structures will be referred to as the left hand side (LHS) and right hand side (RHS) of the pair.

Figure 11:
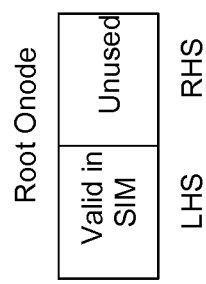
FIG. 11 is a diagram illustrating creation of a root onode during checkpoint A in accordance with the embodiment of FIG. 3.

Consider first of all the creation of a root onode during checkpoint A, which is illustrated in FIG. 11. When it is first created the root onode is written to the LHS of the pair. Note that, because the root onode is written to using delayed writes so although it is valid in the storage module, it will not get written to disk until a checkpoint is created.

All changes to the root onode (such as writes to the object or the deletion of the object and the creation of a new object using the same root onode) which take place before checkpoint A is created will be done on the LHS root onode.

Figure 12:
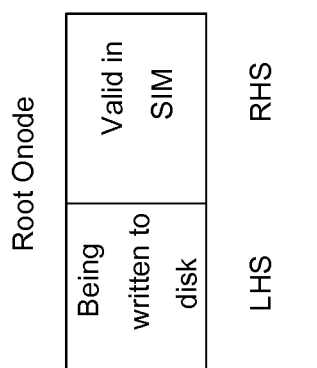
FIG. 12 is a diagram illustrating the effect of making further modifications, to the root onode of FIG. 11, that are written to the right hand side of the root onode.

When it is time to create checkpoint A, a tagged flush is issued which causes the LHS to be written to disk. If while the checkpoint is being taken some more modifications are made to the root onode (which will be reflected in checkpoint B) these are written to the RHS of the root onode, as shown in FIG. 12.

Figure 13:
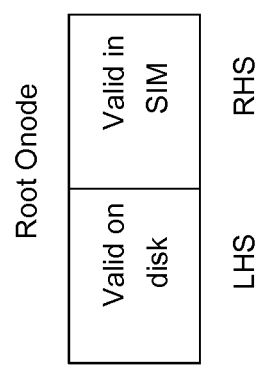
FIG. 13 is a diagram illustrating the effect of the creation of checkpoint A, and wherein root onode of FIG. 12 has been written to disk.

Once checkpoint A has been created and the root onode has been written to disk the root onode pair has the appearance illustrated in FIG. 13.

Figure 14:
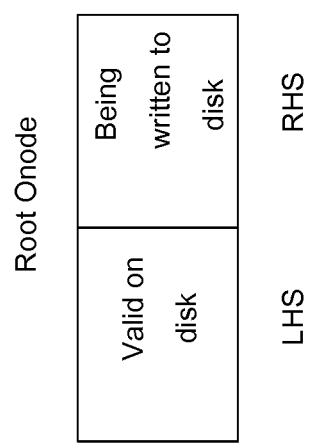
FIG. 14 is a diagram illustrating the effect of the creation of checkpoint B for the same root onode.

Suppose that the system begins to create checkpoint B. When the tagged flush for B is issued, the root onode will have the appearance of FIG. 14.

Suppose again that while the RHS of the root onode for checkpoint B is still being written to disk the object is modified again as part of checkpoint C. The LHS version of the root onode on disk still contains the latest valid checkpoint A, since checkpoint B has not yet been created. Delayed writes can therefore be used to update the LHS, but must ensure that none of the changes to the LHS are written to disk until checkpoint C is created. The situation while checkpoint B is being created is shown in FIG. 15.

It might appear that, once checkpoint B has been created, the system can start to write the LHS root onode for checkpoint C to disk. This is true for direct and indirect onodes but not for root onodes. The reason for this is that if the system were to crash before checkpoint C had been created, but by then the LHS of the root onode had been written to disk, then, when the object store came to read the pair of root onodes to find out which was the latest valid one, it would think that the LHS root onode associated with checkpoint C was the most up to date, which would be incorrect. For this reason, before any root onodes are written to disk, a modified checkpoint objects list is written in order to say which root onodes are going to be modified. This allows the system to recover from a crash whilst updating root onodes. This is covered further in the section on restoring a checkpoint.

Note that, for the sake of simplicity in all the following diagrams, this intermediate state where the checkpoint is in the middle of being created is ignored.

Figure 16:
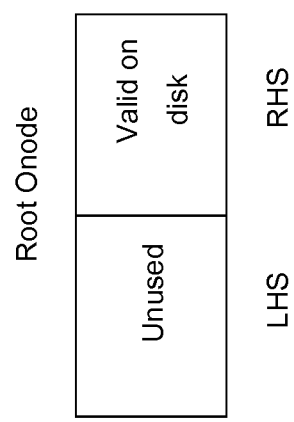
FIG. 16 is a diagram for the starting point of an illustration of a root onode that is part of an object structure having 2 levels of indirection.

Imagine that the system starts with a root onode that looks as shown in FIG. 16.

Figure 17:
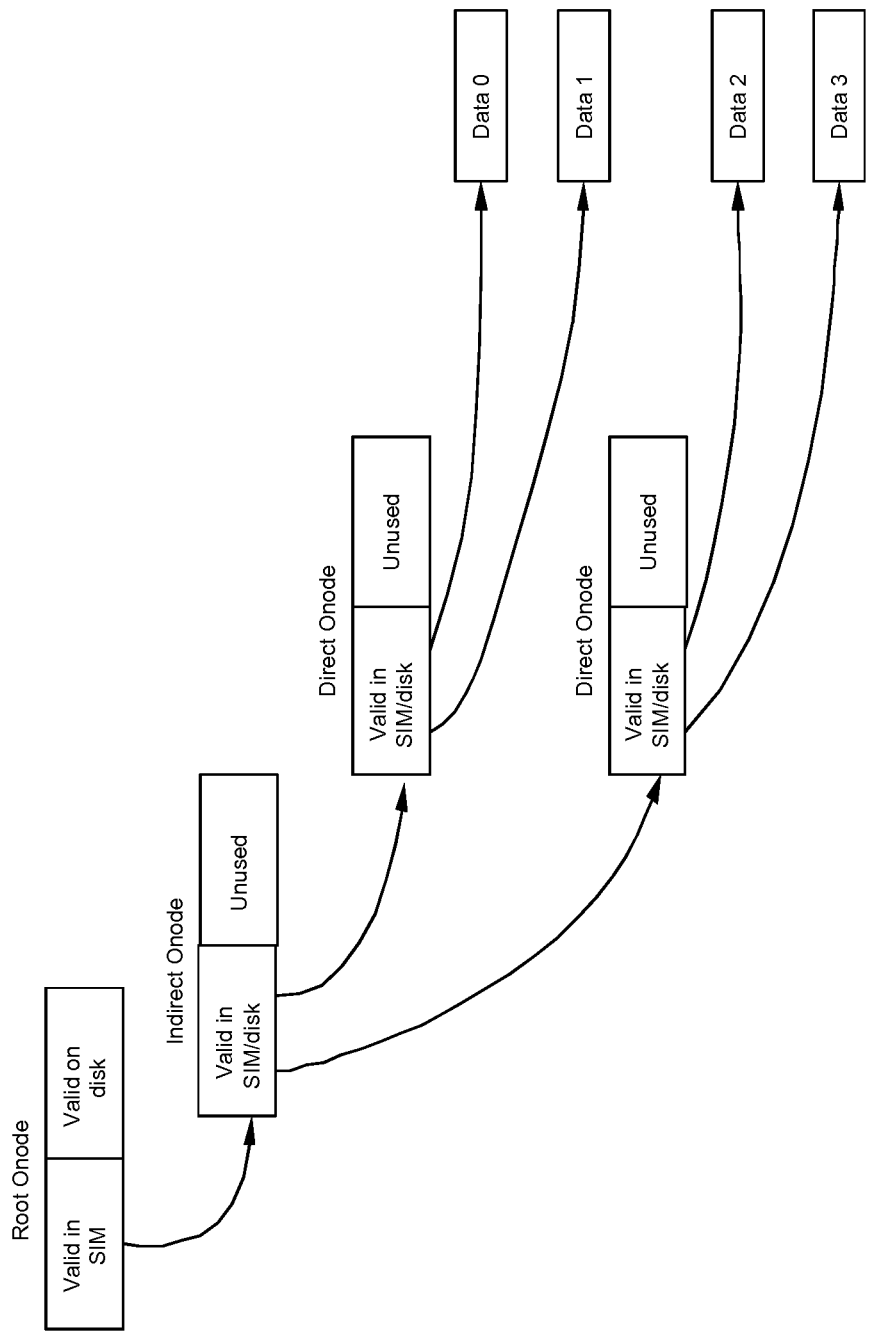
FIG. 17 is a diagram that illustrates the structure of the object to which corresponds the root onode of FIG. 16.

Suppose the root onode is now extended such that there are two levels of indirection. Before taking the checkpoint, the structure will have the appearance of FIG. 17. Note that the indirect and direct onodes are all written with delayed writes before the previous checkpoint has been fully created and tagged writes once the previous checkpoint is valid on disk. The data is all written with tagged writes.

Figure 18:
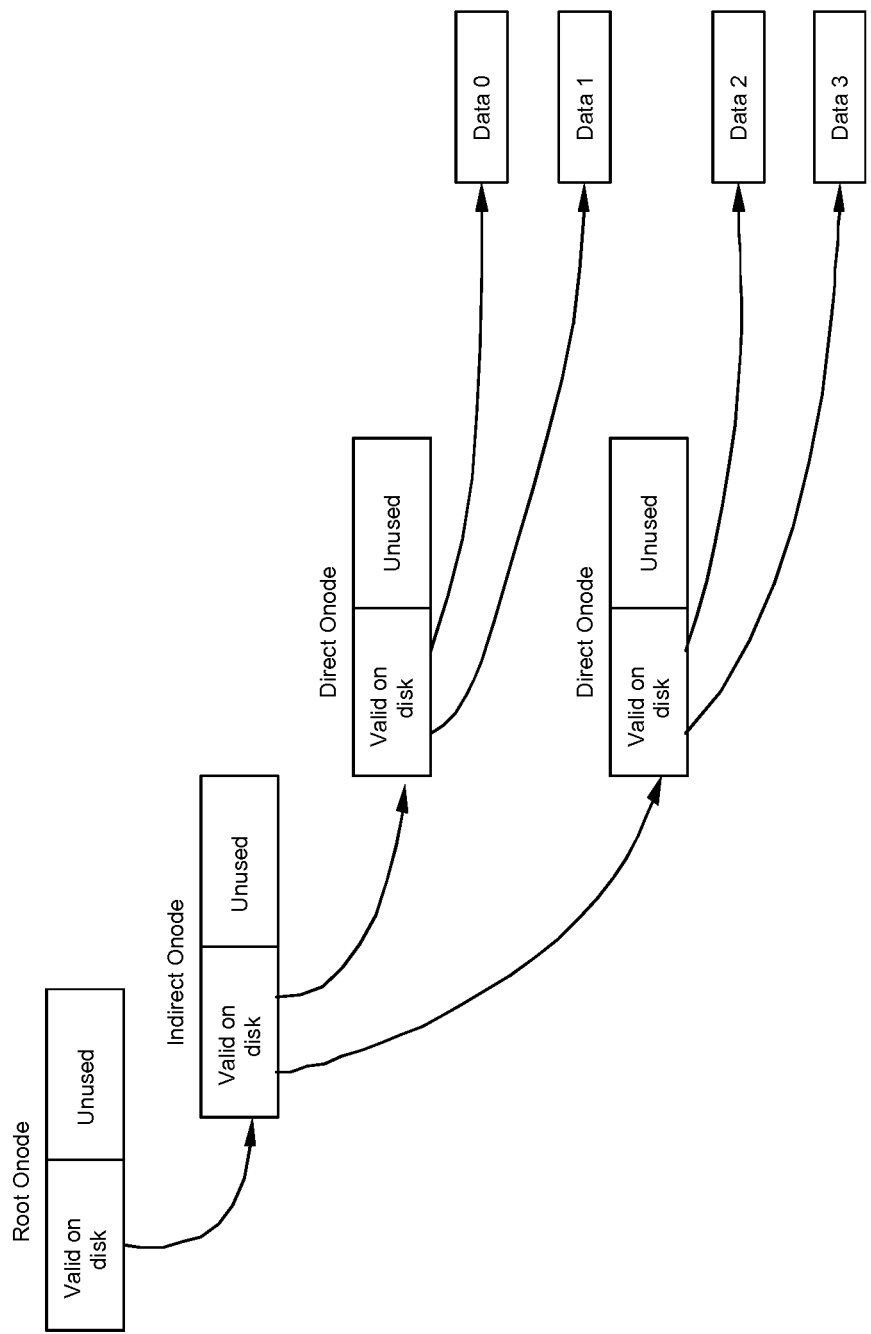
FIG. 18 is a diagram that illustrates the effect of taking a checkpoint with respect to the object illustrated in FIG. 17.

If a checkpoint is then taken, the structure will have the appearance of FIG. 18.

Figure 19:
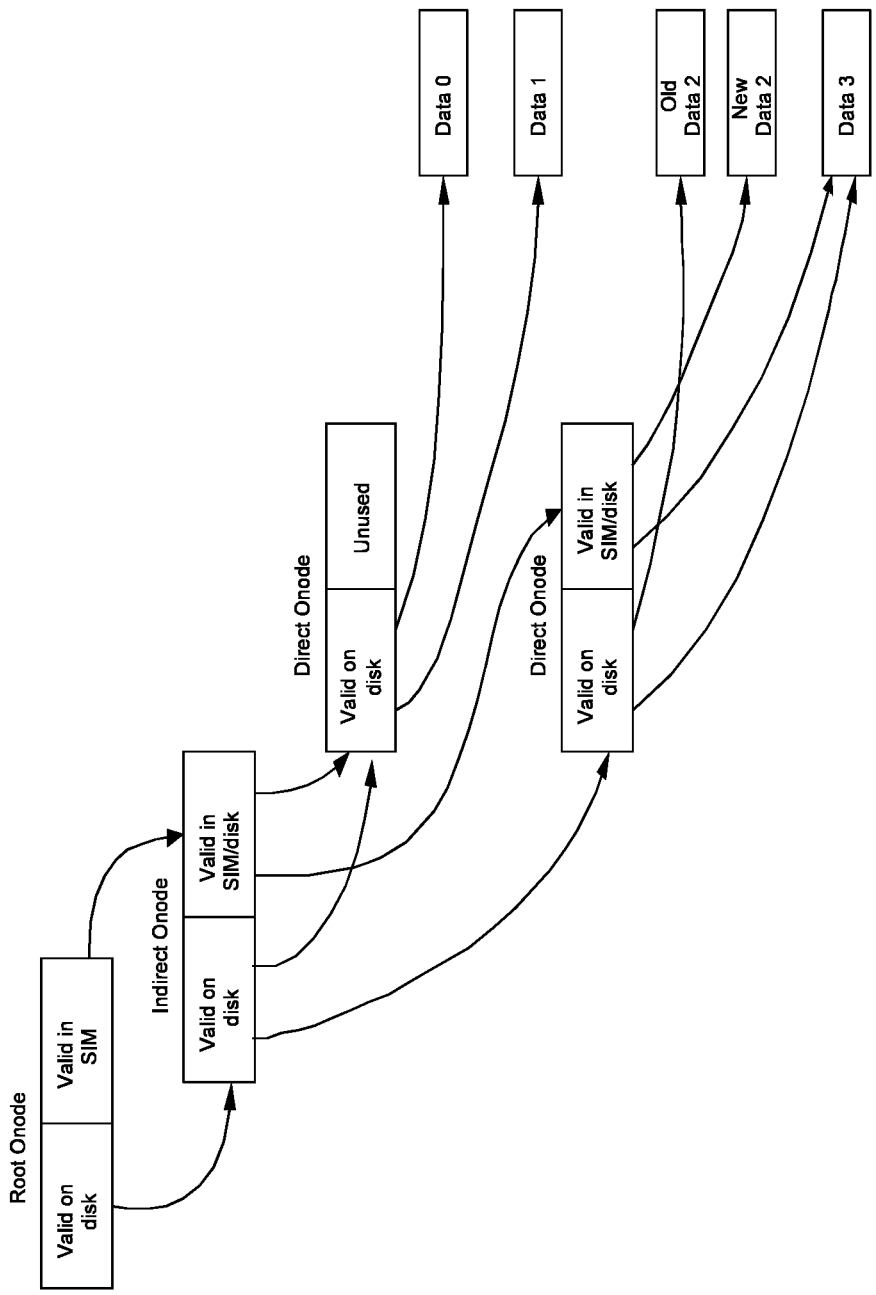
FIG. 19 is a diagram that illustrates, with respect to the structure of FIG. 18, the effect of allocating a new data block 2 and updating all of the onode structures to point at this new block, before a new checkpoint has been taken.

Now suppose a write to data block 2 is done with the object in data copy mode. In this case, a new data block 2 is allocated and all of the onode structures are updated to point at this new block. Before the checkpoint the structure will have the appearance illustrated in FIG. 19. Note that the checkpointed data has been preserved as the original, and the original data block 2 has not been modified.

Figure 20:
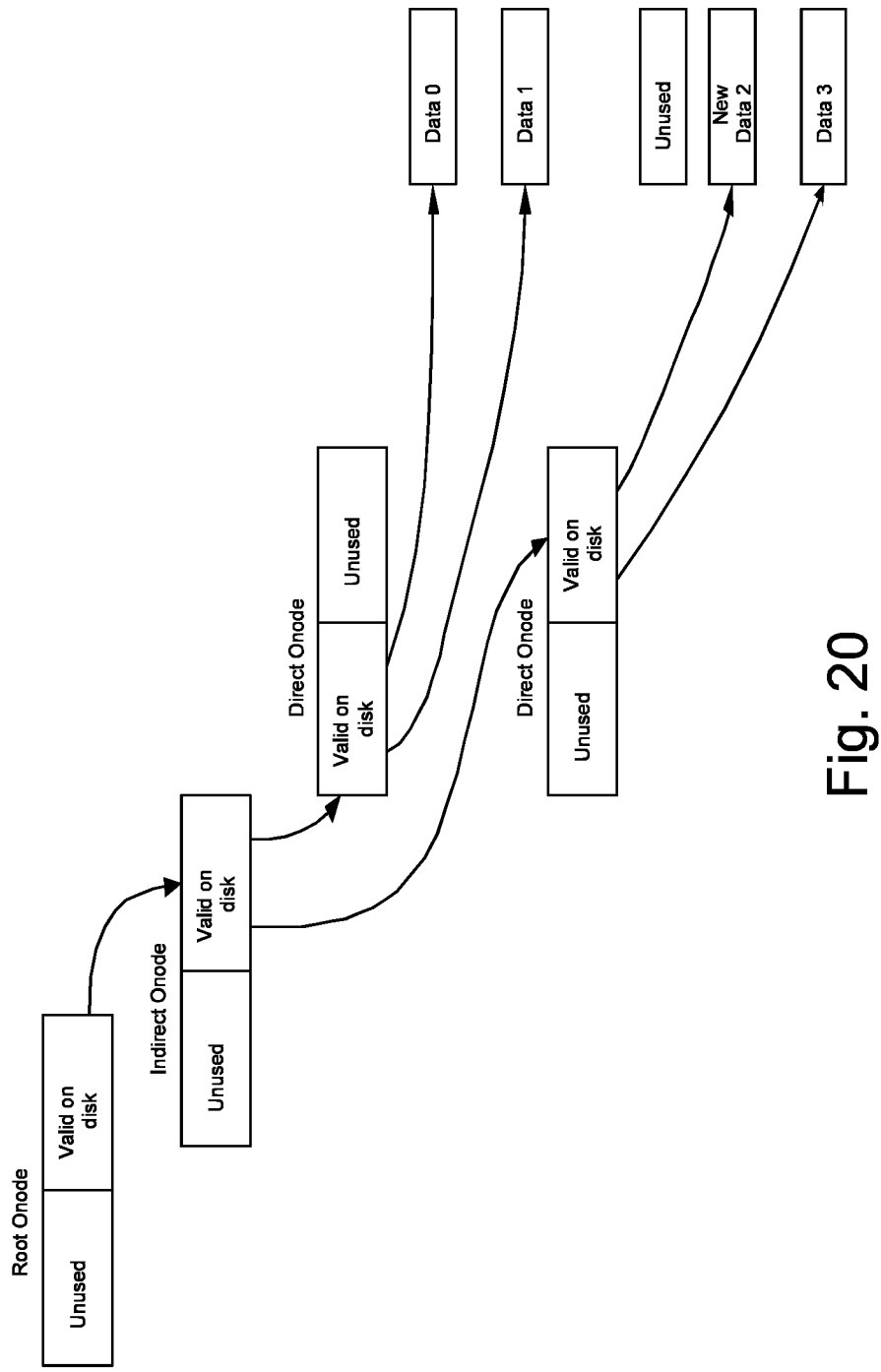
FIG. 20 is a diagram that illustrates, with respect to the structure of FIG. 19, the effect of taking checkpoint with respect to the data structure of FIG. 19.

And after the checkpoint the structure will have the appearance shown in FIG. 20.

Figure 21:
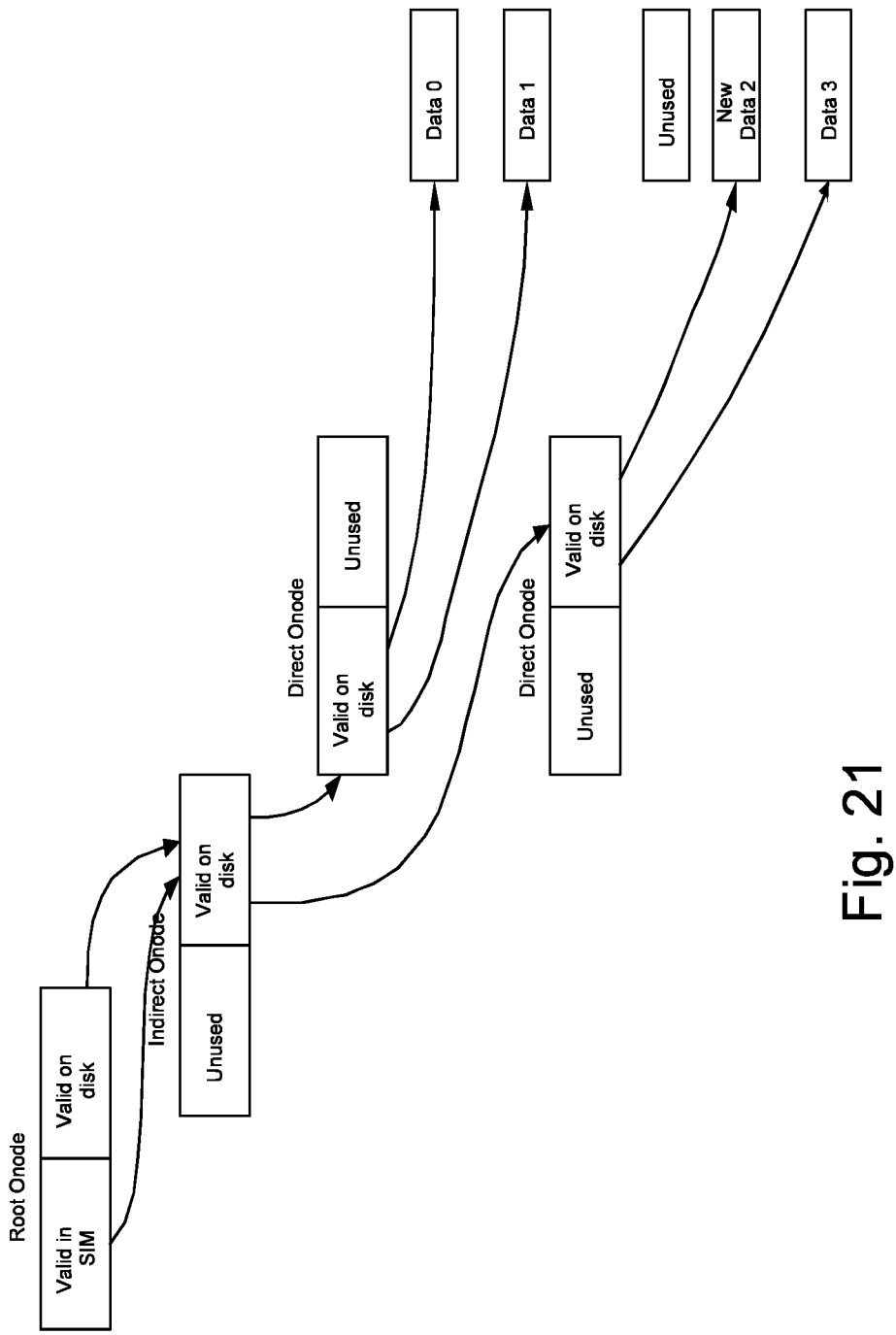
FIG. 21 is a diagram that illustrates, with respect to the structure of FIG. 20, the effect of writing to data block 1 with the object in data overwrite mode.

Suppose now that with this new structure, data block 1 is written with the object in data overwrite mode. In this case, only the root onode (which will have a new enode) is updated as nothing else in the enode structure is changing. Note that in this mode the checkpointed data has been corrupted as the checkpointed version of block 0 has been modified. The result of this activity is illustrated in FIG. 21.

3.4 Storage Module Tag Numbers

During the checkpoint process a number of different storage module tag numbers are used. These are detailed in the table below.

| Tag Number | | | | Storage Module |
|---|---|---|---|---|
| Checkpoint N | Checkpoint N + 1 | Checkpoint N + 2 | Used for | Inquiry Type |
| T0 | T2 | T0 | Modified checkpoint objects list | Tagged Writes |
| D0 | D2 | D0 | Root Onodes | Delayed Writes |
| D1 | D3 | D1 | Direct & Indirect Onodes before previous checkpoint has been created | Delayed Writes |
| T1 | T3 | T1 | Direct & Indirect Onodes and Onode Data | Tagged Writes |
| T4 | T4 | T4 | Dynamic Superblock | Tagged Writes |

A given 32K storage module sector cache block can only be in one delayed write tag queue and one non delayed write tag queue. There is therefore the question of what happens if the same block is written to with different tag numbers.

The dynamic superblock is arranged such that it is the only thing in its 32K sector cache block which means that the sector cache block in which it lives can never be written to with a different tag number.

For a given buffer if there are both root onode delayed writes and direct and indirect onode delayed writes for the same checkpoint number the buffer must end up on the root onode delayed write tag queue.

For the two delayed write inquiries the checkpoint is currently organized such that there should never be any buffers with delayed write tags from checkpoint N when starting to do delayed writes for checkpoint N+1. If a cache block could be in two delayed write tag queues with separate dirty block bitmaps for each then the system could start to do delayed writes for the next checkpoint before the delayed write tagged flushes for the previous checkpoint have been issued. This is discussed in more detail in the section of taking a checkpoint below.

For the other two tagged write structures the way the checkpoint is currently organized there should never be any tagged buffers in the storage module from checkpoint N when the system starts doing tagged writes for checkpoint N+1. Within a checkpoint if a cache block is written to which already has a tag number assigned to it, an assurance is needed to make sure that the block ends up in the modified checkpoint objects list tag queue. This would become more complicated if the performance improvement proposed below were made to decrease the time the system is unable to process new requests while taking the checkpoint.

3.5 Taking a Checkpoint—the Simple Version

There are various reasons why the file system software may need to take a checkpoint.

The half of the NVRAM being used for this checkpoint is becoming full.

The sector cache on the storage module is becoming full.

It is more than a previously determined period of time (typically 10 seconds) since the last time a checkpoint was taken.

The user has requested that a retained checkpoint be taken.

There may be other times when it is necessary, desirable, or convenient to take a checkpoint.

At a system level taking a checkpoint involves the following operations on each volume which is mounted:

1. Halt all operations in the system so that the file system is in a consistent state.
2. Tag flush the modified checkpoint objects list object in the storage module.
3. Update this checkpoints dynamic superblock to say that the modified checkpoint objects list object has been written.
4. Tag flush the onode structures and onode data in the storage module.
5. Update the dynamic superblock to say that this checkpoint has now been created.

As soon as step 4 has commenced the system can begin to process new inquiries.

3.6 Taking a Checkpoint—Details

Figure 22:
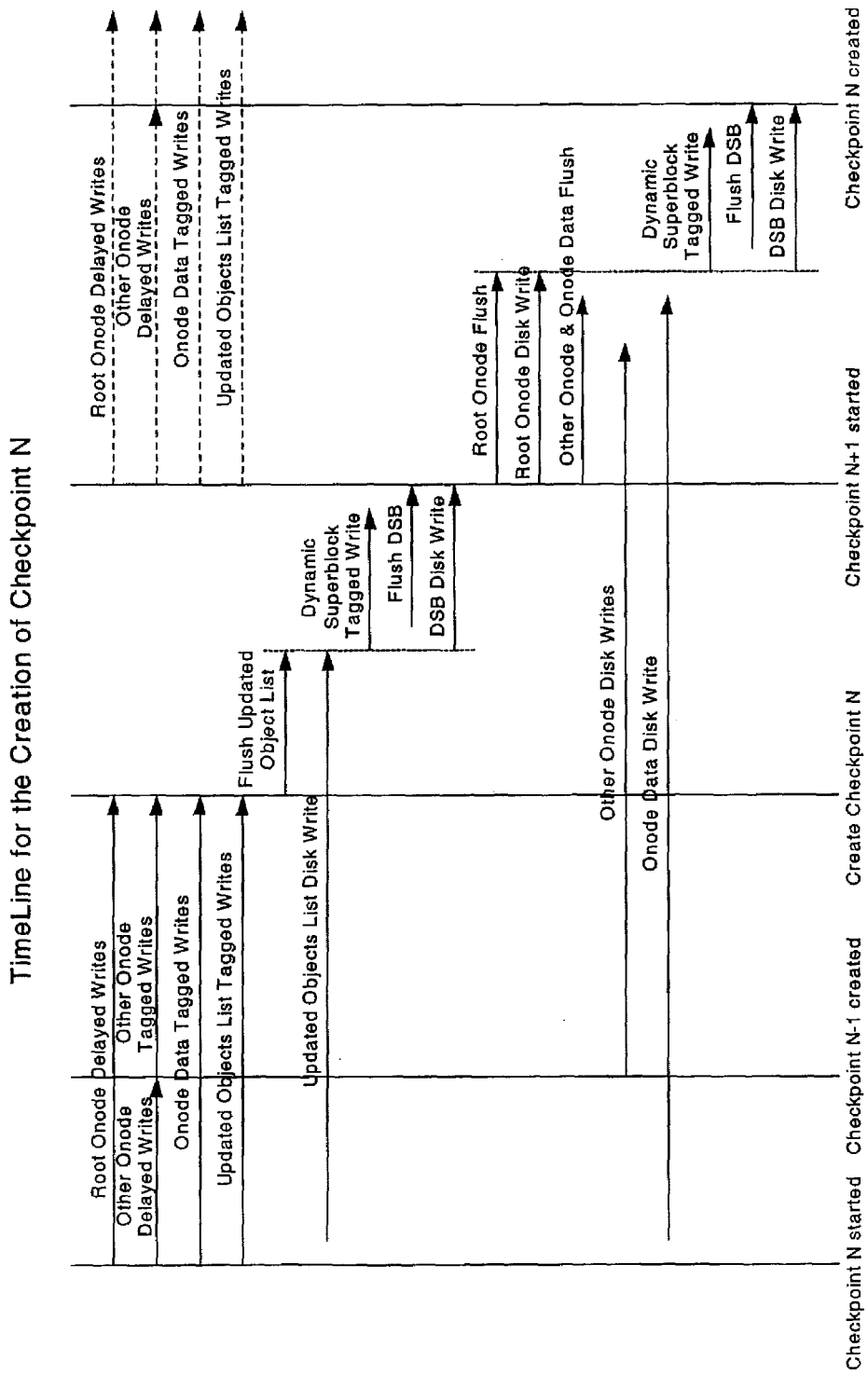
FIG. 22 is a timeline showing steps in creation of a checkpoint.

The description below details the actual operations required to take a checkpoint. These matters are summarized in FIG. 22. The operations are described assuming only a single volume is mounted—if there are multiple volumes then the operations in each step are repeated for each volume mounted.

1. The file system software waits until it has pushed a set of operations into the Non-Volatile Storage Processing sub-module which when completed will give a consistent file system.
2. The software then pushes a WFS_CREATE_CHECKPOINT inquiry into the Non-Volatile Storage Processing sub-module. This command includes the checkpoint number to use for the next checkpoint.
3. The Non-Volatile Storage Processing sub-module waits until all the commands prior to the checkpoint inquiry have been pushed to both the File System File sub-module and its cluster pair machine (if there is one), and it has stored all of those commands in its own NVRAM.
4. The Non-Volatile Storage Processing sub-module generates a new checkpoint command which has Non-Volatile Storage Processing sub-module as the source and the File System File sub-module as the destination. The Non-Volatile Storage Processing sub-module can then begin to process more requests from the processor, which now get stored in the other half of the NVRAM, and can begin to pass these requests on to the File System File sub-module.
5. The File System File sub-module waits until all the commands prior to the checkpoint inquiry have completed. Until this happens it can't begin to process any new commands from the Non-Volatile Storage Processing sub-module. Note that this is the point in the whole checkpoint operation where the longest delay is likely to be incurred—our current estimate being that on a busy file system this operation might take 10s of milliseconds. One option to alleviate this would be to allow the File System File sub-module to continue to process operations that won't make any modifications to the disk while waiting for outstanding operations to complete.
6. The File System File sub-module then generates a new checkpoint inquiry with the File System File sub-module as the source and the File System Directory sub-module as the destination. At this point it can begin to process new command from the Non-Volatile Storage Processing sub-module.
7. Steps 5 and 6 are then repeated for the File System Directory sub-module and File System Tree sub-module. Note that for each of these shouldn't be any need to wait for outstanding operations to complete as the wait in step 5 should have ensured that there are no outstanding operations.
8. When the Object Store sub-module receives the checkpoint command from the File System Tree sub-module it sends a create checkpoint inquiry to the Free Space Allocation sub-module. At this point it also stops processing any new inquiries from the File System Tree sub-module interface.
9. The Free Space Allocation sub-module sends back the checkpoint response when it has completed any outstanding free space inquiries and updated the appropriate bitmaps. Note that it must continue to process new free space inquiries (and wait for these to complete) while waiting to send the checkpoint response as the object inquiries it is sending to the Object Store sub-module may result in more free space inquiries being generated by the Object Store sub-module. Measures should be taken to prevent or escape from an "endless loop" situation caused by processing free space inquiries and waiting for free space inquiries to complete before sending the checkpoint response.
10. When the Object Store sub-module receives the checkpoint response from the Free Space Allocation sub-module it sends a tagged flush to the storage module to tell it to flush the modified checkpoint objects list object for this volume. The modified checkpoint objects list is an object which records the object number of all the objects which have been modified during the current checkpoint on a given volume.
11. When the TAG_FLUSH of the modified checkpoint objects list object completes the Object Store sub-module writes to the dynamic superblock for this checkpoint number with the state set to WRITTEN_OBJ_LIST and the handle of the objects list object. This needs to be written through to disk using a tagged write followed by a tagged flush. Note that the flush of the direct and indirect onodes and onode data could be issued at the same time as this is done in order to get the checkpoint written more quickly (although this may increase the time taken to write the dynamic superblock).

12. When the dynamic superblock has been written to disk a tagged flush can be issued for all the root onodes (and for the direct and indirect onodes if this hasn't been done earlier).

13. At the same time as the tag flush is issued the Object Store sub-module can begin work on the next checkpoint. This means updating the current checkpoint number to be the one indicated in the checkpoint inquiry, switching over to using the correct tag number for all the structures in the new checkpoint and starting to process inquiries from File System Tree sub-module again. Alternatively, if the storage module cache controller is changed so that a 32K cache block could be in two delayed write tag queues (with a separate dirty block mask for each) it would be possible to begin work on the next checkpoint at the same time as the tag flush is issued in step 10. This could improve performance as there may be a significant delay between steps 10 and 12.

14. When the two tagged flushes of the onode data and onode structures completes the Object Store sub-module writes to the dynamic superblock for this checkpoint number with the state set to WRITTEN_CHECKPOINT. This needs to be written through to disk using a tagged write followed by a tagged flush.

15. When the dynamic superblock has been written to disk the checkpoint has been successfully created. The Object Store sub-module sends a checkpoint response to the File System Tree sub-module which via the File System Directory sub-module and the File System File sub-module results in a checkpoint response getting back to the Non-Volatile Storage Processing sub-module. When this sees the checkpoint response it can discard all the saved data in the NVRAM associated with this checkpoint.

16. The Non-Volatile Storage Processing sub-module then passes the response back to the processor. Only when the processor has seen the checkpoint response can it request the generation of another checkpoint.

3.7 Restoring a Checkpoint

When a volume is mounted, the system will normally want to go back to the last valid checkpoint.

To work out which this is the software needs to read in both of the dynamic superblocks. Both of them should be valid. The way that Object Store sub-module writes the dynamic superblock should ensure that writing a superblock cannot leave the system with a corrupted dynamic superblock on disk. Additional measures could be taken to better assure that both dynamic superblocks are valid, for example, performing two checkpoint operations before allowing any operations to be performed on the volume.

Assuming that both of the dynamic superblocks are valid the software then looks for the one with the later checkpoint number. There are two possibilities for the state of this superblock.

WRITTEN_OBJ_LIST

This state means that the object store had written the modified checkpoint objects list to disk but hadn't yet written out all onode structures and onode data when the system crashed. This implies that it was an unclean system shutdown and that the last valid checkpoint on disk is the one recorded in the other dynamic superblock—the state of which should be WRITTEN_CHECKPOINT.

In this state some of the root onodes on disk may have been updated as part of the creation of this checkpoint. This would be a problem when reading in this root onode as of the pair of the one written in this checkpoint would look like the latest valid one, which would be incorrect as this checkpoint wasn't complete. Note that the same problem doesn't apply to all the other onode structures as the correct one out of the pair to use is pointed to directly by the object that references it.

This problem is handled by making use of the modified checkpoint objects list. This is written to disk before any changes are made to the root onodes and provides a transaction log of which root onodes are going to be modified in the checkpoint. In the case of the checkpoint failing the software reads the modified checkpoint objects list object and goes through each of the objects it points to. For each of these it must read in the pair of root onodes and if either of them was written to in the invalid checkpoint it is invalidated.

WRITTEN_CHECKPOINT

This state means that the object store wasn't in the process of writing onode structures and data to disk when the system went down and the checkpoint number defined in this dynamic superblock is the last valid checkpoint on disk. This doesn't mean that the volume was shutdown cleanly, so there may still be operations in the NVRAM which need to be replayed.

4. RETAINED CHECKPOINTS

A checkpoint is only valid until the next checkpoint has been created, at which point the checkpoint no longer exists. Therefore, a user-triggered mechanism is provided for retaining a checkpoint such that it will remain valid and accessible (read-only) until the user chooses to delete it. As discussed above, such a checkpoint that is retained through this user-triggered mechanism is referred to herein as a retained checkpoint. The Object Store sub-module is capable of maintaining multiple retained checkpoints. As long as a retained checkpoint remains active, the onodes and data blocks that comprise the retained checkpoint cannot be modified or returned to free space. It should be noted that an onode or data block can be a component of multiple retained checkpoints, and a particular onode or data block cannot be returned to free space as long as the onode or data block is a component of at least one retained checkpoint.

4.1 Creating a Retained Checkpoint

A retained checkpoint is initially created on a given volume by performing the following sequence of operations:

1. Take a checkpoint.
2. Issue a command to the Object Store sub-module for the required volume to create the retained checkpoint.
3. Take another checkpoint.

When the Object Store sub-module receives the command to create the retained checkpoint, it updates a record indicating which checkpoint number the last retained checkpoint on the volume was created with. This is recorded in the dynamic superblock and gets saved to disk when the checkpoint in operation 3 is taken. It should be noted that a retained checkpoint can be taken on multiple volumes in operation 2.

4.2 Modifying an Object after a Retained Checkpoint

Whenever the Object Store sub-module receives a request to modify an object, it first checks the root onode object to determine the checkpoint number at which the root onode object was created. If the root onode object was created prior to creation of the last retained checkpoint, then the root onode object is part of that last retained checkpoint. In this case, the root onode object cannot be modified as described above, as this would corrupt the version of the object in the retained checkpoint. Rather, the object is modified in a special way as described by example below.

Figure 23:
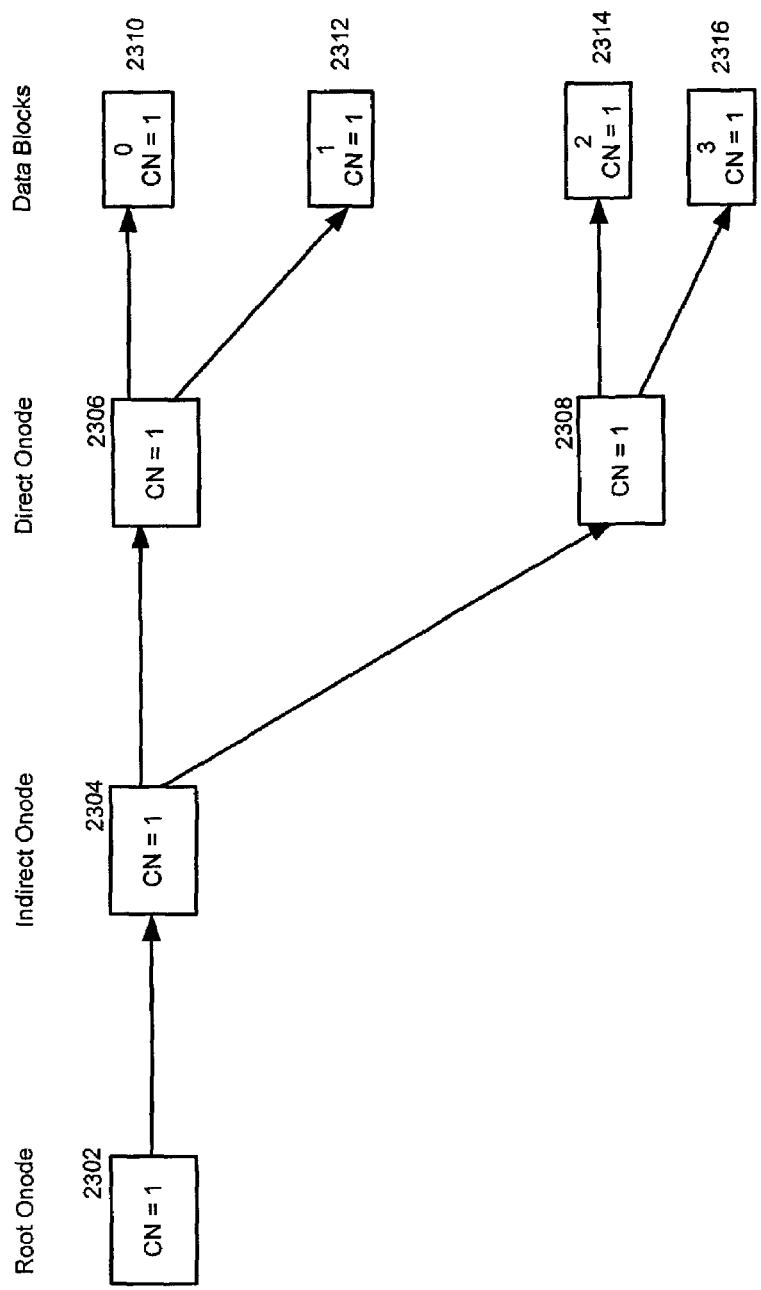
FIG. 23 is a diagram that shows the structure of an exemplary object that includes four data blocks and various onodes at a checkpoint number 1.

FIG. 23 shows an object structure for an exemplary object that was created at a checkpoint number 1. The object includes four data blocks, namely data block 0 (2310), data block 1 (2312), data block 2 (2314), and data block 3 (2316). A direct onode 2306 includes a pointer to data block 0 (2310) and a pointer to data block 1 (2312). A direct onode 2308 includes a pointer to data block 2 (2314) and a pointer to data block 3 (2316). An indirect onode 2304 includes a pointer to direct onode 2306 and a pointer to direct onode 2308. A root onode 2302 includes a pointer to indirect onode 2304. All onodes and all data blocks are marked with checkpoint number 1.

Suppose now that a retained checkpoint is taken at checkpoint number 2, and data block 0 (2310) is to be modified in checkpoint number 3.

In this case, the Object Store sub-module first loads the root onode 2302 for the object and realizes that the root onode 2302 (which was created at checkpoint number 1) was created prior to the last retained checkpoint being taken at checkpoint number 2. It is preferable for the most up-to-date root onode be at the sector number indicated by the object number, in order to optimize access to the most up-to-date version of the object. Therefore, before doing anything else, the Object Store sub-module saves a copy of the old root onode 2302 to free space on the disk, writes a pointer to the saved root onode into the updated root onode, and writes a pointer to the updated root onode into the saved root onode.

Figure 24:
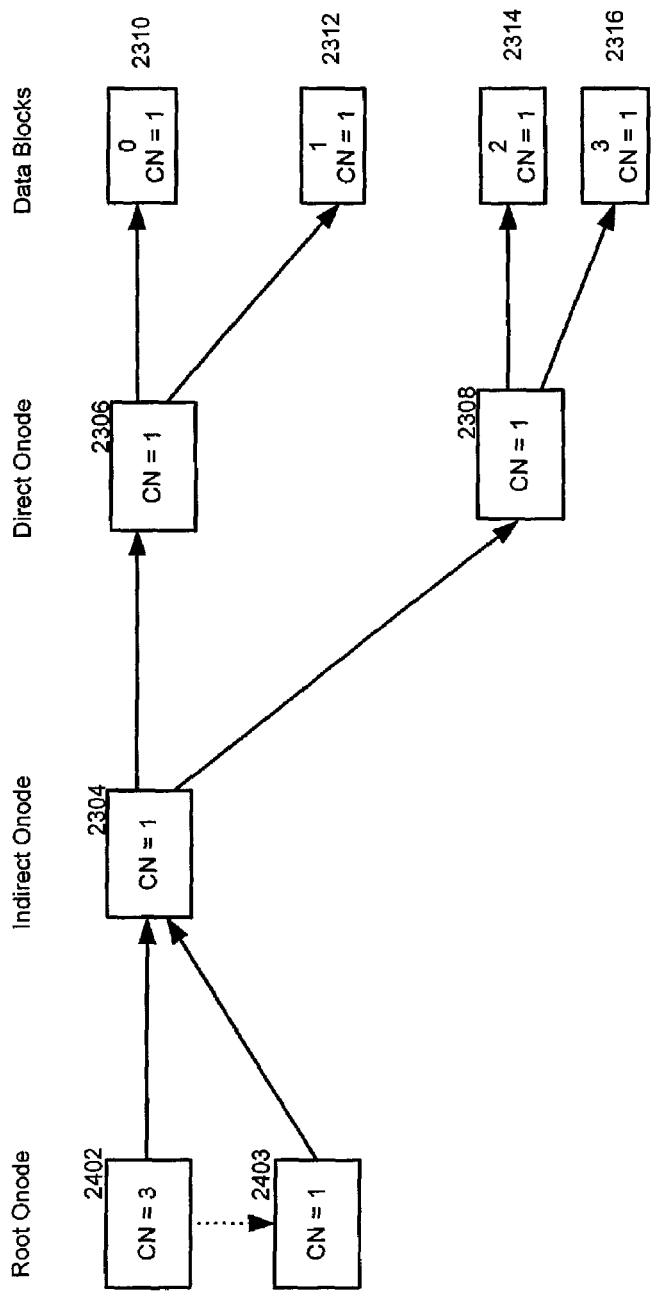
FIG. 24 is a diagram that shows the structure of the exemplary object of FIG. 23 after a retained checkpoint is taken for a checkpoint number 2 and during modification of a data block 0 during a checkpoint number 3, specifically after a copy of the object's root onode is saved to free space and the root onode is updated to include a pointer to the saved root onode in accordance with an embodiment of the present invention.

FIG. 24 shows the object structure after a copy of the old root onode is saved to free space on the disk. Specifically, block 2403 represents the copy of the old root onode 2302 saved to free space on the disk. A pointer to the current root onode 2402 is written into the saved root onode 2403. Block 2402 represents the updated root node with checkpoint number 3. A pointer to the saved root onode 2403 is written into the current root onode 2402.

The Object Store sub-module then traverses the object structure starting at the root onode until it reaches the descriptor for data block 0 (2310). Since data block 0 (2310) was created prior to the last retained checkpoint being taken, it cannot be modified. Instead, the Object Store sub-module writes a copy of data block 0 (2310), with the required data modifications, to free space on the disk.

Figure 25:
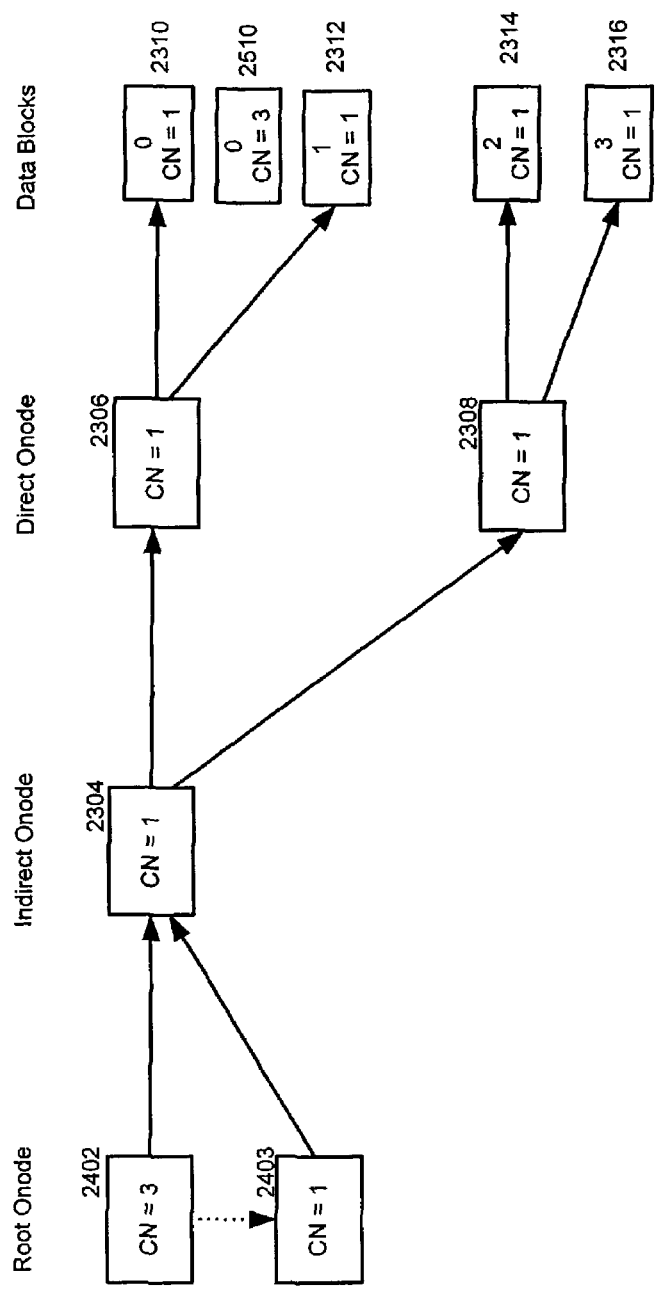
FIG. 25 is a diagram that shows the structure of the exemplary object of FIG. 24 after a modified copy of the data block is written to free space in accordance with an embodiment of the present invention.

FIG. 25 shows the object structure after a modified copy of data block 0 is written to free space on the disk. Specifically, block 2510 represents the modified copy of data block 0 written to free space on the disk. Block 2510 includes checkpoint number 3 (i.e., the checkpoint at which it was created).

The Object Store sub-module now needs to put a pointer to the new data block 2510 in a direct onode, but the Object Store sub-module cannot put a pointer to the new data block 2510 in the direct onode 2306 because the direct onode 2306 is a component of the retained checkpoint. The Object Store sub-module therefore creates a new direct onode with pointers to the new data block 0 (2510) and the old data block 1 (2312).

Figure 26:
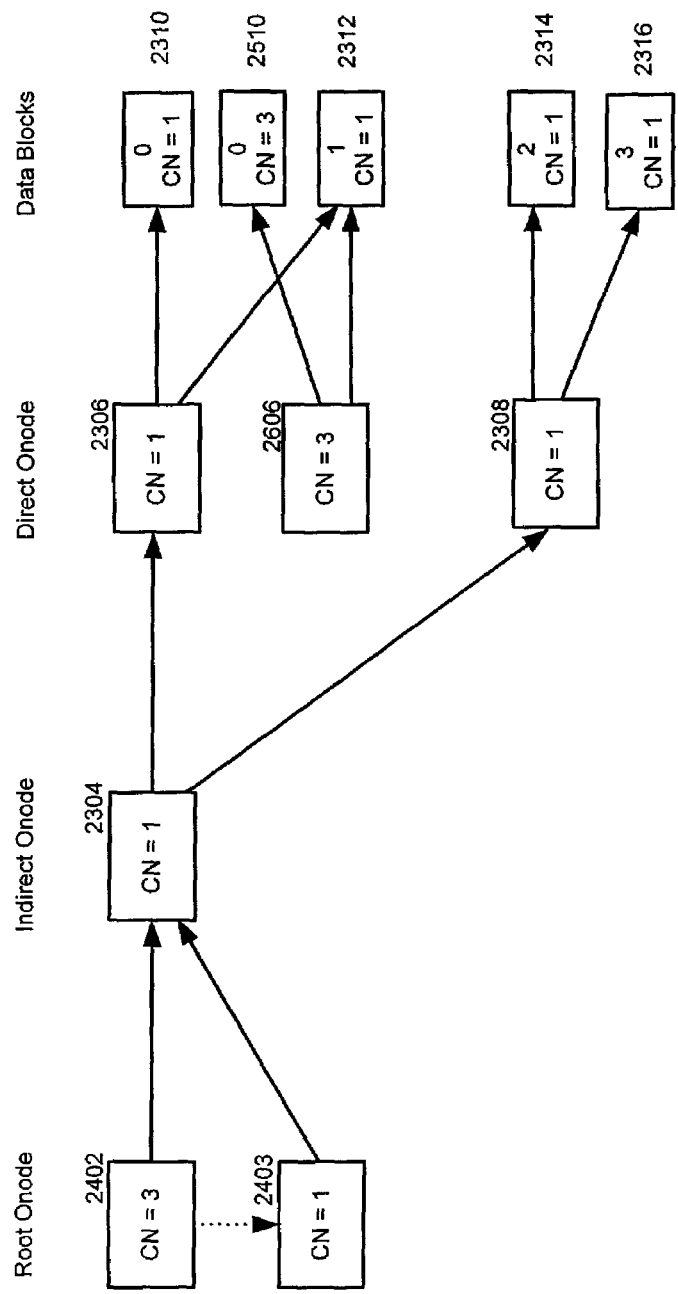
FIG. 26 is a diagram that shows the structure of the exemplary object of FIG. 25 after a new direct onode is created to point to the modified copy of the data block in accordance with an embodiment of the present invention.

FIG. 26 shows the object structure after a new direct onode is created for the new data block. Specifically, block 2606 represents the new direct onode. Block 2606 includes checkpoint number 3 as well as pointers to the new data block 0 (2510) and the old data block 1 (2312).

The Object Store sub-module now needs to put a pointer to the new direct onode 2606 in an indirect onode, but the Object Store sub-module cannot put a pointer to the new direct onode 2606 in the indirect onode 2304 because the indirect onode 2304 is a component of the retained checkpoint. The Object Store sub-module therefore creates a new indirect onode with pointers to the new direct onode 2606 and the old direct onode 2308.

Figure 27:
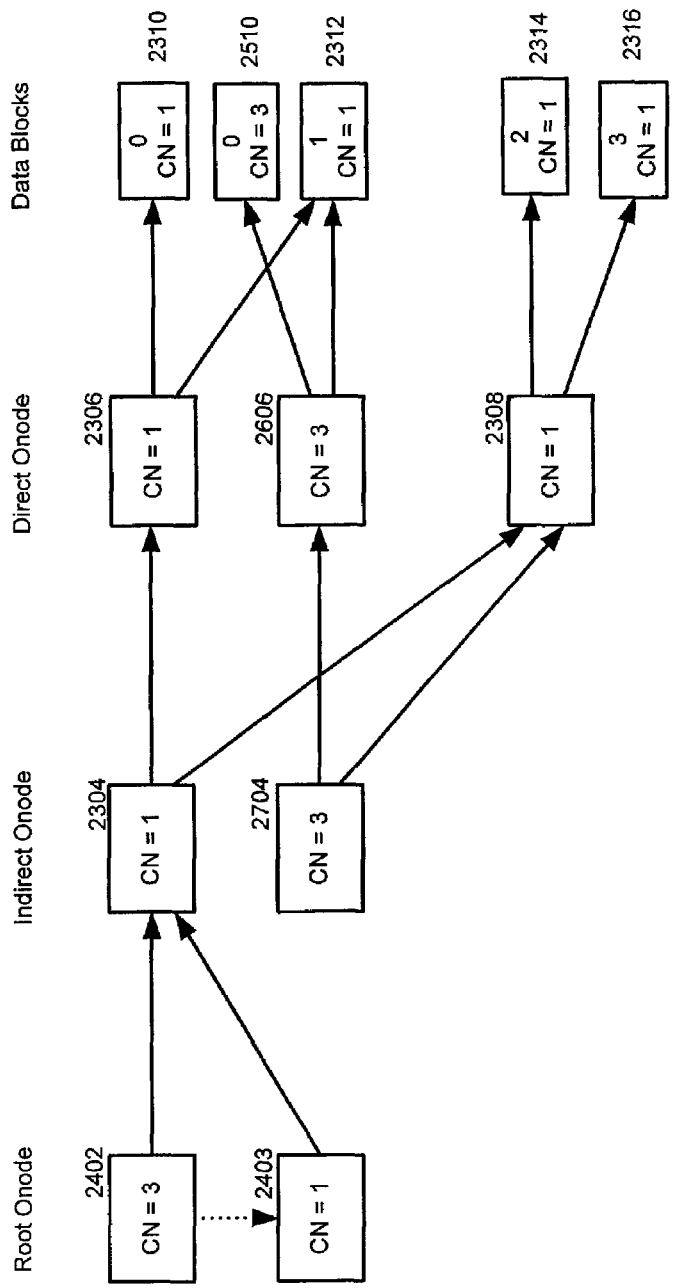
FIG. 27 is a diagram that shows the structure of the exemplary object of FIG. 26 after a new indirect onode is created to point to the new direct onode in accordance with an embodiment of the present invention.

FIG. 27 shows the object structure after a new indirect onode is created for the new direct onode. Specifically, block 2704 represents the new indirect onode. Block 2704 includes checkpoint number 3 as well as pointers to the new direct onode 2606 and the old direct onode 2308.

Finally, the Object Store sub-module writes a pointer to the new indirect onode 2704 in the current version of the objects root onode 2402.

Figure 28:
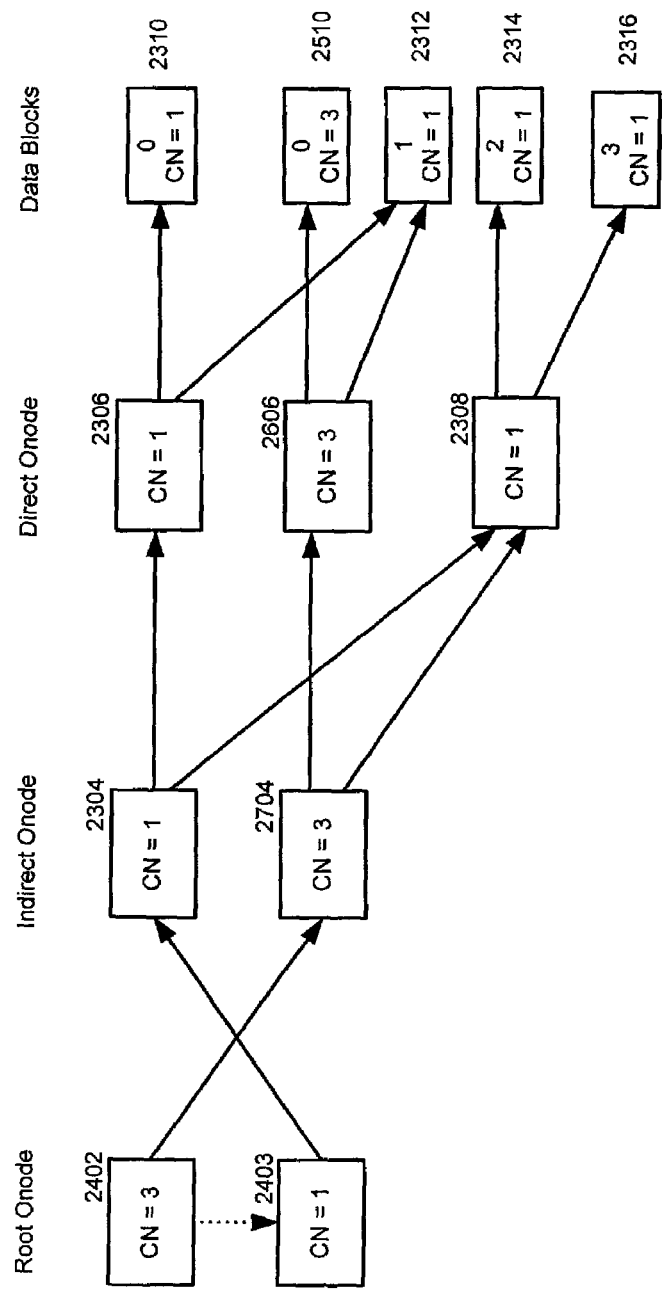
FIG. 28 is a diagram that shows the structure of the exemplary object of FIG. 27 after a pointer to the new indirect onode is written into the current root onode for the object in accordance with an embodiment of the present invention.

FIG. 28 shows the object structure after the pointer to the new indirect onode 2704 is written into the current version of the objects root onode 2402.

It should be noted that, after modification of data block 0 is complete, blocks 2403, 2304, 2306, and 2310 are components of the retained checkpoint but are not components of the current version of the object; blocks 2308, 2312, 2314, and 2316 are components of both the retained checkpoint and the current version of the object; and blocks 2402, 2704, 2606, and 2510 are components of the current version of the object but are not components of the retained checkpoint.

Figure 29:
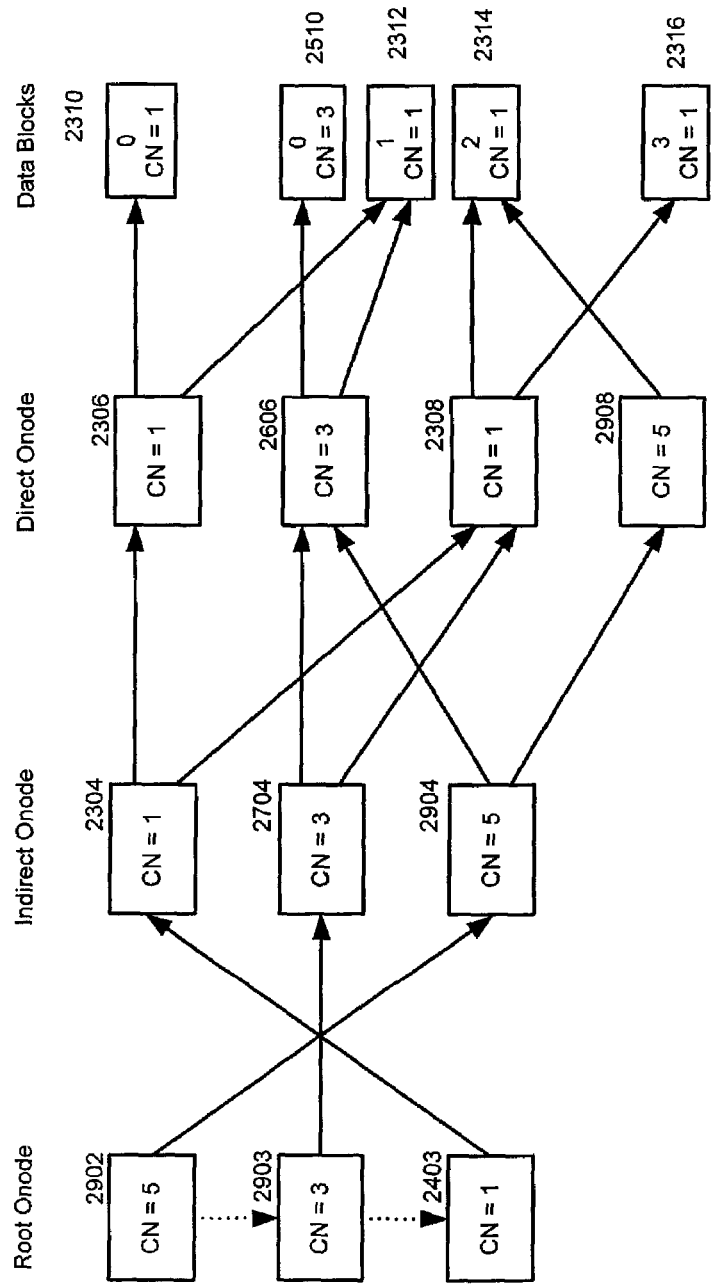
FIG. 29 is a diagram that shows the structure of the exemplary object of FIG. 28 after a retained checkpoint is taken in a checkpoint number 4 and after a data block 3 is deleted in a checkpoint number 5 in accordance with an embodiment of the present invention.

Suppose now that a retained checkpoint is taken at checkpoint number 4, and data block 3 (2316) is to be deleted in checkpoint number 5. The procedure here is similar to the procedure described above for modifying data block 0, and is described with reference to FIG. 29 which shows the object structure after deleting data block 3.

In this case, the Object Store sub-module saves a copy of the old root onode from checkpoint number 3, represented by block 2903, to free space on the disk, updates the root onode object 2902 to include checkpoint number 5, and updates various pointers in the current and saved root onodes. Specifically, saved root onode 2903 is essentially inserted into a doubly-linked list between the current root onode 2902 and the earlier saved root onode 2403. In the current root onode 2902, the pointer to an older root onode version is updated to point to the saved root onode 2903 rather than to the earlier saved root onode 2403. In the earlier saved root onode 2403, the pointer to a newer root onode version is updated to point to the newer saved root onode 2903 rather than to the current root onode 2902. In the saved root onode 2903, the pointer to a newer root onode version is updated to point to the current root onode 2902, while the pointer to an older root onode version is updated to point to the earlier saved root onode 2403.

The Object Store sub-module then traverses the object structure starting at the root onode until it reaches direct onode 2308, which includes the descriptor for data block 3 (2316). Because direct onode 2308 and data block 3 (2316) are components of an existing retained checkpoint, the Object Store sub-module cannot simply delete data block 3 (2316) and modify direct onode 2308 to remove the descriptor for data block 3 (2316). Therefore, the Object Store sub-module creates a new direct onode 2908 having checkpoint number 5 and a pointer to data block 2 (2314) but no pointer to data block 3 (2316). The Object Store sub-module also creates a new indirect onode 2904 having checkpoint number 5 and pointers to old direct onode 2606 and new direct onode 2908. Finally, the Object Store sub-module writes a pointer to the new indirect onode 2904 into the current version of the root onode 2902.

It should be noted that, after deletion of data block 3 is complete, blocks 2903, 2403, 2304, 2704, 2306, 2308, 2310, and 2316 are components of at least one retained checkpoint but are not components of the current version of the object; blocks 2606, 2510, 2312, and 2314 are components of the current version of the object and at least one retained checkpoint; and blocks 2902, 2904, and 2908 are components of the current version of the object but are not components of any retained checkpoint.

4.3 Accessing a Retained Checkpoint

When the Object Store sub-module is asked to perform an operation on an object, it is passed a handle to allow it to identify the object. Among other things, this handle specifies the checkpoint number of the required object. Normally, this would be set to a value that indicates the current version of the object. However, if a different checkpoint number is specified, then the Object Store sub-module performs the operation on the requested version of the object.

The Object Store sub-module attempts to find the requested version of the object by stepping through the current and saved root onodes, using the pointer from a newer version of a root onode to an older version of a root onode, until a root onode is found having the requested checkpoint number or an earlier checkpoint number. The Object Store sub-module then traverses the object structure from that root onode. This is demonstrated by example with reference again to FIG. 29.

If the Object Store sub-module receives a request for checkpoint number 5, then the Object Store sub-module first goes to the current version of the root onode object 2902. The current root onode 2902 has checkpoint number 5, which is the requested checkpoint number. The Object Store sub-module therefore traverses the object structure from root onode 2902 to provide the requested version of the object. Specifically, root onode 2902 points to indirect onode 2904. Indirect onode 2904 points to direct onodes 2606 and 2908. Direct onode 2606 points to modified data block 0 (2510) and to data block 1 (2312). Direct onode 2908 points to data block 2 (2314). Thus, the current version of the object includes the modified data block 0 and excludes deleted data block 3.

If the Object Store sub-module receives a request for checkpoint number 4, then the Object Store sub-module first goes to the current version of the root onode object 2902. The current root onode 2902 has checkpoint number 5, which is too recent, so the Object Store sub-module follows the pointer to saved root onode 2903. The root onode 2903 has checkpoint number 3, which is earlier than the requested version of the object. The Object Store sub-module therefore traverses the object structure from root onode 2903 to provide the requested version of the object. Specifically, root onode 2903 points to indirect onode 2704. Indirect onode 2704 points to direct onodes 2606 and 2308. Direct onode 2606 points to modified data block 0 (2510) and to data block 1 (2312). Direct onode 2308 points to data block 2 (2314) and to data block 3 (2316). Thus, the retained checkpoint for checkpoint number 4 includes the modified data block 0 and also includes data block 3.

If the Object Store sub-module receives a request for checkpoint number 2, then the Object Store sub-module first goes to the current version of the root onode object 2902. The current root onode 2902 has a checkpoint number of 5, which is too recent, so the Object Store sub-module uses the pointer in root onode 2902 to access saved root onode 2903. The saved root onode 2903 has a checkpoint number of 3, which is also too recent, so the Object Store sub-module uses the pointer in root onode 2903 to access saved root onode 2403. The saved root onode 2403 has a checkpoint number of 1, which is earlier than the requested version of the object. The Object Store sub-module then traverses the object structure from saved root onode 2403 to provide the requested version of the object. Specifically, the root onode 2403 points to indirect onode 2304. Indirect onode 2304 points to direct onodes 2306 and 2308. Direct onode 2306 points to data block 0 (2310) and to data block 1 (2312). Direct onode 2308 points to data block 2 (2314) and to data block 3 (2316). Thus, the retained checkpoint for checkpoint number 2 includes the original four data blocks.

It should be noted that, if the Object Store sub-module is unable to find the requested version of an object, then the Object Store sub-module typically generates an error message. For example, with reference again to FIG. 29, if the Object Store sub-module receives a request for checkpoint number 0, then the Object Store sub-module steps through the root onodes until it reaches root onode 2403. The root onode 2403 is too recent but also does not have a pointer to an earlier root onode, so the Object Store sub-module generates an error message indicating that the requested version of the object could not be found.

It should also be noted that the retained checkpoints are not permitted to be modified, and the Object Store sub-module will only allow read operations to be performed on them.

4.4 Deleting a Retained Checkpoint

There are two stages to the process of deleting a retained checkpoint.

The first stage involves getting a list of all of objects that were either created or modified in the retained checkpoint that is being deleted. This is achieved by means of a special object (modified retained objects list objects) that is produced for every retained checkpoint. This object is created when either a volume is opened for the very first time, or after a retained checkpoint has been taken. Every time an object is created, or the first time an object is modified if it was created in a previous retained checkpoint, the object number is written to this object. The object number for this special object is stored in the dynamic superblock. Before creating a retained checkpoint, the software records the object number of this special object for when it later wants to delete that retained checkpoint.

The second stage of deleting the retained checkpoint involves the following sequence of operations for each object either created or modified in the retained checkpoint:

1. Lock the object so that it can't be used by another operation. This is only required if the retained checkpoint is being deleted on a live filesystem.

2. Find the root onode for the retained checkpoint, the root onode for the previous retained checkpoint (if one exists), and the root onode for either the next retained checkpoint (if one exists) or the current version of the object if the most recent retained checkpoint is being deleted and the object has not been deleted.

3. Go through the structure of the retained checkpoint being deleted and identify all the indirect and direct onodes and data blocks used by it. For each such onode and data block, determine whether the item is only used by the retained checkpoint being deleted. This can be done by finding the equivalent item in both the previous and next versions of the object. If the equivalent item is different in the previous and next versions of the object, then the item is unique to this retained checkpoint.

4. If the item is only used by the retained checkpoint being deleted, then it is no longer required, so it is returned to the free space. If the item is used by the next retained checkpoint, then the item is added to the updated retained objects list for the next checkpoint, if it is not already in the updated retained objects list for the next retained checkpoint. By adding the item to the updated retained objects list, the Object Store sub-module will know to check if the item is still required when that retained checkpoint comes to be deleted.

5. Finally, if the root onode for this retained checkpoint is only used in this retained checkpoint, it too is no longer required and is deleted. In this case, if there is an older retained checkpoint, the pointer backwards from the next version of the root onode (if any), which previously pointed to the root onode of the retained checkpoint being deleted, is updated to point at the root onode of the previous retained checkpoint.

Note that in order to maintain file system integrity, careful attention needs to be paid to how retained checkpoint deletion ties in with the process of taking checkpoints, to make sure that checkpoints always represent a consistent view of the file system and that a crash in the middle of deleting a retained checkpoint can be recovered.

Figure 30:
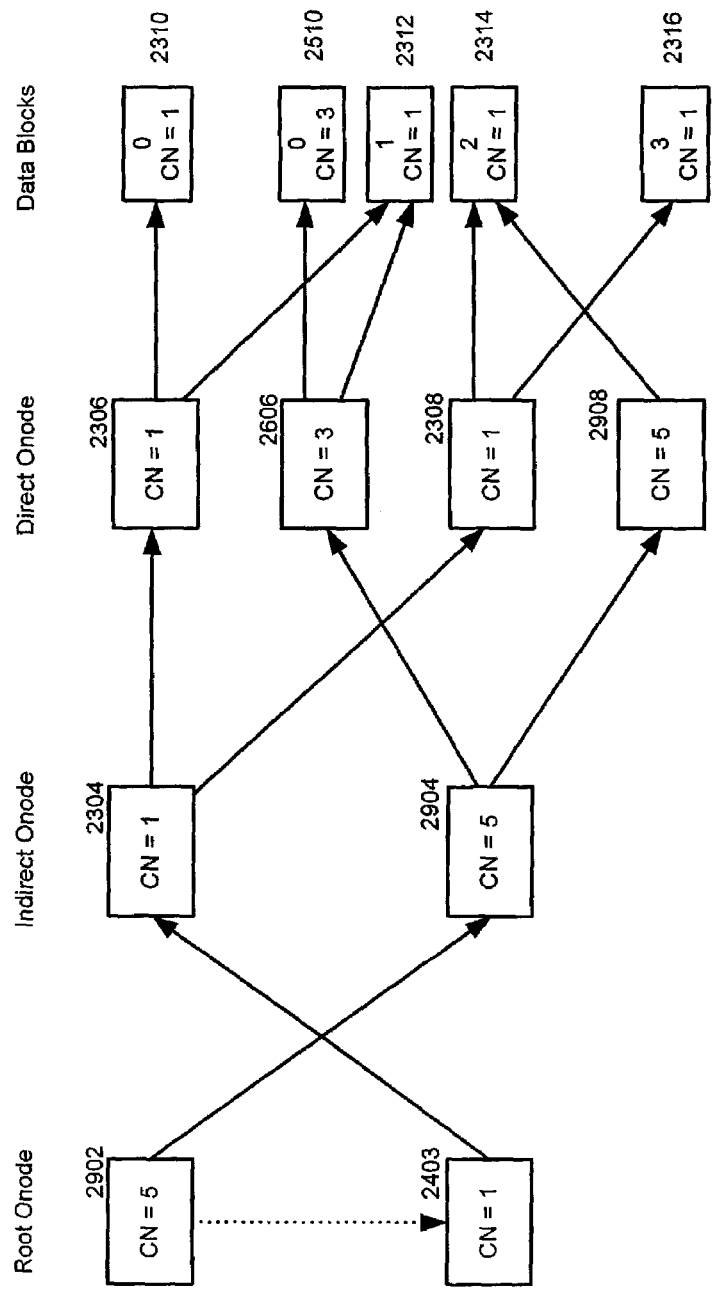
FIG. 30 is a diagram that shows the structure of the exemplary object of FIG. 29 after the retained checkpoint taken in checkpoint number 4 is deleted in accordance with an embodiment of the present invention.

Deleting a retained checkpoint can be demonstrated by example. With reference again to FIG. 29, suppose that the retained checkpoint created with checkpoint number 4 is to be deleted. This retained checkpoint is represented by root onode 2903. The only items in the structure that are used only by this retained checkpoint are the root onode 2903 and the indirect onode 2704. These onodes are returned to free space. The root onode 2902 is updated to point at the root onode 2403 rather than to the deleted root onode 2903. FIG. 30 shows the object structure after the retained checkpoint for checkpoint number 4 is deleted.

Figure 31:
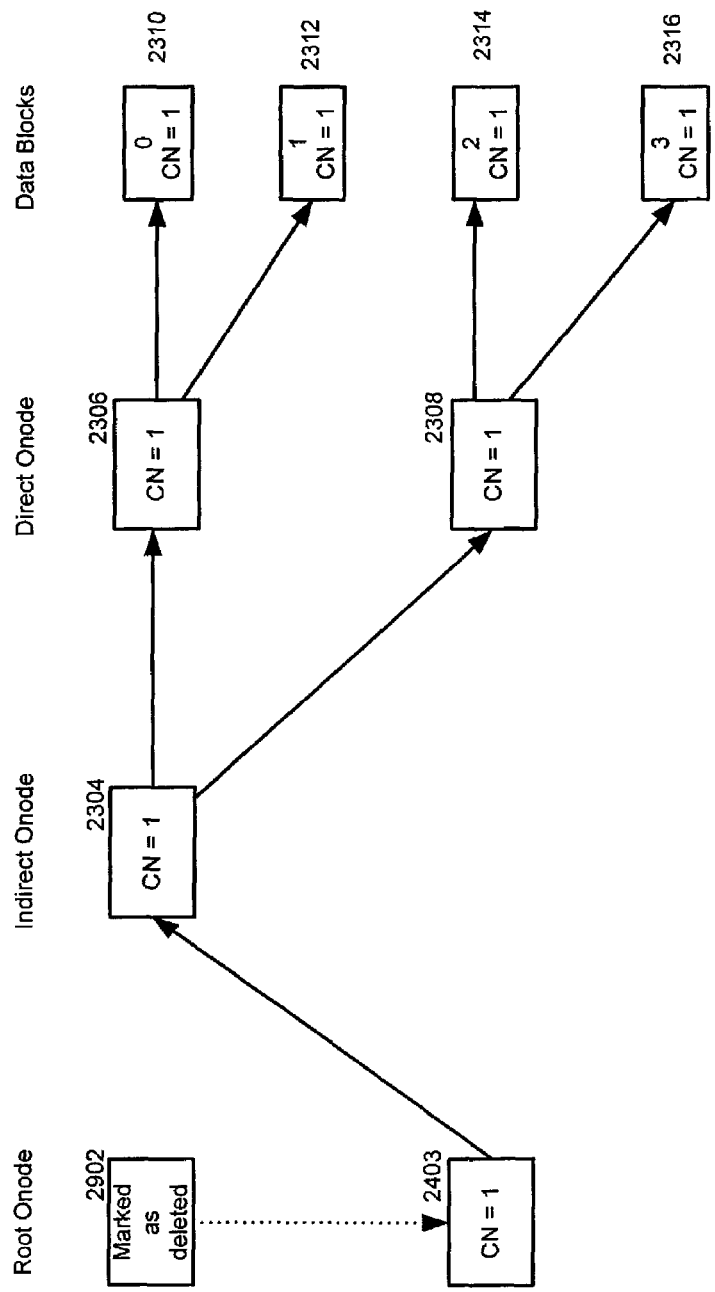
FIG. 31 is a diagram that shows the structure of the exemplary object of FIG. 30 after the current version of the object is deleted, leaving only the retained checkpoint taken in checkpoint number 2, in accordance with an embodiment of the present invention.

With reference again to FIG. 30, suppose now that the current version of the object is to be deleted while the retained checkpoint for checkpoint number 2 still exists. This is similar to the case of a retained checkpoint being deleted in that there is a need to identify all of the items in the structure that are unique to the current version and return these to the free space. In this case, onodes 2904, 2606, and 2908 are used for the current version of the object but not for any remaining retained checkpoint, so these onodes are returned to free space. The current root onode 2902 is modified to indicate that it now references an object which has been deleted, but still has a pointer to at least one valid retained checkpoint. FIG. 31 shows the object structure after the current version of the object has been deleted.

When all remaining retained checkpoints for this object are deleted, the current version of the root onode 2902 is returned to the free root onode queue rather than to free space.

4.5 Reverting to a Retained Checkpoint

Under some conditions, it may be necessary or desirable to revert the live file system to a version represented by a retained checkpoint. Reverting the live file system to a version represented by a retained checkpoint can be accomplished in a number of different ways. Reverting the live file system to a retained checkpoint may involve such things as:

1. Copying the relevant contents of the root onode associated with the retained checkpoint into the current root onode (e.g., pointers to direct and indirect onodes and data blocks, pointer to earlier retained checkpoint, etc.).

2. Identifying the root onode associated with the preceding retained checkpoint (if one exists) and modifying the pointer in that root onode to point to the current root onode rather than to the root onode associated with the retained checkpoint to which the live file system is being reverted.

3. Deleting the root onode associated with the retained checkpoint.

4. Clearing the updated checkpoint objects list (i.e., after reverting the live file system to the version represented by the retained checkpoint, there are effectively no modified objects).

5. Deleting all objects created after the retained checkpoint, including root onodes and other objects associated with any retained checkpoints taken after the retained checkpoint to which the live file system is reverted.

Other than modifying the pointer in the root onode associated with the previous retained checkpoint, if one exists, any older retained checkpoints should remain unchanged. However, all newer retained checkpoints are effectively deleted.

4.6 Other Operations Relating to Retained Checkpoints

All other functions normally associated with retained checkpoints can be achieved using the mechanisms described here. For instance, incremental backup can be performed by using the updated retained objects lists to work out what has changed between successive retained checkpoints.

What is claimed is:

1. An apparatus comprising:
   a storage device; and
   a file server node comprising
   (i) a first interface being configured to communicate with a network and receiving a network request via the network,
   (ii) a non-volatile memory being configured to store a request related to the network request received by the first interface,
   (iii) a second interface being configured to be coupled to the storage device for storing the request, and
   (iv) a non-volatile memory processing module, coupled to the first interface, the non-volatile memory and the second interface, and being configured to be coupled to another file server node, so that the non-volatile memory processing module is configured to perform each of sending the request to the non-volatile memory, sending the request to the second interface and sending the request to the another file server node after the non-volatile memory processing module receives the request.

2. The apparatus according to the claim 1 wherein:
   the non-volatile memory processing module is operable to send the request to the non-volatile memory for being stored in the non-volatile memory, to the second interface for being stored in the storage device and to the another file server node for being stored in another non-volatile memory in the another file server node after receiving the file system request from a processor managing at least the non-volatile memory processing module.

3. The apparatus according to the claim 1 wherein:
   the non-volatile memory processing module includes a programmable logic device.

4. The apparatus according to the claim 1 wherein:
the non-volatile memory processing module includes a field programmable gate array.

5. The apparatus according to the claim 1 wherein:
an acknowledgement of the network request is send back via the network after the non-volatile memory processing module sends the request to the non-volatile memory, the second interface, and the another file server node.

6. The apparatus according to the claim 1 further comprising:
a file system module, in the file server node, and comprising the non-volatile memory and the non-volatile memory processing module.

7. The apparatus according to the claim 1 further comprising:
a file system module, in the file server node, and coupling the first interface and the second interface, and being operable to comprise the non-volatile memory and the non-volatile memory processing module.

8. The apparatus according to the claim 1 further comprising:
a metadata cache, coupling the non-volatile memory processing module, and being operable to store management information of an object of a file system managed by the file server node.

9. The apparatus according to the claim 1 further comprising:
an object store module, in the file server node, and coupling the non-volatile memory processing module, and being operable to manage management information of an object of a file system, managed by the file server node.

10. The apparatus according to the claim 1 further comprising:
a data store module, in the file server node, and coupling the non-volatile memory processing module, and being operable to manage management information of a file system managed by the file server node.

11. The apparatus according to the claim 1 further comprising:
a plurality of data paths, in the file server node, and coupling between a file system module and the second interface, the file system module comprising the non-volatile memory and the non-volatile memory processing module, and the second interface,
a first data path of the plurality of data paths being operable to be used for transferring data from the file system module to the second interface, and
a second data path of the plurality of data paths being operable to be used for transferring data from the second interface to the file system module.

12. A file server node comprising:
a first interface being operable to communicate with a network and receiving a network request via the network,
a non-volatile memory being configured to store a request related to the network request received by the first interface,
a second interface being configured to communicate with a storage device for storing the request, and
a non-volatile memory processing module coupled to the first interface, the non-volatile memory and the second interface, and being configured to be coupled to another file server node, so that the non-volatile memory processing module is configured to perform each of sending the request to the non-volatile memory, sending the request to the second interface, and sending the request to the another file server node after the non-volatile memory processing module receives the request.

13. The file server node according to the claim 12 wherein:
the non-volatile memory processing module is operable to send the request to the non-volatile memory for being stored in the non-volatile memory, to the second interface, for being stored in the storage device and to the another file server node for being stored in another non-volatile memory in the another file server node.

14. The file server node according to the claim 12 wherein:
the non-volatile memory processing module includes a programmable logic device.

15. The file server node according to the claim 12 wherein:
the non-volatile memory processing module includes a field programmable gate array.

16. The file server node according to the claim 12 wherein:
an acknowledgement of the network request is send back via the network after the non-volatile memory processing module sends the request to the non-volatile memory, the second interface, and the another file server node.

17. The file server node according to the claim 12 further comprising:
a file system module comprising the non-volatile memory and the non-volatile memory processing module.

18. The file server node according to the claim 12 further comprising:
a file system module coupling the first interface and the second interface, and comprising the non-volatile memory and the non-volatile memory processing module.

19. The file server node according to the claim 12 further comprising:
a metadata cache, coupling the non-volatile memory processing module, and being operable to store management information of an object of a file system managed by the file server node.

20. The file server node according to the claim 12 further comprising:
a data store module, coupling the non-volatile memory processing module, and being operable to manage management information of data of a file system managed by the file server node.

21. The file server node according to the claim 12 further comprising:
an object store module, coupling the non-volatile memory processing module, and being operable to manage management information of an object of a file system, managed by the file server node, by using a metadata cache.

22. The file server node according to the claim 12 further comprising:
a plurality of data paths, coupling between a file system module and the second interface, the file system module comprising the non-volatile memory and the non-volatile memory processing module, and the second interface,
a first data path of the plurality of data paths being operable to be used for transferring data from the file system module to the second interface, and a second data path of the plurality of data paths being operable to be used for transferring data from the second interface to the file system module.

* * * * *